United States Patent
Nagayama

[11] Patent Number: 6,139,237
[45] Date of Patent: Oct. 31, 2000

[54] METALLIC FASTENING MEMBER AND FABRICATION METHOD THEREOF

[75] Inventor: Yutaka Nagayama, Kishiwada, Japan

[73] Assignee: Nagayama Electronic Industry Co., Ltd., Wakayama, Japan

[21] Appl. No.: 09/201,489

[22] Filed: Nov. 30, 1998

Related U.S. Application Data

[63] Continuation-in-part of application No. 09/094,416, Jun. 9, 1998.

[30] Foreign Application Priority Data

Dec. 26, 1997 [JP] Japan ................................. 9-360301
Oct. 30, 1998 [JP] Japan ................................. 10-311389

[51] Int. Cl.[7] ........................... F16B 37/04; F16B 39/00
[52] U.S. Cl. ........................ 411/181; 411/176; 411/183; 411/501; 470/20
[58] Field of Search ........................... 411/176, 179, 411/180, 181, 183, 427, 501; 470/20

[56] References Cited

U.S. PATENT DOCUMENTS

| | | |
|---|---|---|
| 3,515,028 | 6/1970 | Patton . |
| 4,541,761 | 9/1985 | Bryce, Jr. . |
| 5,195,854 | 3/1993 | Nagayama . |
| 5,238,344 | 8/1993 | Nagayama . |
| 5,348,432 | 9/1994 | Nagayama . |
| 5,429,466 | 7/1995 | Nagayama . |
| 5,503,596 | 4/1996 | Nagayama . |
| 5,618,144 | 4/1997 | Leistner . |

FOREIGN PATENT DOCUMENTS

| | | |
|---|---|---|
| 0527627 | 2/1993 | European Pat. Off. . |
| 3403128 | 8/1985 | Germany . |
| 4024042 | 10/1991 | Germany . |
| 4201016 | 11/1992 | Germany . |
| 4206821 | 1/1993 | Germany . |
| 4401746 | 11/1994 | Germany . |
| 10054415 | 2/1998 | Japan . |
| 1157734 | 7/1969 | United Kingdom . |

Primary Examiner—Neill Wilson
Attorney, Agent, or Firm—W. F. Fasse; W. G. Fasse

[57] ABSTRACT

A metallic fastening member of a one piece configuration formed of a metal material includes a shaft and a flange extending outwards from a first end of the shaft. The shaft includes a relatively thin-walled portion to be caulked at a second end opposite to the first end. A female threading is formed at an inner peripheral face of the shaft excluding the portion to be caulked. An annular groove is formed at an outer peripheral face of the shaft or at the inner peripheral face of the portion to be caulked, so that the shaft has a partially thin wall. Since the wall of the shaft is thinner at the annular groove, the metallic fastening member can be fractured at that area so as to be separated into upper and lower pieces when detaching the metallic fastening member from a workpiece. Therefore, the metallic fastening member can be readily removed from the workpiece to facilitate the recovery work for recycling purposes.

29 Claims, 42 Drawing Sheets

FIG. 11
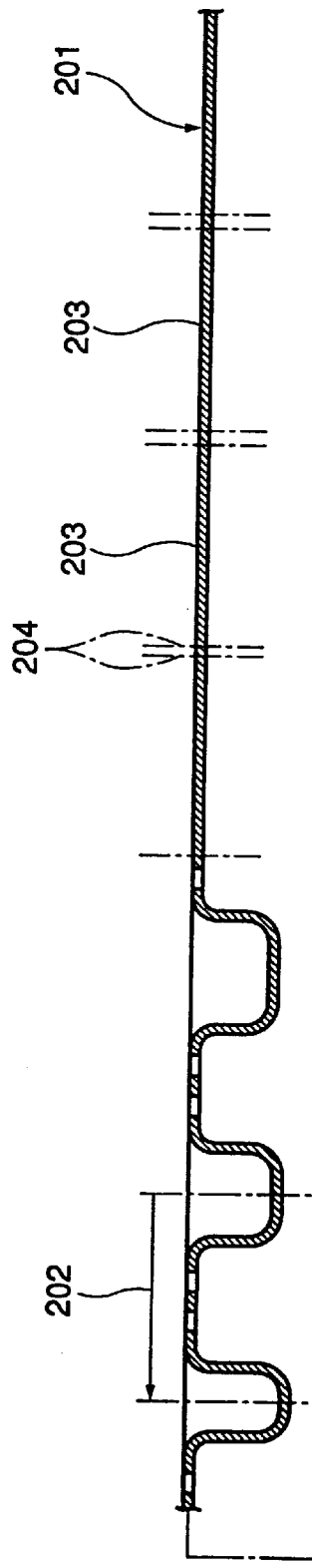
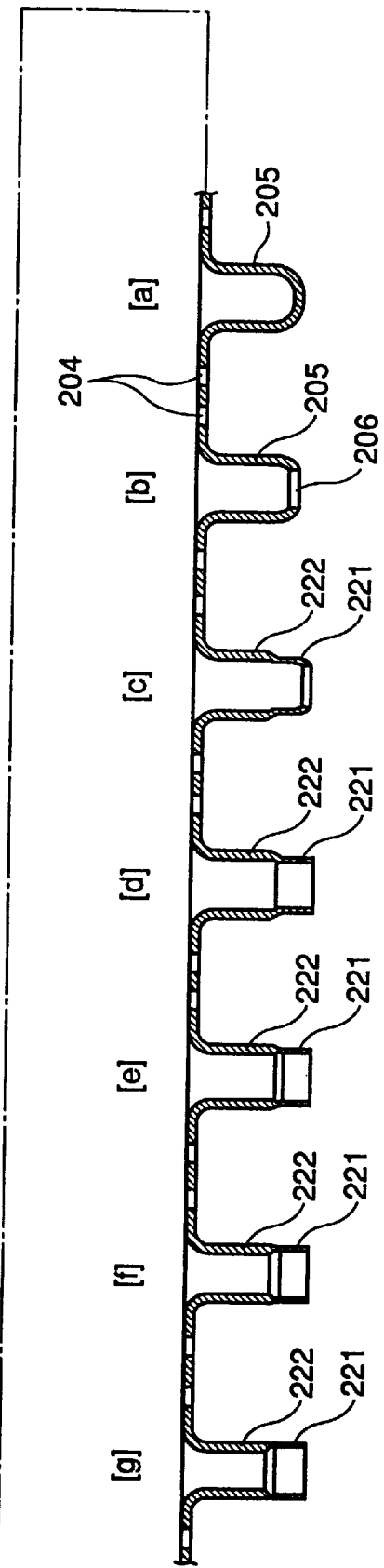

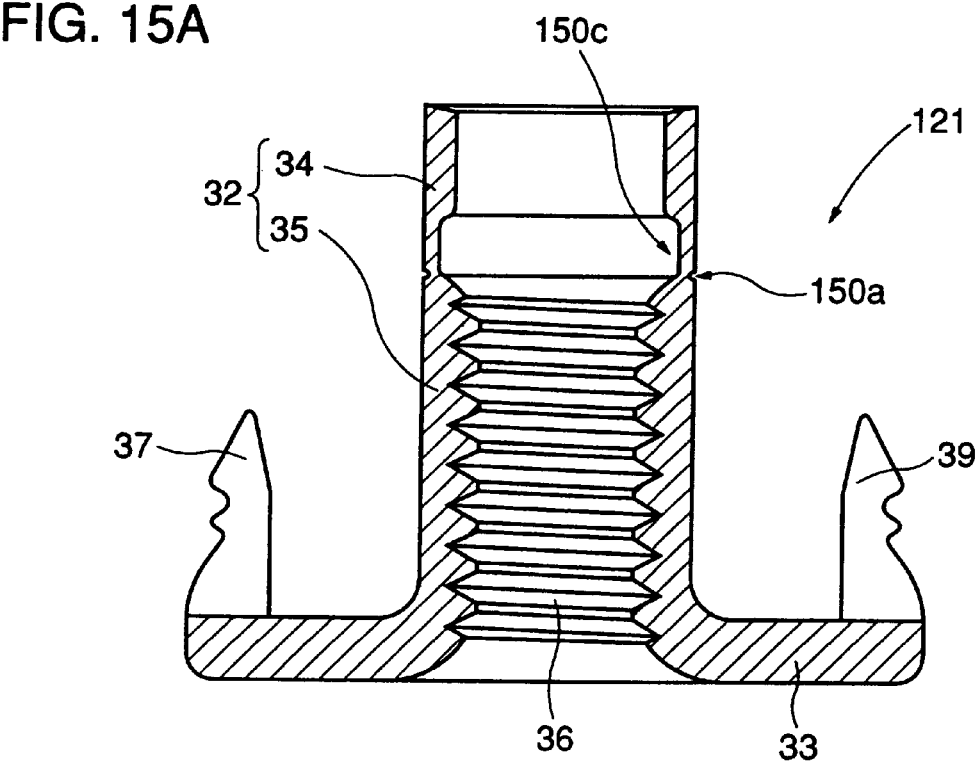
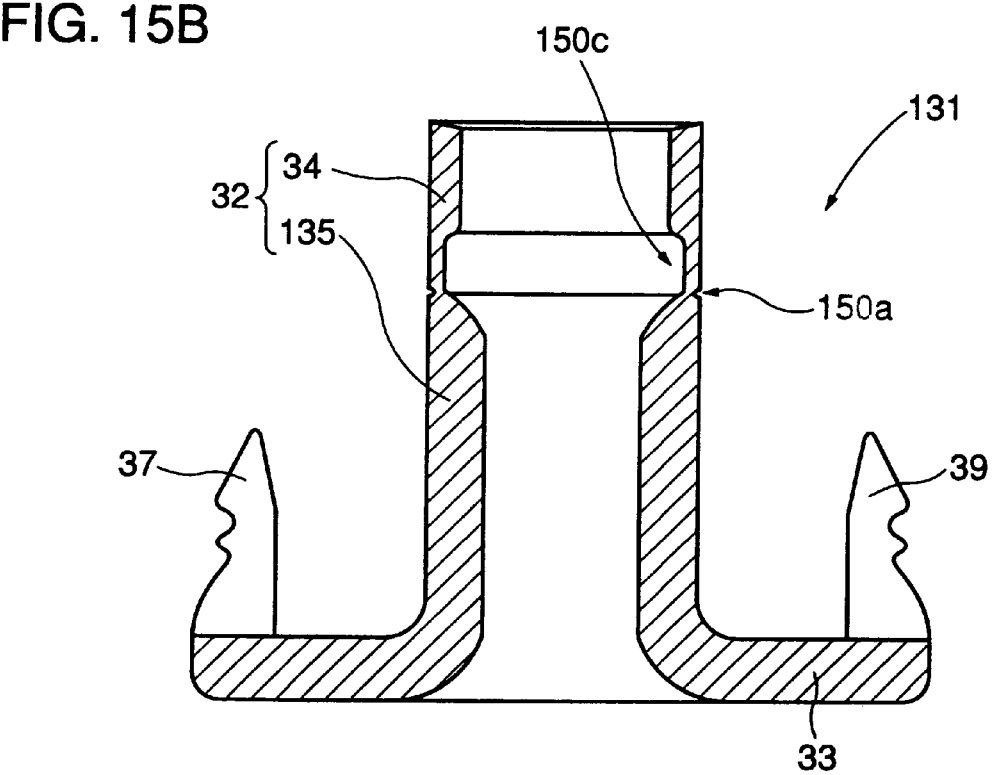

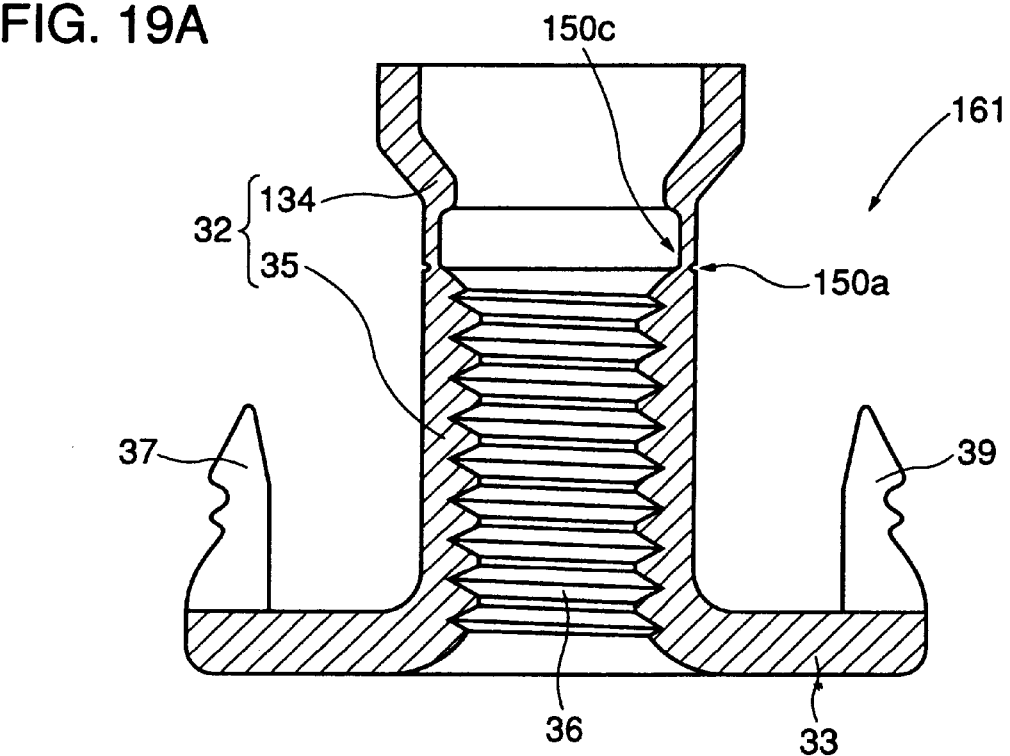
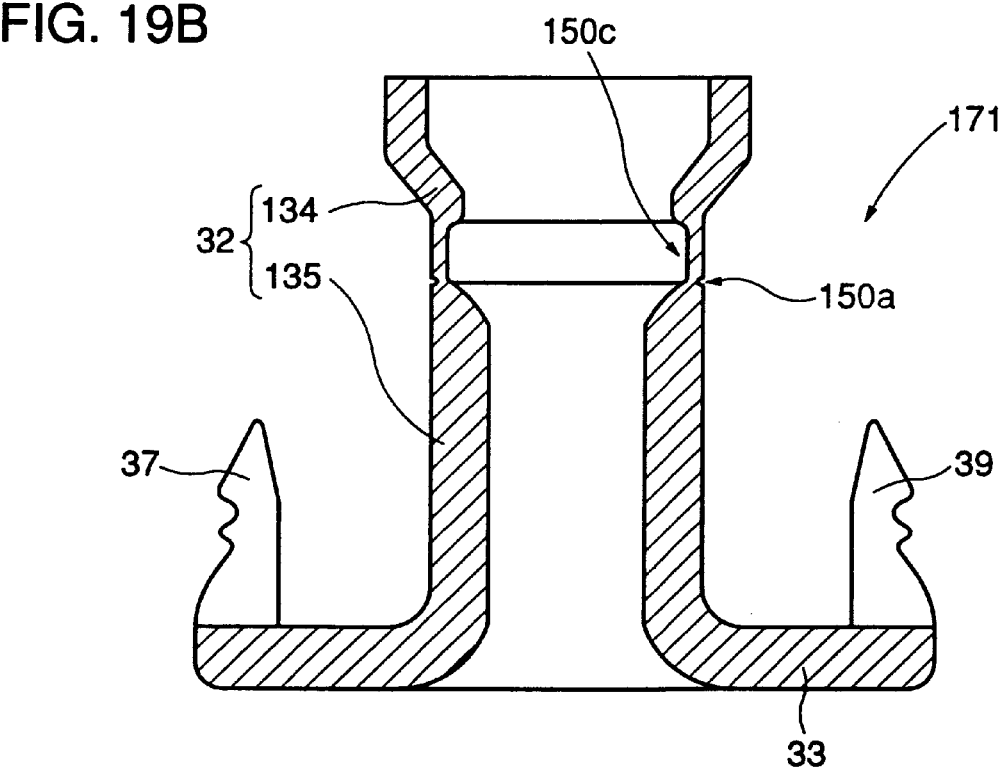

METALLIC FASTENING MEMBER AND FABRICATION METHOD THEREOF

CROSS-REFERENCE TO RELATED APPLICATION

This application is a Continuation-In-Part of copending U.S. application 09/094,416, filed Jun. 9, 1998, entitled: TEE NUT.

BACKGROUND OF THE INVENTION

1. Field of the Invention

The present invention relates to a metallic fastening member such as a tee nut or a rivet having a flange portion extending outwards from one end of a hollow shaft portion, and a fabrication method of such a metallic fastening member. More particularly, the present invention relates to a metallic fastening member including a relatively thin-walled portion to be caulked at an end of a shaft portion opposite to the end of a flange portion, and a fabrication method of such a metallic fastening member.

2. Description of the Background Art

A conventional tee nut having a thin-walled portion to be caulked at its shaft portion is disclosed in, for example, U.S. Pat. No. 5,238,344 or U.S. Pat. No. 5,348,432.

A tee nut 11 defined in U.S. Pat. No. 5,238,344 has a configuration as shown in FIGS. 40A and 40B. The tee nut is formed integrally by sheet metal processing an iron metal plate, and includes a shaft portion 12 and a flange portion 13 extending or extruding outwards from a first end of shaft portion 12.

Shaft portion 12 has a hollow cylindrical shape of uniform outer diameter. At a second end of shaft portion 12 opposite to the first end, a portion to be caulked 14 is provided. In shaft portion 12 excluding portion 14 to be caulked, a female thread 15a is formed at the inner circumference of a female thread formation portion 15. Portion 14 is made thinner than female thread formation portion 15. This provides the advantage that, in the formation of female thread 15a, the threading work can be effected from either side of the first end or the second end of shaft portion 12.

Flange portion 13 includes two pawls 16 formed by extruding or deforming inwards a portion of the outer rim of flange portion 13 so as to protrude towards the second end of shaft portion 12. The two pawls 16 are arranged opposite to each other by 180 degrees. At the rim of flange portion 13, a notch 17 having a cross section of substantially a semi-circle is left as a result of formation of pawl 16.

FIG. 42A shows tee nut 11 in its usage state. Referring to FIG. 42A, shaft portion 12 is inserted into a through hole 18 that is provided in a workpiece, i.e. object of fixation 19, formed of resin or wood. Portion 14 is subjected to a caulking process by a caulking device, whereby a caulk portion 14a is formed at one surface side of object 19 of fixation. At the same time, pawl 16 digs into the other surface side of object 19. Thus, fixation of tee nut 11 to object 19 is completed.

A tee nut 31 disclosed in U.S. Pat. No. 5,348,432 has a configuration as shown in FIGS. 41A and 41B. Similar to the above-described tee nut 11, tee nut 31 is integrally formed by applying a sheet metal process on an iron type metal sheet. Tee nut 31 includes a shaft portion 32 and a flange portion 33 extruding outwards from one end of shaft portion 32. Shaft portion 32 includes a female thread formation portion 35 having a female thread 36 formed at the inner circumference of shaft portion 32. Shaft portion 32 further includes a portion 34 to be caulked. The structure of tee nut 31 differs from tee nut 11 in that two pairs of pawls 37 and 38, and 39 and 40 extending from one end towards the second end are arranged opposite each other in the radial direction of flange portion 33 at the outer perimeter of flange portion 33. Flange portion 33 substantially has an octagonal shape as a whole.

Such a tee nut 31 is generally referred to as a "hopper feed tee nut". This is because tee nut 31 can be advanced smoothly along the supply track in a nut fixation device to be fastened to a workpiece or object of fixation. In other words, the tee nut can be supplied automatically. Details of a form of a hopper feed tee nut are disclosed in, for example, G. B. Patent No. 1,157,734.

In FIG. 41B, the aforementioned supply track 43 is depicted in phantom lines. Supply track 43 includes a pair of guide rails 44 and 45 having a C-shaped cross section, arranged symmetrically facing each other. Tee nut 31 is moved taking a predetermined posture along supply track 43 while flange portion 33 is received in each of guide rails 44 and 45 with pawls 37–40 therebetween. Although not depicted, supply track 43 is often bent to set tee nut 1 at a desired posture, and has shaft portion 32 aligned in a hole formed in the workpiece object to be fastened (not shown).

As shown in FIG. 42B, for example, tee nut 31 is used in a manner similar to that of tee nut 11. More specifically, shaft portion 32 of tee nut 31 is inserted into a through hole 18 in an object of fixation 19. A caulking process is applied on portion 34 to be caulked of tee nut 31 by a caulking device, whereby a caulk portion 34a is formed at one side surface of object 19. At the same time, pawls 37–40 dig into the other side surface of object 19.

Tee nut 31 is prevented from being detached from through hole 18 by means of pawls 37–46 that prevent rotation of tee nut 31 with respect to object 19 and by means of flange portion 33 and caulk portion 34a that sandwich object 19 therebetween. Tee nut 31 is firmly secured to object 19. The fixed state is maintained substantially permanently.

Once either of the conventional tee nuts 11 and 31 is secured to object 19 by means of caulking, it is difficult to detach the tee nut from object 19 since the fixation strength is extremely great. This is preferable from the standpoint of holding the product to which tee nut 11 or 31 is applied in a secure state.

However, when the product is no longer used and is to be dismantled to recover the material forming object 19 for recycling purposes, tee nut 11 or 31 must be unfastened from object 19. The application of recycling is particularly required in the event that the material forming object 19 is a resin. There is a demand for a tee nut that does not bar the separation and recovery work of an object 19 for recycling in a product that was fastened by caulking and is now to be dismantled.

Such a demand for facilitating the separation work for recycle usage is not limited to a tee nut. There is a similar demand for any metal fastening member that is fixed by caulking to an object of fixation such as a rivet which is a member that does not have a female thread formed at the inner peripheral surface of the shaft portion.

SUMMARY OF THE INVENTION

An object of the present invention is to provide a metallic fastening member such as a tee nut or a rivet including a portion to be caulked that is easily detachable from an object of fixation in an already-used product without degrading the fixation strength of the fastening member to the object of fixation when in a state secured by caulking.

The metallic fastening member of the present invention for attaining the above object is integrally formed of a metal material, including a cylindrical shaft portion and a flange portion extruding outwards from a first end of the shaft portion. The shaft portion includes a portion to be caulked at a second end opposite to the first end, and a shaft main portion continuous to the portion to be caulked and extending towards the first end. The metallic fastening member is characterized in that a thin-walled portion where the wall thickness of the shaft portion is partially reduced is provided within the substantially annular region that forms the circumference of the shaft portion in the vicinity of the interface between the portion to be caulked and the shaft main portion. The thin-walled portion maintains sufficient strength so that it will not fracture when an axially directed force is exerted in the state of usage corresponding to a fixed state by caulking with respect to an object of fixation, and so that it will fracture by effecting tensile force greater than a predetermined level in the direction of the shaft to allow separation of the shaft portion into two parts.

According to the metallic fastening member of the present invention having the above-described structure, a jig is used that causes tensile stress in the direction of the center axis of the shaft portion at the grooved portion in the shaft portion with the object of fixation fastened by caulking. The metallic fastening member can easily be separated into two parts by fracture at the portion where the jig is used. As a result, the metallic fastening member that was secured by sandwiching the object of fixation from both the top and bottom faces with the flange portion and the caulk portion can easily be detached from the object of fixation.

Since the metallic fastening member can easily be disengaged from the object of fixation, the separation and recovery of the object of fixation constituting the product having the metallic fastening member of the present invention caulked thereon can be facilitated, subsequent to the period of usage of the product to promote recycling.

When the metallic fastening member of the present invention is secured to the object of fixation in a caulked manner, the pawl at the flange portion digs into the object of fixation for a more secure fixation. Also, in case that the present invention is applied to a tee nut having a female screw threading formed at the inner circumference of the shaft main portion, the tightening force of a male screw, when in a screwed and tightened state during usage of the product in which the object of fixation is a constituent element, mainly acts as compressive stress to the shaft main portion. Therefore, generally no great tensile stress will be generated at the shaft portion of the tee nut. There is substantially no degradation in the fixation strength caused by lower strength due to provision of an annular groove in the shaft portion.

As means for providing a thin-walled portion, at least one of the outer peripheral surface and the inner peripheral surface of the substantially annular region of the shaft portion has a groove formed extending in the direction of the circumference so that the wall of the shaft portion is partially reduced. Such a groove can be provided continuous over the entire circumference, or having at least one discontinuous area. As another means for providing a thin-walled portion, a dent that is intermittently present in the direction of the circumference can be provided in at least one of the outer peripheral surface and the inner peripheral surface of the substantially annular region of the shaft portion.

The groove is preferably provided in at least the inner perimeter or the outer perimeter of the shaft portion in proximity to the interface between the portion to be caulked and the shaft main portion. Also, the groove can be provided at both the inner perimeter and the outer perimeter of the shaft portion in proximity to the interface between the portion to be caulked and the shaft main portion, substantially opposite to each other.

Further, in the structure of the metallic fastening member of the present invention, the thin-walled portion is provided at the outer circumference of the shaft portion in the vicinity of the interface between the portion to be caulked and the shaft main portion. By such a structure, the entire length of the portion to be caulked can be subject to bending for caulking. Since the thinnest wall portion is formed at the stepped portion of the interface between the portion to be caulked and the shaft main portion, fracture can occur relatively easier in the stage of detachment from the object of fixation. This is convenient for facilitating the separation work of recovery for recycling purposes.

The provision of the thin-walled portion at such a position allows the metallic fastening member to be detached from the object of fixation by the method set forth in the following in the state fixed by caulking with respect to the object of fixation. A columnar jig is driven from the second end side that is caulked. The upper end of the jig is hit with a hammer or the like, whereby the lower end of the jig is urged against the upper edge of the female thread formation portion. In response to the tensile force acting on the shaft portion caused by the jig, great tensile stress is exerted on the thinnest wall portion where the thin-walled portion is formed. Fracture occurs at this area to divide the metallic fastening member into two parts. As a result, the separated first end half portion, i.e., the portion including the female thread formation portion and the flange portion, is pushed downwards by the lower end of the jig to be detached from the object of fixation. Then, the jig is pulled up outwards, whereby the second end half portion that is in a close fit state with respect to the jig is detached from the object of fixation together with the jig.

The thin-walled portion of the metallic fastening member of the present invention can be provided at one or both of the outer circumference and the inner circumference of the portion to be caulked at a position closer to the female thread formation portion side than the portion where bending deformation occurs in a caulked state. By providing a thin-walled portion at such a position, the metallic fastening member can be detached from the object of fixation using a columnar jig in a manner similar to that of the above-described structure.

Furthermore, the thin-walled portion of the metallic fastening member of the present invention can be provided at the outer circumference of the shaft portion in the female thread formation portion. In this case, a wedge-like jig is inserted into the abutment between the caulk portion or the flange portion and the face of the object of fixation in the sate of the fastening member secured to the object of fixation by caulking. Tensile stress is exerted on the shaft portion to cause fracture at the concave portion. The metallic fastening member is separated into two pieces, and can be detached from the object of fixation.

In this case, a structure can be provided wherein a relatively thin-walled region recessed with a predetermined width in the extending direction of the shaft portion and where a female thread is not provided is formed in a region at the inner peripheral face of the female thread formation portion. A thin-walled portion can be formed at the outer peripheral surface of this relatively thin-walled region. In this case, the thin-walled portion has the minimum thickness made small enough even if it is relatively shallow and thin. Therefore, the object of facilitating removal of the metallic fastening member for recovery directed to recycling purposes can be accomplished.

As an alternative to the above-described thin-walled portion, a structure can be provided that includes an annular thin-walled portion over the entire perimeter at the interface between the portion to be caulked and the female thread formation portion. This annular thin-walled portion is formed by being drawn in the radial direction of the shaft portion by shaping the portion to be caulked so that the inner and outer diameter thereof is reduced or increased relative to the female thread formation portion. By inserting a wedge-like jig into the abutment between the portion to be caulked or the flange portion and the face of the object of fixation while the object of fixation is secured in a caulked manner, tensile stress is exerted on the shaft portion to cause fracture at the annular thin-walled portion. As a result, the metallic fastening member can be easily separated into two pieces to be removed from the object of fixation.

In a preferable embodiment of the metallic fastening member of the present invention, the groove has a substantially planar or actually cylindrical bottom of a predetermined width. By such a substantially "flat", i.e. cylindrical bottom of a predetermined of the groove, variation in the width of the bottom of the groove caused by any slight variation in the process operation in press shaping is so small so that there is hardly no variation in the depth. As a result, the thinnest wall of the shaft portion of desired level can be obtained stably. In the state where the portion to be caulked is caulked, the end of the portion bent by caulking at the flange side can easily be set to overlap the position of the bottom of the annular groove. There is also the advantage that the detachment in the separation work in recovery can be carried out relatively easily since the position of the end of the portion bent by caulking at the flange side is overlapped with the position of the bottom of the groove.

The present invention is suitably applied to the so-called tee nut where a female thread i.e. threading is formed in at least part of the region of the inner circumference of the shaft main portion. In the case of such a tee nut, a structure can be provided having a relatively thin-walled region recessed over a predetermined width in the direction where the shaft portion extends at an area of the inner circumference of the shaft main portion, and in which a female thread is not formed. The groove can be provided at the outer circumference or the inner circumference of the shaft portion at that relatively thin-walled region.

As still another means for forming a thin-walled portion at the shaft portion, a thin-walled portion can be provided extending in the circumference direction at the interface between the portion to be caulked and the shaft main portion. The thin-walled portion is formed by being extended in the radial direction of the shaft portion by shaping the portion to be caulked so that the inner and outer diameter is reduced or increased at least partially relative to the shaft main portion.

The method of fabricating a metallic fastening member of the present invention of a one piece construction formed of a metal material, and including a cylindrical shaft portion and a flange portion extruding outwards from the first end of the shaft portion, said shaft portion including a portion to be caulked at the second end opposite to said first end, and a shaft main portion continuous to the portion to be caulked and extending towards the first end, includes the following steps.

First, the center area of the portion of a metal sheet that will become the flange portion is expanded towards one main surface of the metal plate to form an expansion portion that becomes the shaft portion. A through hole is formed at the leading end face of the expansion portion. The wall thickness of the leading end portion corresponding to the portion in the expansion portion where the portion to be caulked is to be formed is made thinner than the wall of the base portion corresponding to the region where the shaft main portion is to be formed. Also, the inner diameter of the leading end portion is made smaller than the inner diameter of the base portion (termed "step (A)" hereinafter). Then, at least either the leading end portion or the base portion is deformed in the radial direction so that the outer diameter of the leading end portion and the outer diameter of the base portion come closer while maintaining the wall thickness of the base portion (termed "step (B)" hereinafter).

In a preferable embodiment of the present invention, step (B) is carried out so that a groove extending in the direction of the circumference is formed in at least the inner circumference of the substantially annular region in the proximity of the interface between the leading end portion and the base portion. In another preferably embodiment of the present invention, step (B) is carried out so that a groove extending in the circumference direction is formed at both the inner circumference and the outer circumference of the substantially annular region in the proximity of the interface between the leading end portion and the base portion.

Step (A) preferably includes the step of reducing the outer diameter and the inner diameter of the leading end while restricting deformation of the base portion. Step (B) preferably includes the step of reducing the outer diameter and the inner diameter of the base portion while restricting deformation of the leading end portion. Further preferably included is the step of exerting urging force in the direction of the center axis of the shaft portion with respect to the leading end portion after the step of (B).

According to the method of fabricating a metallic fastening member of the present invention with the above-described steps, a metallic fastening member with a thin-walled portion directed to facilitate detachment for recycling purposes can be fabricated efficiently without increasing the fabrication cost and without degrading the mass production.

In particular, mass production of the metallic fastening member having the groove as a means for providing a thin-walled portion in the inner perimeter of the shaft portion can be realized only by applying the above manufacturing method of the present invention adopting so-called sequential forwarding press process and it would be almost impossible to form such structure in a manner enabling mass production by means of another kind of forming process such as forging or the like. Since the portion to be caulked is to be bent outwardly when being caulked, the groove provided in the inner perimeter of the shaft portion is to be transformed in the direction to be opened. Accordingly, the detachment in the separation process for recycling purposes can be carried out relatively easier by providing the groove in the inner perimeter of the shaft portion.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a sectional view showing the sequential forward press work sequentially applied to a metal plate 201 for the formation of tee nut 101 of FIG. 10A or rivet 111 of FIG. 10B.

FIG. 15A is a central sectional view of a tee nut 121 according to a modification of the seventh embodiment of the present invention, and FIG. 15B is a central sectional view of a rivet 131 having a structure similar to that of tee nut 121 except for the absence of a female thread at the inner peripheral face of the shaft main portion.

FIG. 19A is a central sectional view of a tee nut 161 which is a further modification of the seventh embodiment of the present invention, and FIG. 19B is a central sectional view of a rivet 171 having a structure similar to that of tee nut 161 except for the absence of a female thread at the inner peripheral face of the shaft main portion.

DESCRIPTION OF THE PREFERRED EMBODIMENTS

Embodiments of the present invention will be described hereinafter with reference to the drawings.

First Embodiment

Figure 1A:
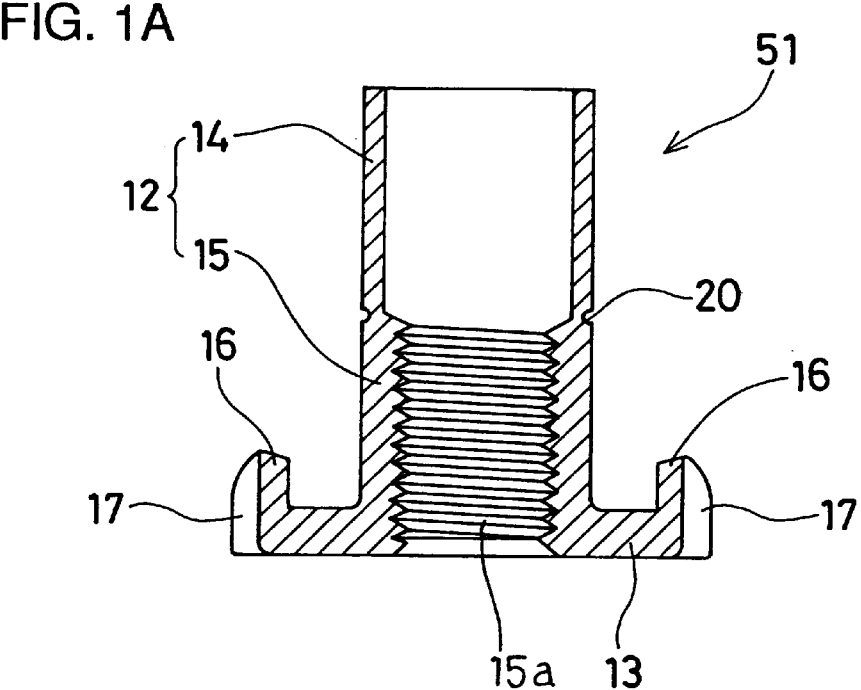
FIGS. 1A and 1B are a central vertical cross sectional view and a perspective view, respectively, of a tee nut 51 according to a first embodiment of the present invention.
Figure 1B:
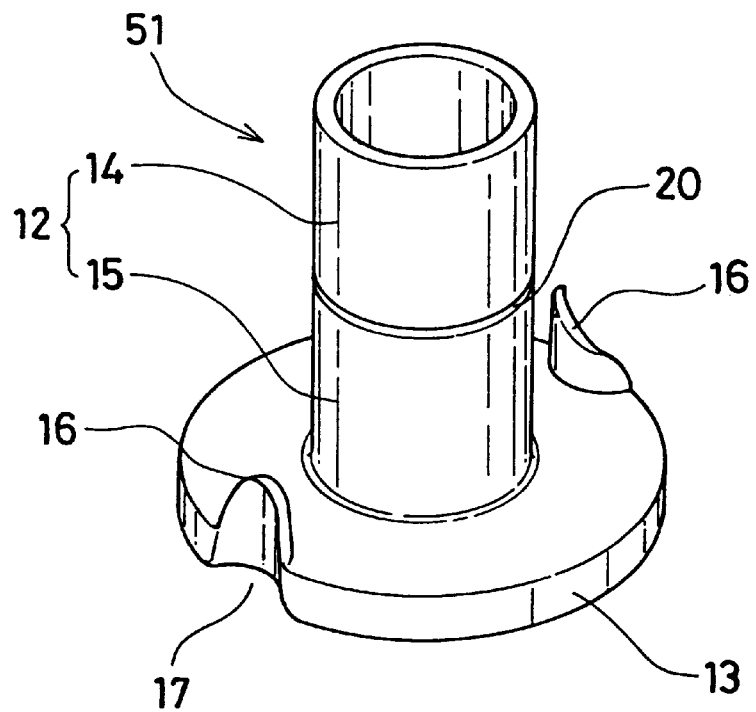
Figure 40A:
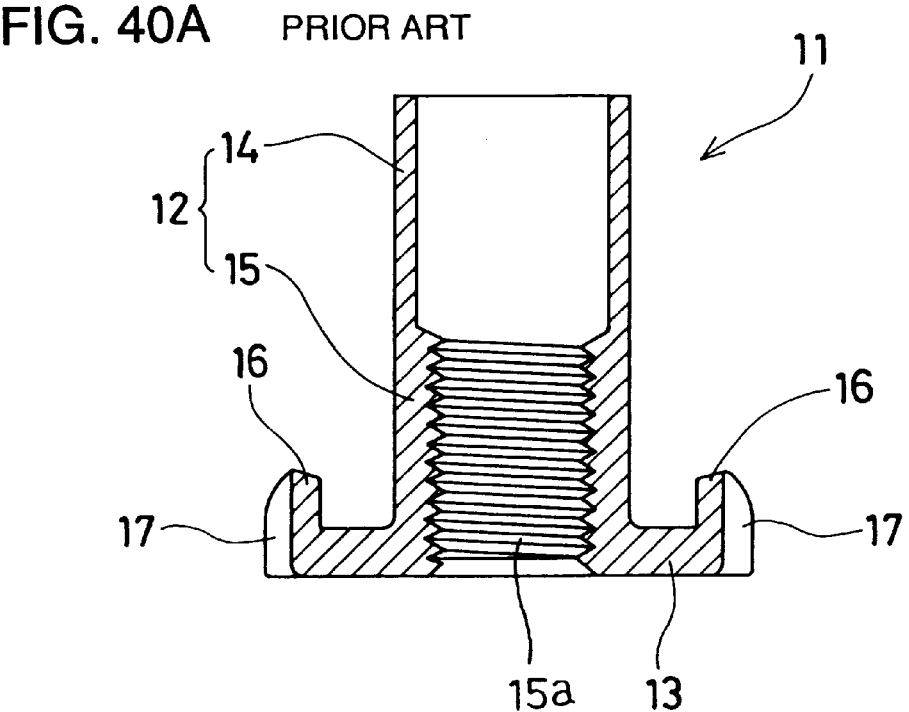
FIG. 40A is a central vertical sectional view of a conventional tee nut 11 having a round flange and a shaft portion with a thin wall at the portion to be caulked, disclosed in U.S. Pat. No. 5,238,344.
Figure 40B:
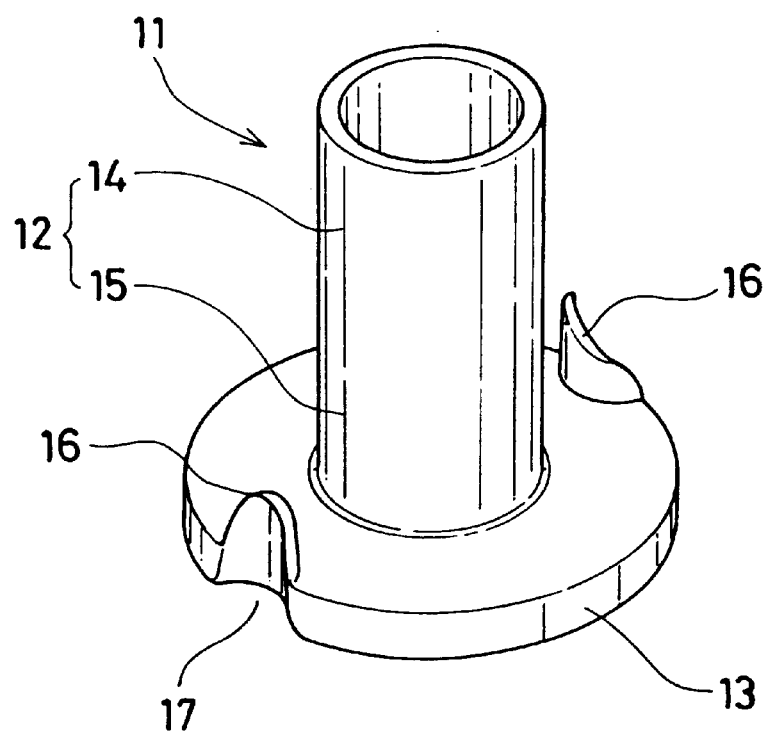
FIG. 40B is a perspective view of tee nut 11 of FIG. 40A.

A tee nut 51 according to a first embodiment of the present invention is shown in FIGS. 1A and 1B. The configuration of shaft portion 12 and flange portion 13 is basically similar to that of the conventional tee nut 11 described in U.S. Pat. No. 5,238,344 with reference to FIGS. 40A and 40B. Therefore, common elements have the same reference characters allotted, and detailed description thereof will not be repeated.

Figure 3A:
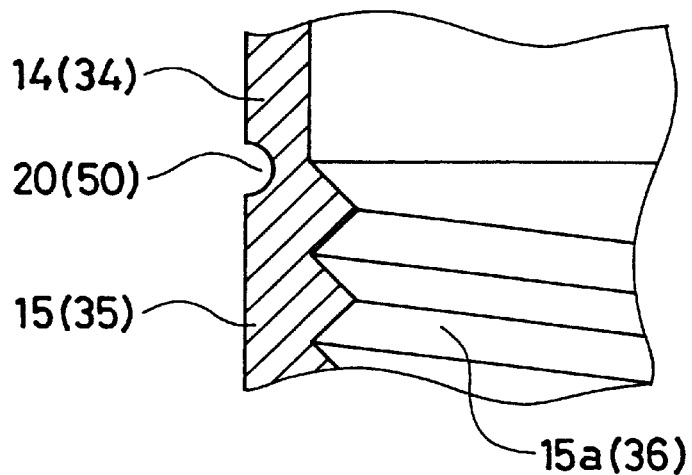
FIGS. 3A, 3B and 3C are enlarged cross sectional views of the neighborhood or vicinity of groove 20 (50) in respective embodiments of the present invention, showing a round U-shape, a V-shape and a squared U-shape cross section, respectively, of the grooves.
Figure 3B:
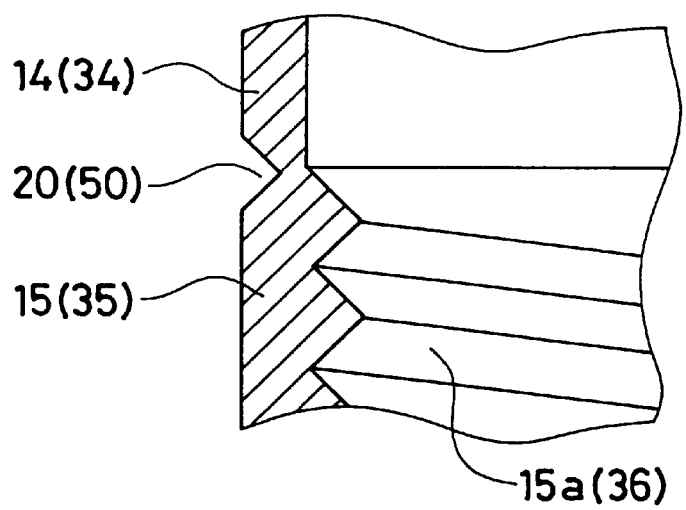
Figure 3C:
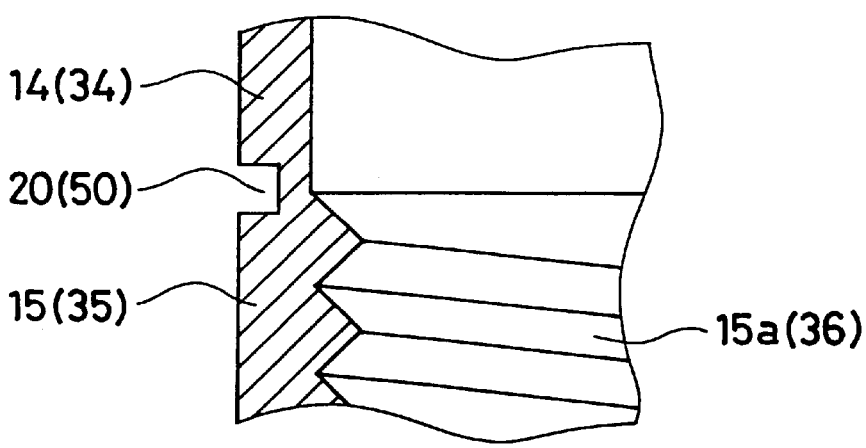

Tee nut 51 of the first embodiment differs from the conventional tee nut 11 in that an annular groove 20 is provided at the outside perimeter of shaft portion 12 at the interface between portion 14 to be caulked and female thread formation portion 15. Groove 20 has a cross section such as a round U shape, a V shape, or a squared U shape as shown in FIGS. 3A, 3B and 3C, respectively. The cross sectional shape of groove 20 is selected appropriately according to the material of the tee nut, the working property thereof, or mechanical property such as the tensile strength.

Figure 4A:
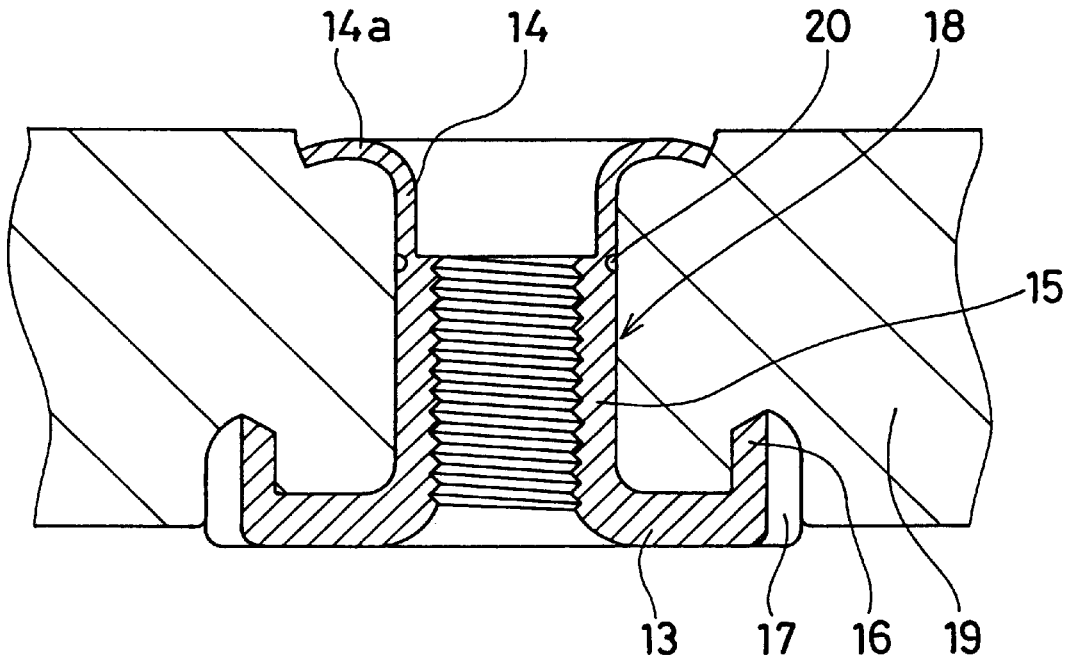
FIGS. 4A and 4B are sectional views of tee nut 51 of the first embodiment and tee nut 61 of the second embodiment, respectively, in the state where the tee nut is fitted in a through hole 18 in an object 19 of fixation in a caulked manner.

Tee nut 51 of the above structure is used as will be described with reference to FIG. 4A. Shaft portion 12 of tee nut 51 is inserted into a through hole 18 formed in an object of fixation 19 such as of resin or wood. In this state, portion 14 is subjected to a caulking process by a caulking device, whereby a caulked portion 14a is formed at one side surface of object 19. At the same time, pawl 16 digs into the other side surface of object 19, so that tee nut 51 is fixed securely to object 19.

In the product where object 19 of fixation becomes the constituent element, another member is connected to object 19 by threading a male screw into the female thread formation portion 15 to attain a fastened state with tee nut 51 in a caulked manner. The tightening force of the male screw mainly acts on female thread formation portion 15 as compressive stress when screwed into engagement with the female thread of female thread formation portion 15. Therefore, no great tensile stress will be generally generated at the shaft portion of the tee nut. Therefore, degradation in the fixation strength caused by reduction in the strength due to provision of a groove at the shaft portion will not occur.

The method of unfastening tee nut 51 from object 19 of fixation in recovering the object of fixation forming the product having tee nut 51 caulked therein, subsequent to its period of usage or at the elapse of the lifetime thereof, for recycling purposes will be described hereinafter with reference to FIGS. 5A and 5B.

Figure 5A:
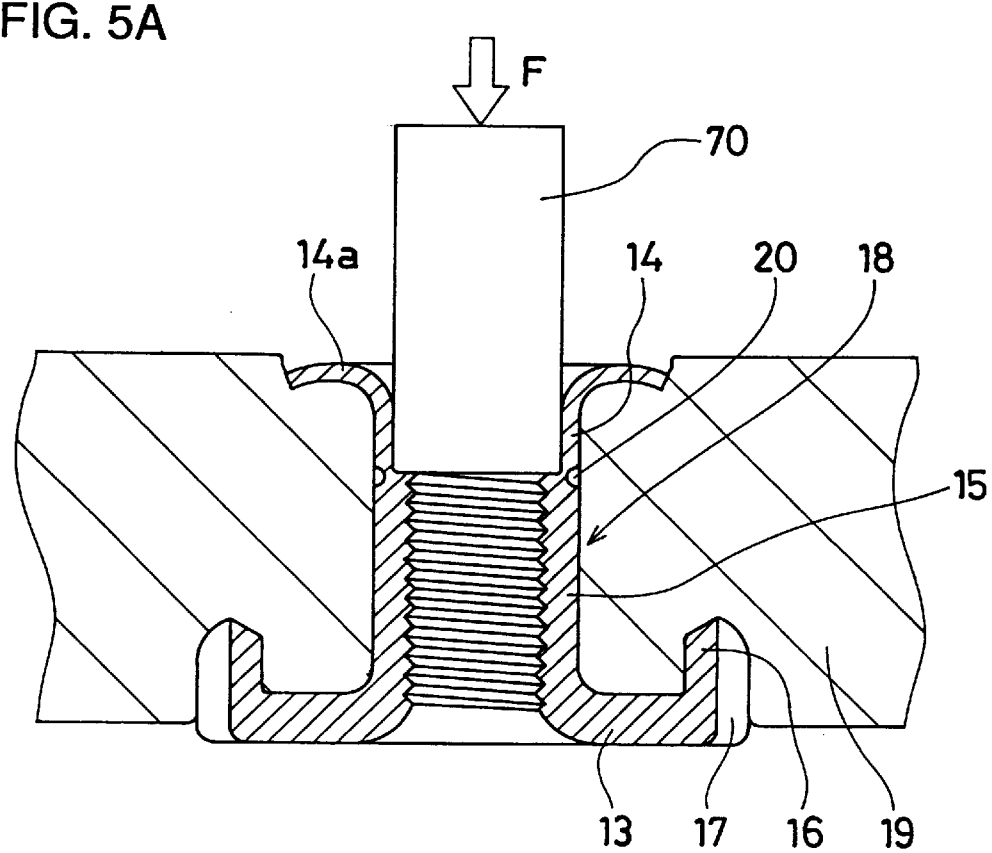
FIGS. 5A and 5B are sectional views of tee nut 51 of the first embodiment fastened to an object 19 of fixation in a caulked manner, wherein the former shows the state of a jig 70 driven in from the side of a caulked portion 14 and the latter shows the state of tee nut 51 divided into upper and lower pieces by the fracture at a groove 20 caused by urging force F of jig 70, according to a method of removing tee nut from object 19 of fixation.

As shown in FIG. 5A, the lower end side of a columnar jig 70 having a size slightly greater than the inner diameter of portion 14 of tee nut 51 prior to caulking is press fitted from the caulk portion 14a side of tee nut 51. The upper end of jig 70 is hit with a hammer or the like in a state where the lower end of jig 70 abuts against the stepped portion at the interface between portion 14 and female thread formation portion 15. As a result, force F shown in FIG. 5A is exerted. By this force F, stress concentration is developed at the most thin-walled region at the perimeter of the shaft portion where groove 20 is formed at the interface between portion 14 and female thread formation portion 15. The generated tensile stress of high intensity causes fracture at annular groove 20. As a result, tee nut 51 is separated into two parts as shown in FIG. 5B. The lower end of jig 70 pushes down the lower half part of tee nut 51 including female thread formation portion 15 and flange portion 13, whereby the lower part is detached from object 19 of fixation. The upper half part of tee nut 51 including caulk portion 14a is removed from through hole 18 of object 19 in a state fitted to jig 70 as jig 70 is pulled out upwards.

According to the present embodiment, tee nut 51 can easily be disengaged from object 19 of fixation. At the elapse of the period of usage of the product having tee nut 51 caulked therein, separation and recovery of the object of fixation forming the product can be facilitated to promote recycling of object 19 of fixation.

Since annular groove 20 is provided at the interface between portion 14 to be caulked and female thread formation portion 15 in tee nut 51 of the present embodiment, the above-described method of detachment using jig 70 can be employed even when substantially the entire portion 14 to be caulked is bent. Since the most thin-walled portion is formed at the stepped portion at the interface between the portion to be caulked and the female thread formation portion, stress concentration at that area becomes more significant in detaching the tee nut from the object of fixation. Therefore, fracture is more readily generated to facilitate the separation operation for recovery in the recycling stage. The need of recovery for recycling purposes is greater when object 19 of fixation is formed of plastic.

Second Embodiment

Figure 2A:
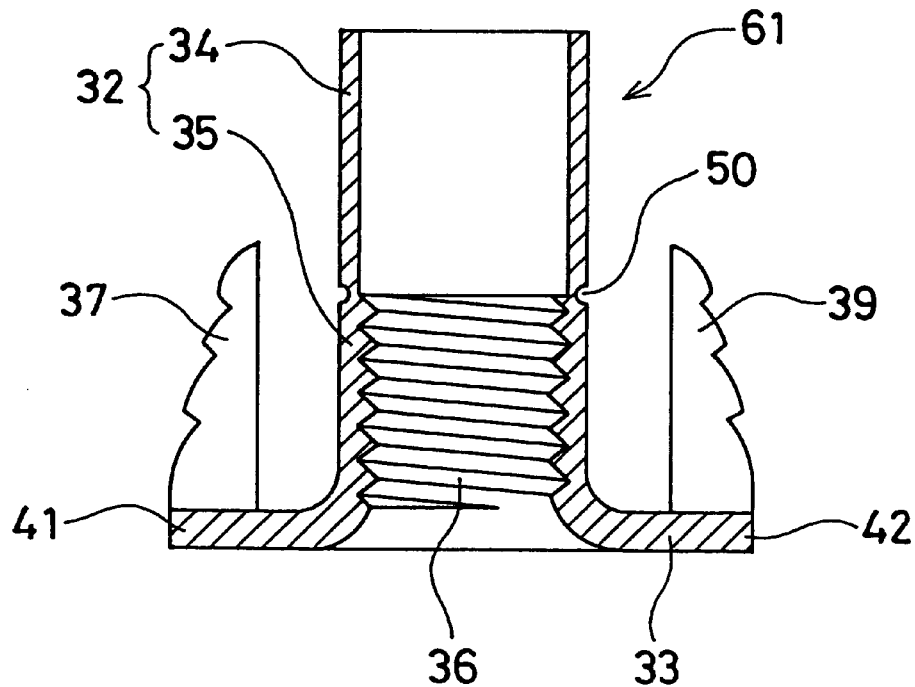
FIGS. 2A and 2B are a central vertical cross sectional view and a perspective view, respectively, of a tee nut 61 according to a second embodiment of the present invention.
Figure 2B:
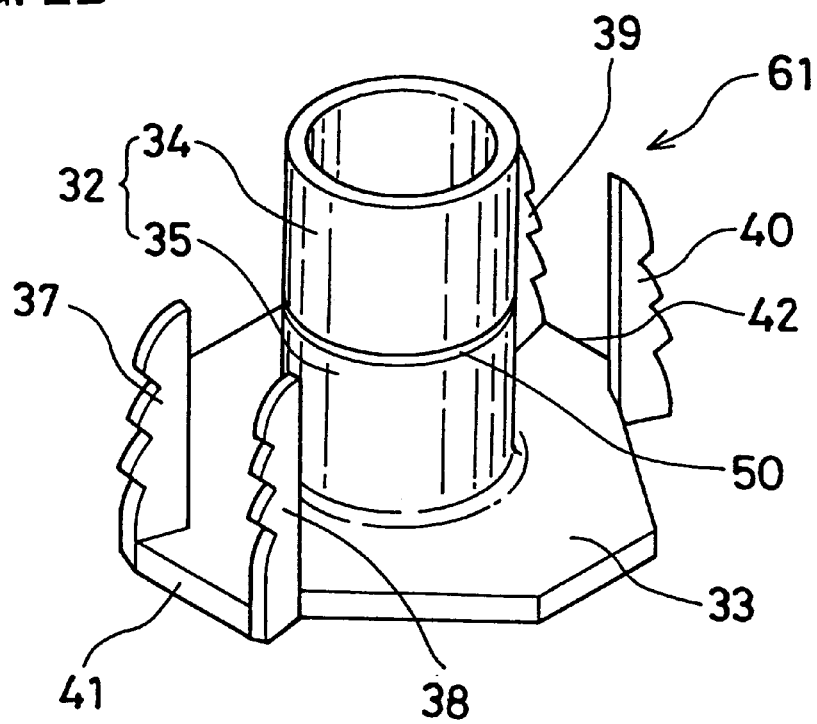
Figure 41A:
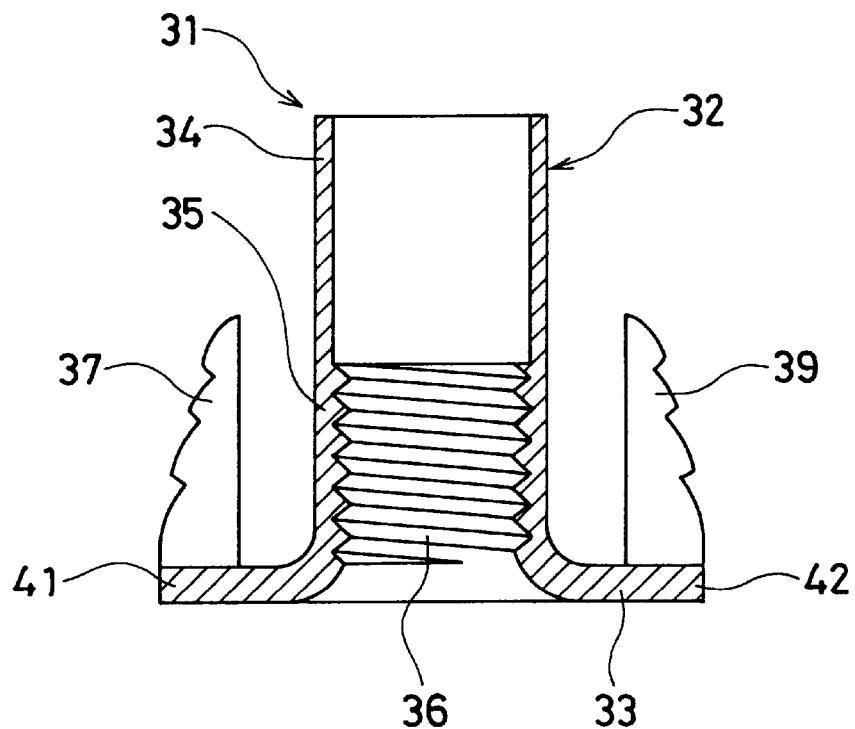
FIG. 41A is a perspective view of a conventional tee nut 31 having an octagonal flange and a shaft portion with a thin wall at the portion to be caulked, disclosed in U.S. Pat. No. 5,348,432.
Figure 41B:
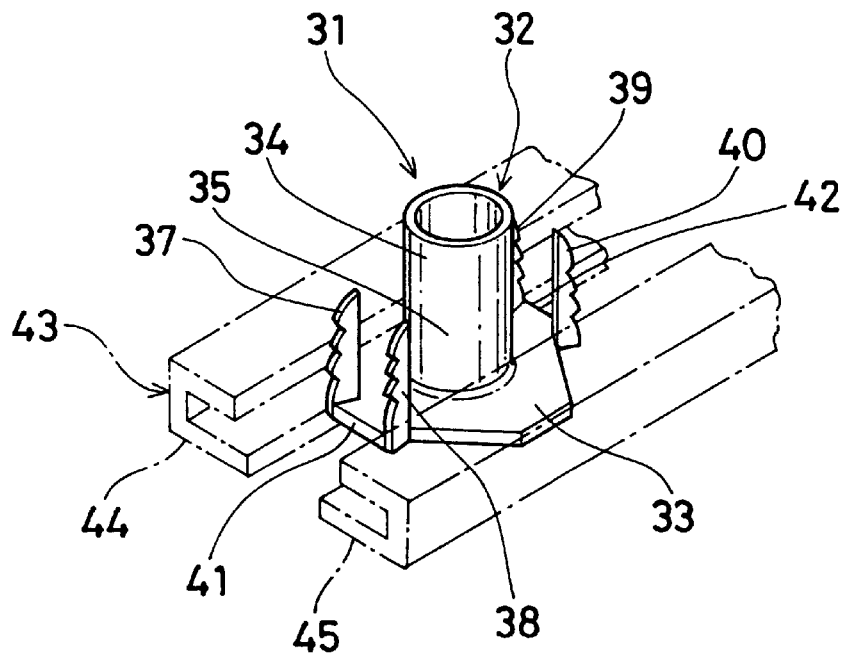
FIG. 41B is a central vertical cross section view of tee nut 31 of FIG. 41A.
Figure 42A:
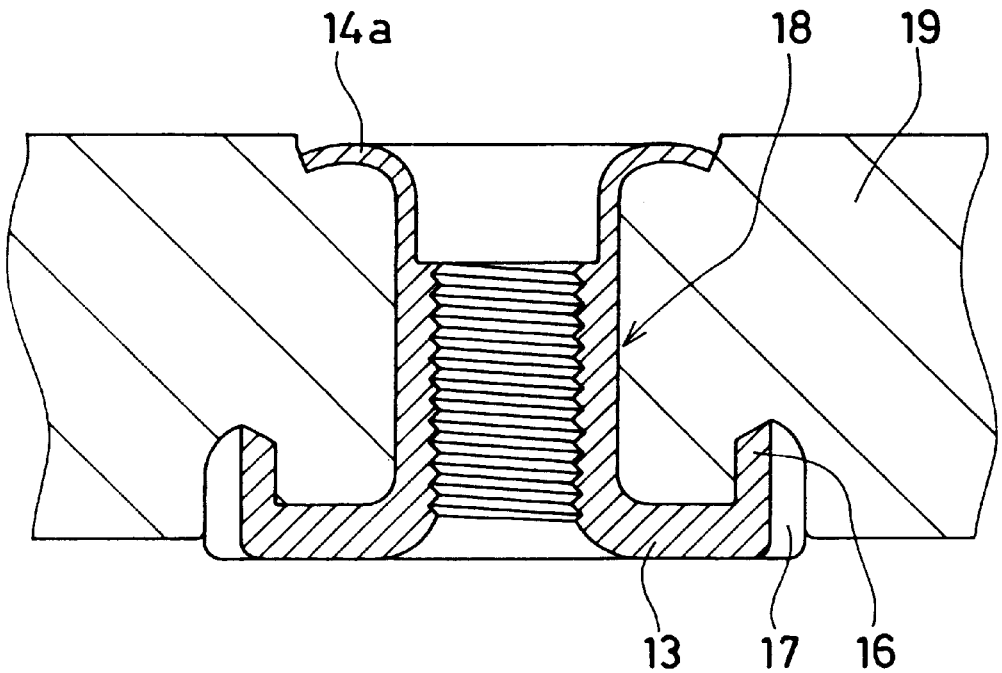
FIG. 42A is a sectional view of conventional tee nut 11 of FIGS. 40A and 40B inserted and fastened to object 19 of fixation in a caulked state.
Figure 42B:
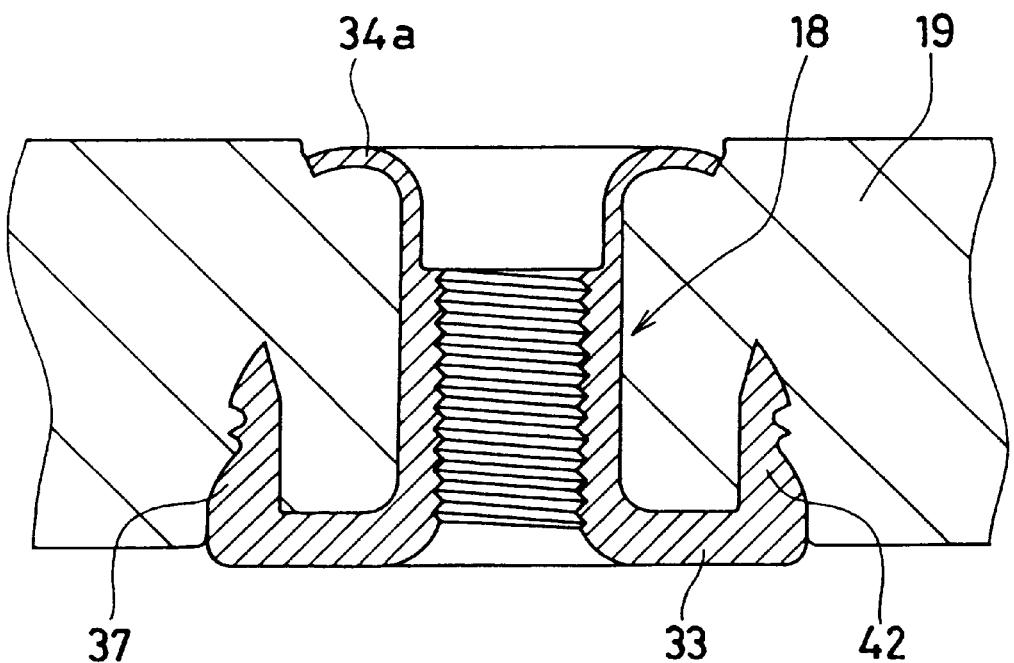
FIG. 42B is a sectional view of conventional tee nut 31 of FIGS. 41A and 41B inserted and fastened to object 19 of fixation in a caulked state.

A tee nut 61 according to a second embodiment of the present invention is shown in FIGS. 2A and 2B. The configuration of shaft portion 32 and flange portion 33 are basically similar to that of conventional tee nut 31 of FIGS. 41A and 41B corresponding to U.S. Pat. No. 5,348,432. Therefore, similar elements have the same reference characters allotted, and detailed description thereof will not be repeated.

Tee nut 61 of the second embodiment differs from conventional tee nut 31 in that an annular groove 50 is formed around the entire outer perimeter of a shaft portion 32 at the interface between a portion 34 to be caulked and a female thread formation portion 35. Tee nut 61 is similar in structure to tee nut 51 of the first embodiment for the exception that a flange portion 33 has substantially an octagonal shape, and that a first pair of pawls 37 and 38 and a second pair of pawls 39 and 40 are provided extending from the first end towards the second end at the outer peripheral portion of flange portion 33 and arranged radially opposite to each other (the so-called "hopper feed tee nut"). Groove 50 has a transverse cross section similar to that of groove 20, as shown in FIGS. 3A–3C. The cross sectional shape of a round U shape, a V shape, or a squared U shape is appropriately selected according to the material and working property of the tee nut, or the mechanical property such as tensile strength 6.

Figure 4B:
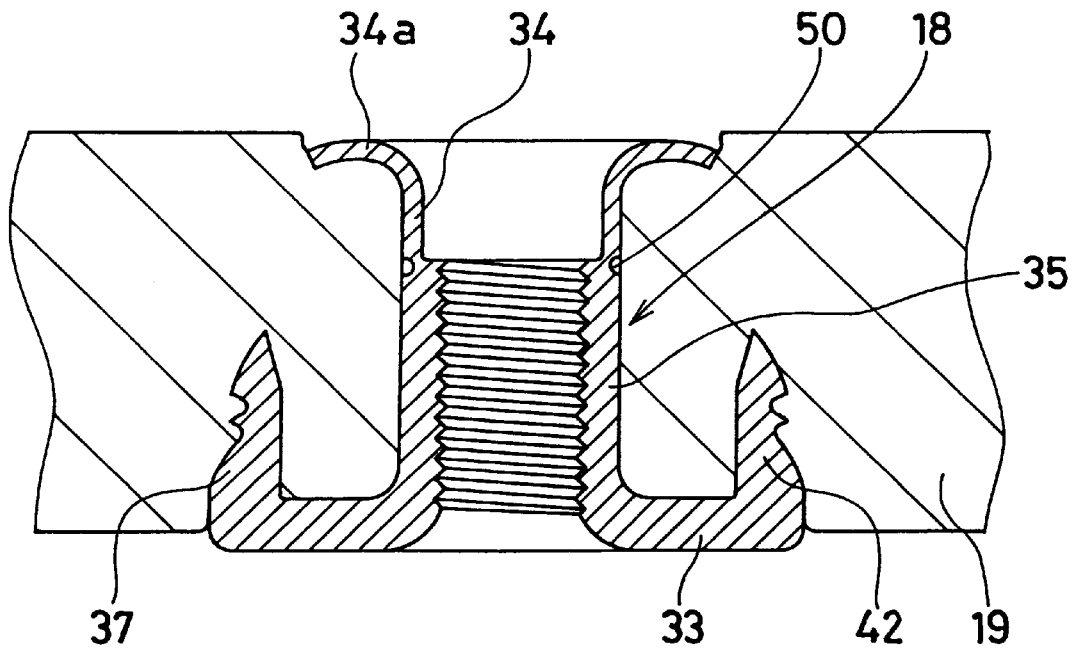

The fixation by caulking relative to through hole 18 of object 19 of fixation is similar to that of tee nut 11 of the first embodiment as shown in FIG. 4B, provided that the anti-disengage effect is more secure by virtue of the two pair of pawls 37, 38 and 39, 40 digging further deeper into the bottom surface of object 19 of fixation. Therefore, the method using jig 70 can be employed in removing tee nut 61 from object 19 for recycling purposes, as in the first embodiment corresponding to FIGS. 5A and 5B.

Third Embodiment

The location of grooves 20 and 50 is not limited to the site at the outer perimeter of shaft portions 12 and 32 in the proximity of the interface between portions 14 and 34 to be caulked and female thread formation portions 15 and 35 as in tee nuts 51 and 61 of the previous embodiments. More specifically, when only a local area of portions 14, 34 at the open end side is bent by caulking as shown in the chain line with two dots in FIG. 6A, grooves 20, 50 can be provided a little toward the caulk portion 14, 34 relative to the interface between portions 14, 34 to be caulked and female thread formation portions 15 and 35. The method described with reference to FIGS. 5A and 5B can be employed to remove the tee nut from object 19 of fixation even in the case where the groove is formed at such a location.

Figure 6A:
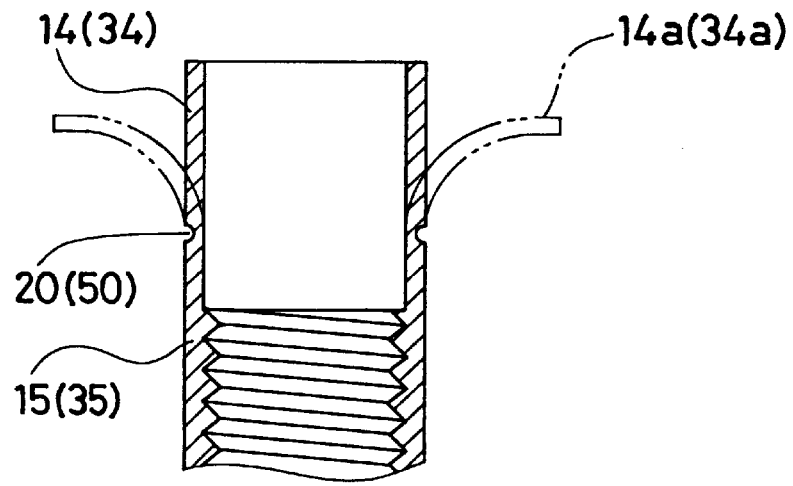
FIG. 6A is a partial sectional view of a tee nut according to a third embodiment of the present invention showing the manner of formation of groove 20 (50)
Figure 6B:
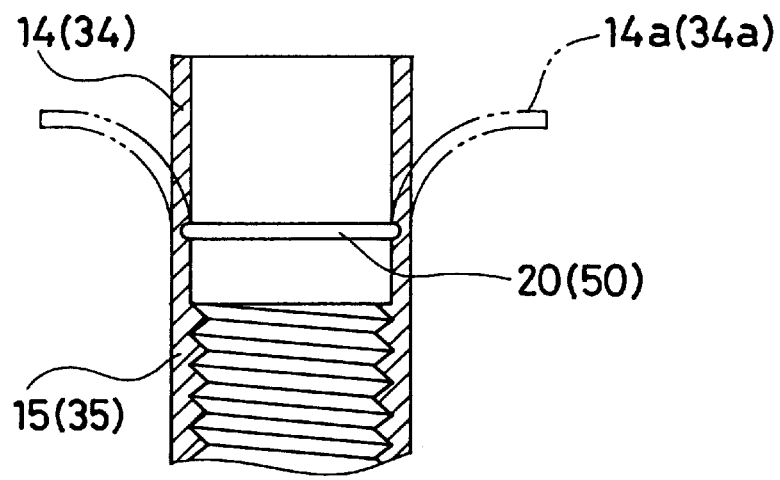
FIGS. 6B and 6C show two modifications of the tee nut of the third embodiment.
Figure 6C:
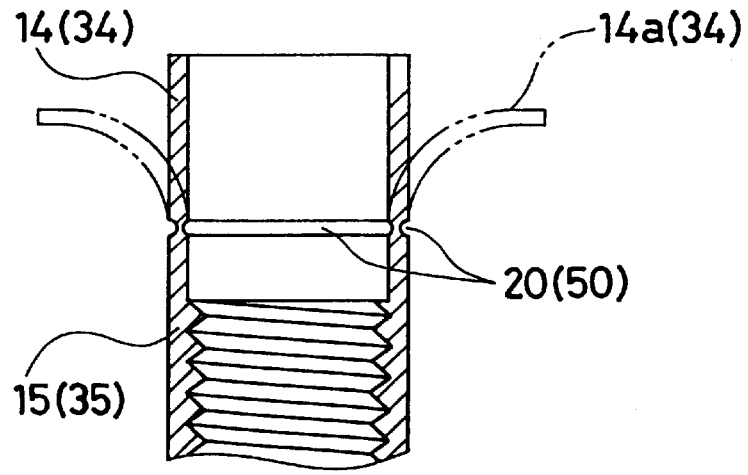

In the case where the groove is provided at portion 14 to be caulked, a similar effect can be exhibited by providing the groove at the inner perimeter of shaft portions 12 and 32 as shown in FIG. 6B, or at both the inner and outer perimeters of shaft portions 12 and 32 as shown in FIG. 6C.

Fourth Embodiment

Figure 7A:
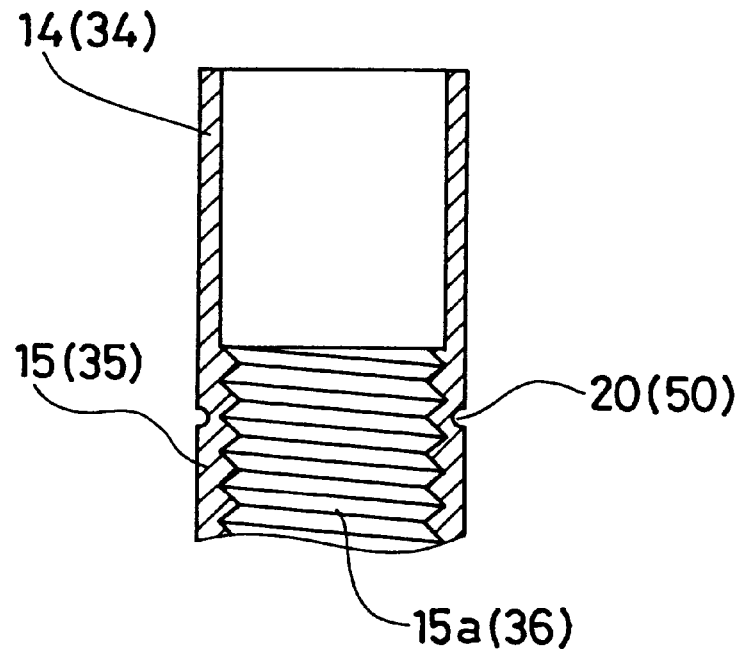
FIG. 7A is a partial sectional view of a tee nut according to a fourth embodiment of the present invention showing the manner of formation of groove 20 (50)

In the above embodiments, annular grooves 20 and 50 are provided in the proximity of the interface between portions 13, 34 to be caulked and female thread formation portions 15, 35, or at the outer perimeter of shaft portions 12 and 32 corresponding to the region of portions 14, 34 to be caulked. The present invention is not limited to this location, and annular grooves 20, 50 can be provided at the outer perimeter of female thread formation portions 15 and 35 as shown in FIGS. 7A.

Figure 5B:
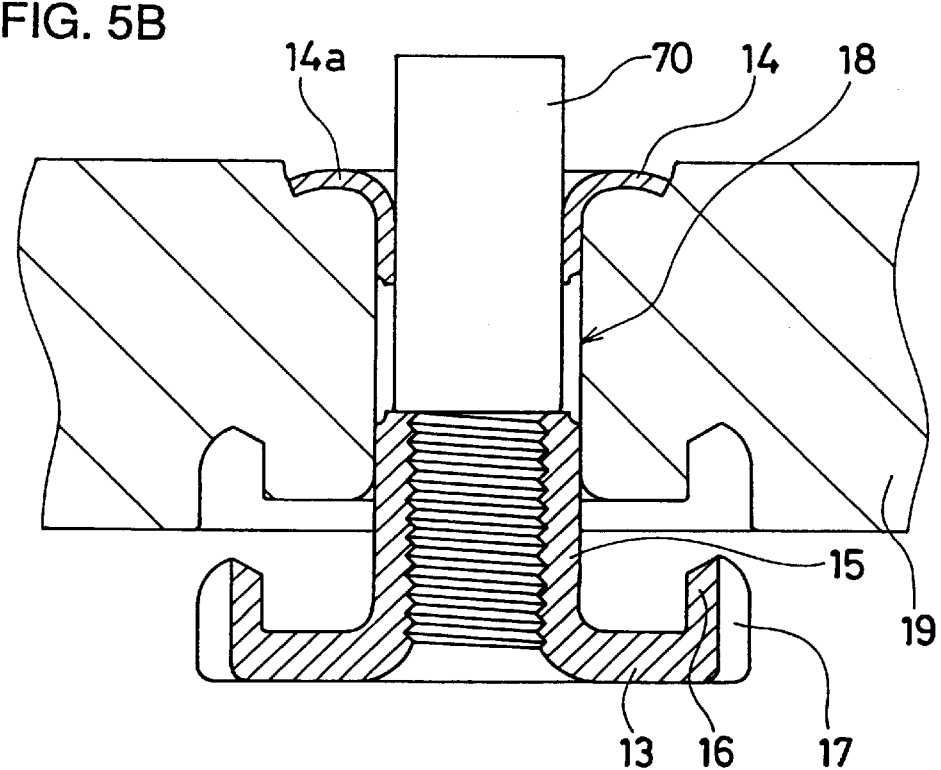

When grooves 20, 50 are provided at the outer perimeter of female thread formation portions 15, 35, the detaching method shown in FIGS. 5A and 5B cannot be employed. In this case, a wedge-like jig is inserted at the abutment between caulk portions 14a, 34a or flange portions 13, 33 and the face of object of fixation 19 with the tee nut inserted and caulked relative to object 19. Tensile stress is exerted at the shaft portion to cause fracture at the groove. As a result, the tee nut is broken into two parts to allow detachment from object 19 of fixation.

Figure 7B:
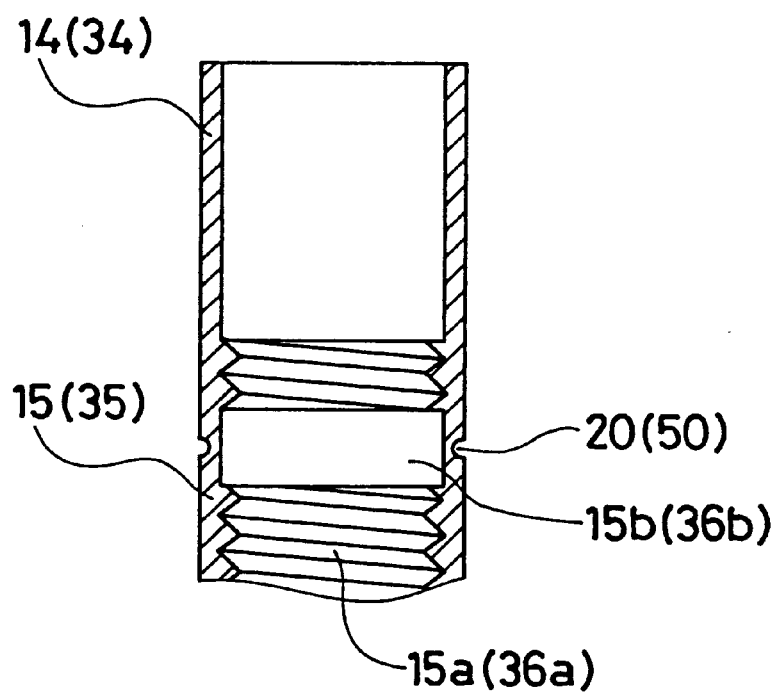
FIG. 7B is a sectional view of a modification of the tee nut of the fourth embodiment.

As a modification of the present embodiment where grooves 20, 50 are provided at the outer perimeter of female thread formation portions 15, 35, a structure can be provided having relatively thin-walled regions 15b, 36b formed locally at the inner peripheral face of female thread formation portions 15, 35 as shown in FIG. 7B. Thin-walled regions 15b, 36b are recessed with a predetermined width in the extending direction of the shaft portion and do not have an internally threaded surface. Annular grooves 20, 50 can be formed at the outer peripheral surface of female thread formation portions 15, 35 corresponding to the area of thin-walled regions 15b, 36b. In this case, the tee nut can easily be detached at the time of recovery for recycling purposes since the wall corresponding to the portion where relatively shallow and thin grooves 20, 50 are provided can be made thin enough.

In the cases of the third and fourth embodiments, the shape of the transverse cross section of the groove can be selected appropriately as shown in FIGS. 3A, 3B and 3C. Also, the configuration of flanges 13 and 33 is not limited to the circular or octagonal shape as in the above embodiments. The technical concept of the present invention of facilitating separation and detachment for recycling purposes by forming grooves 20, 50 in shaft portions 12, 32 is similarly applicable even when the flange takes another shape.

Fifth Embodiment

Figure 8A:
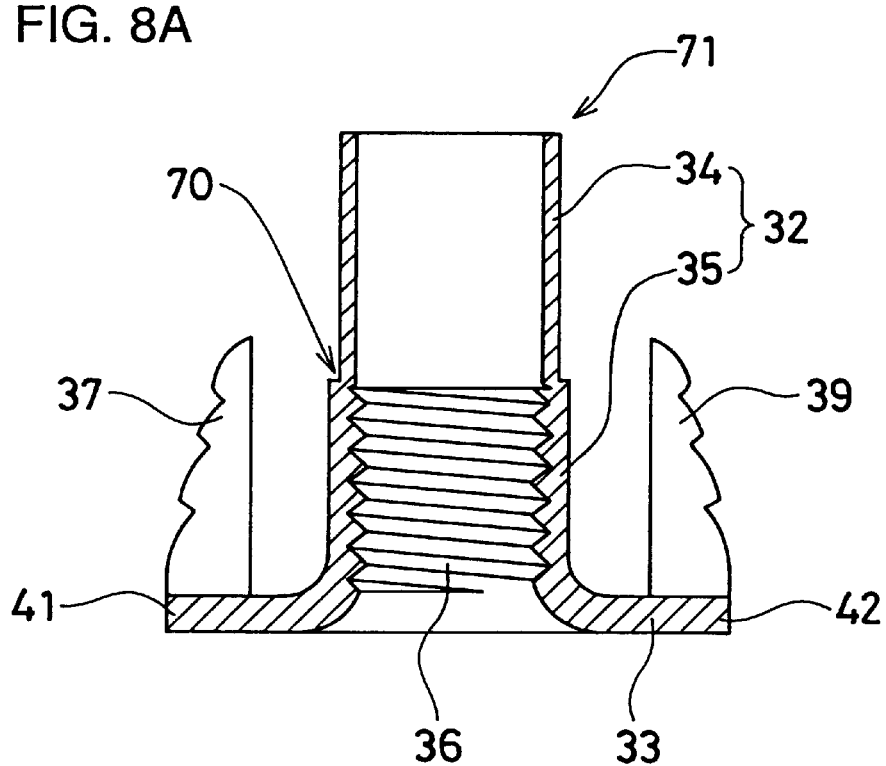
FIG. 8A is a partial sectional view showing the manner of formation of an annular thin-walled portion 70 of a tee nut according to a fifth embodiment of the present invention.
Figure 8B:
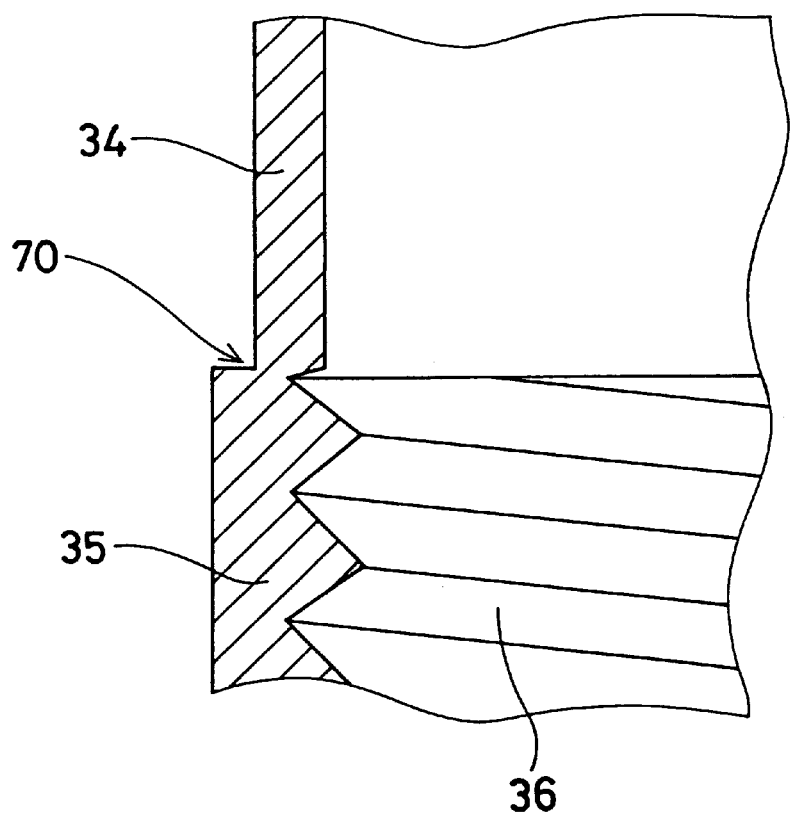
FIG. 8B is an enlarged sectional view of the neighborhood of annular thin-walled portion 70 of the tee nut of FIG. 8A.

In the above described embodiments, annular thin-walled portions are locally provided by forming annular grooves 20, 50 in shaft portions 12, 32. An annular thin-walled portion can be also formed as shown in FIGS. 8A and 8B by narrowing down portion 34 to be caulked to be reduced in diameter so that shaft portion 32 is drawn radially. As a result, an annular thin-walled portion 70 around the complete perimeter at the interface between portion 34 to be caulked and female thread formation portion 35 is provided.

By inserting a wedge-like jig to the abutment between the portion to be caulked or the flange portion and the face of the object of fixation in a caulked state, tensile stress is exerted at the shaft portion to cause fracture at the annular thin-walled portion. The tee nut is separated into two parts and can be removed from the object of fixation.

In the structure of FIGS. 8A and 8B, shaft portion 32 is drawn radially by narrowing down the diameter of portion 34 to be caulked. In an opposite manner, shaft portion 32 can be drawn radially by forming portion 34 to be caulked so as to be increased in diameter. By forming portion 34 to be caulked so as to have a smaller or larger diameter relative to female thread formation portion 35, an annular thin-walled portion of shaft portion 32 drawn radially can be formed completely round the perimeter at the interface between portion 34 to be caulked and female thread formation portion 35.

Sixth Embodiment

Figure 9A:
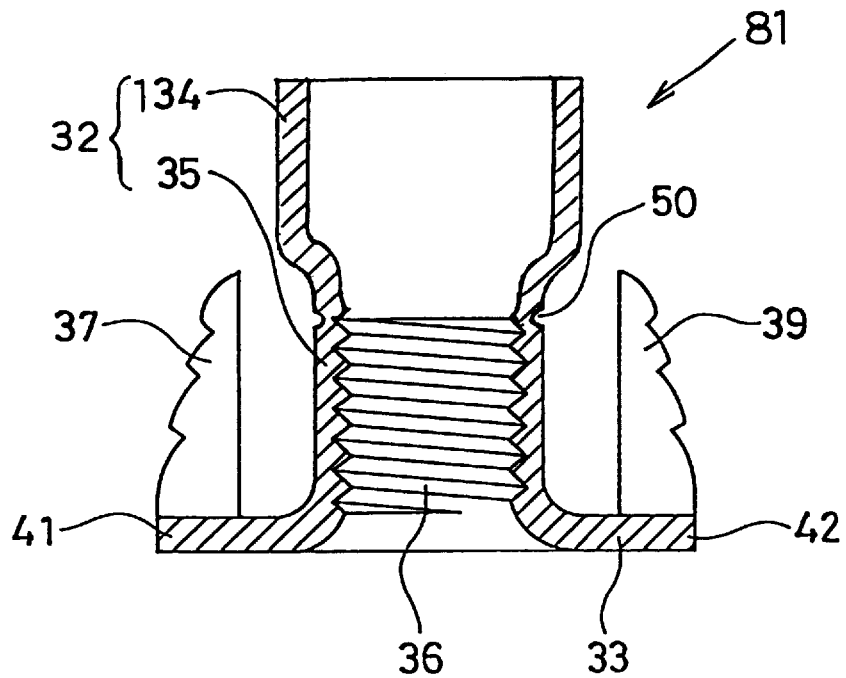
FIG. 9A is a central sectional view of a tee nut 81 according to a sixth embodiment of the present invention.

The structure of a tee nut 81 according to a sixth embodiment of the present invention will be described hereinafter with reference to FIG. 9A. In FIG. 9A, elements identical to or corresponding to tee nut 61 of the second embodiment of FIG. 2A have the same reference characters allotted, and their description will not be repeated.

The present embodiment is an application of the present invention to the tee nut disclosed in U.S. Pat. No. 5,618,144. Tee nut 81 of the present embodiment is common to the tee nut of the above-described embodiments in that it is the so-called rivet type tee nut. The difference lies in the configuration of the portion to be caulked. More specifically, tee nut 81 of the present embodiment has a portion 134 to be caulked of shaft portion 32, as shown in FIG. 9A. Portion 134 has an inner diameter and an outer diameter greater than the inner diameter and the outer diameter, respectively, of female screw formation portion 35.

At the circumference of shaft portion 32 in the proximity of the interface between portion 134 to be caulked and female thread formation portion 35, an annular groove 50 similar to that of the second embodiment is formed around the entire perimeter. The object, specific configuration, and detachment for recycling are similar to those described in association with annular groove 50 of the second embodiment.

Figure 9B:
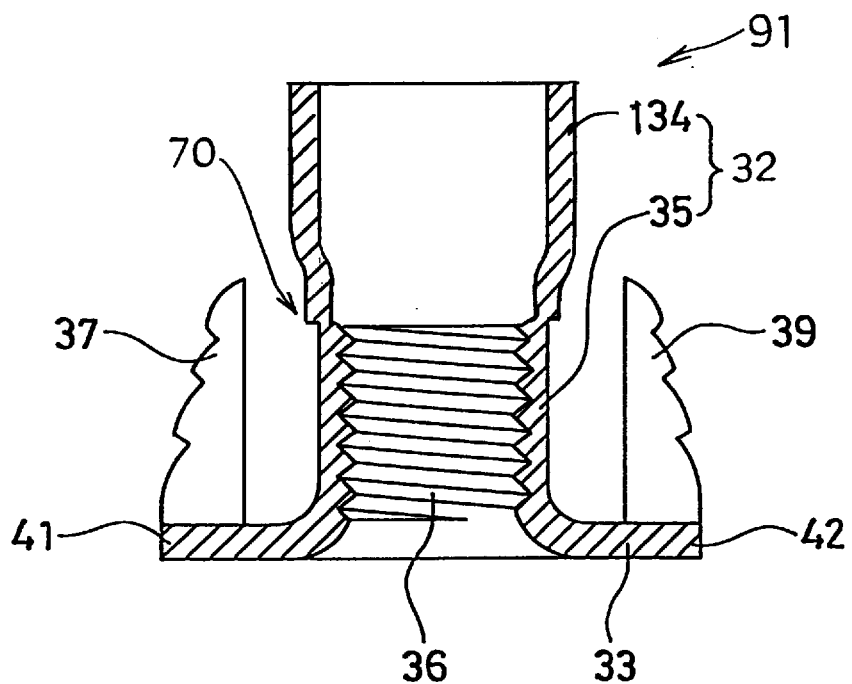
FIG. 9B is a central sectional view of a tee nut 91 which is a modification of the sixth embodiment.

FIG. 9B shows a modification of the present embodiment. This tee nut 91 is similar to tee nut 81 of FIG. 9A in that portion 134 to be caulked of shaft portion 32 has an inner diameter and an outer diameter greater than the inner diameter and the outer diameter, respectively, of female thread formation portion 35. Tee nut 91 differs from tee nut 81 in that an annular thin-walled portion 70 similar to that of the fifth embodiment is provided instead of annular groove 50 at the outer circumference of shaft portion 32 in the proximity of the interface between portion 134 to be caulked and female thread formation portion 35.

Annular thin-walled portion 70 of tee nut 91 can be formed by increasing the inner and outer diameter of portion 34 to be caulked and drawing shaft portion 32 in the direction of the radius. The advantage of including annular thin-walled portion 70 is similar to that of annular thin-walled portion 70 of tee nut 71 described in the fifth embodiment.

The above first to sixth embodiments show a structure in which the present invention is applied to a tee nut having a female thread formed at the inner peripheral face of the shaft portion. The present invention can be applied in any of these embodiments with a rivet, absent of the formation of a female thread at the inner peripheral surface of the shaft portion excluding the portion to be caulked.

Seventh Embodiment

Figure 10A:
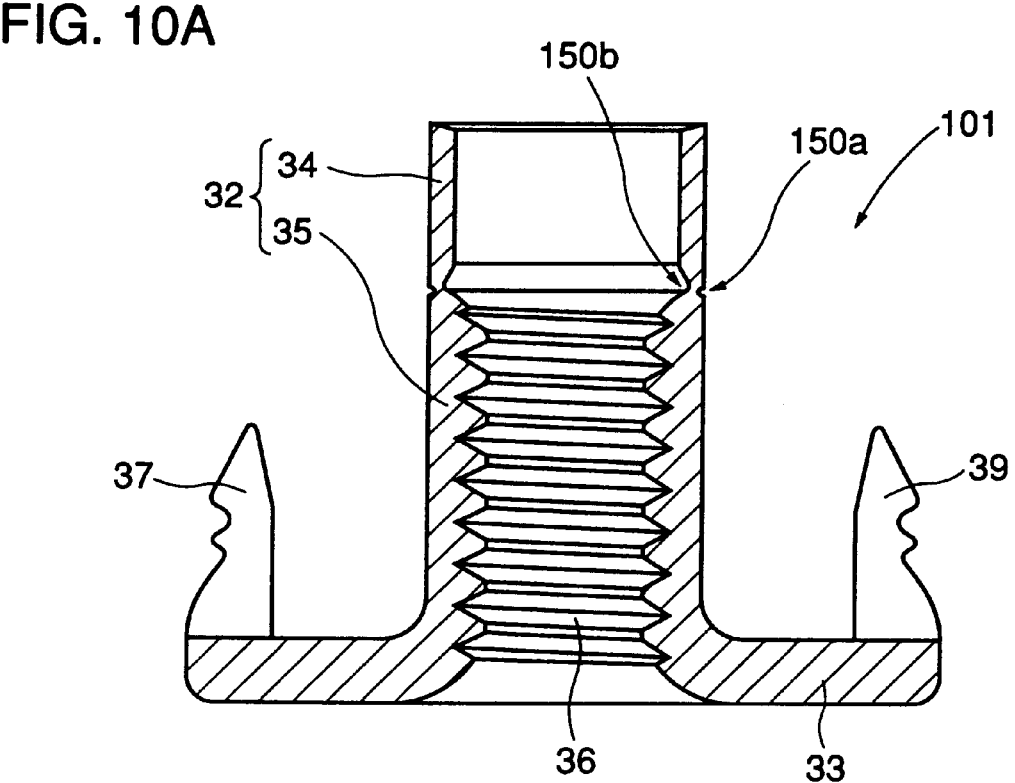
FIG. 10A is a central sectional view of a tee nut 101 according to a seventh embodiment of the present invention.

A structure of a tee nut 101 according to a seventh embodiment of the present invention will be described with reference to FIG. 10A. In tee nut 101 of the present embodiment shown in FIG. 10A, the configuration shaft portion 32 and flange portion 33 is basically similar to those of tee nut 61 of the second embodiment. Therefore, in FIG. 10A, components similar or corresponding to those of tee nut 61 of the second embodiment have the same reference characters of FIG. 2A allotted, and their description will not be repeated.

Tee nut 101 of the present embodiment differs from tee nut 61 of the second embodiment in that an annular groove 150b of substantially a V shape with a transverse cross section greater than that of annular groove 150a is also provided at the inner perimeter of shaft portion 32 at a site substantially opposite to annular groove 150a, in addition to annular groove 150a provided at the outer perimeter of shaft portion 32. Annular groove 150b is formed at the interface between portion 34 to be caulked and female thread formation portion 35. The wall of shaft portion 32 is thinnest at the region where annular groove 150a is located opposite to annular groove 150b. In detaching the tee nut from the panel material to which the tee nut is secured in a caulked manner by a method similar to that shown in FIGS. 5A and 5B, shaft portion 32 is broken at this region where the wall is thinnest to be separated. Thus, recovery is facilitated.

Figure 10B:
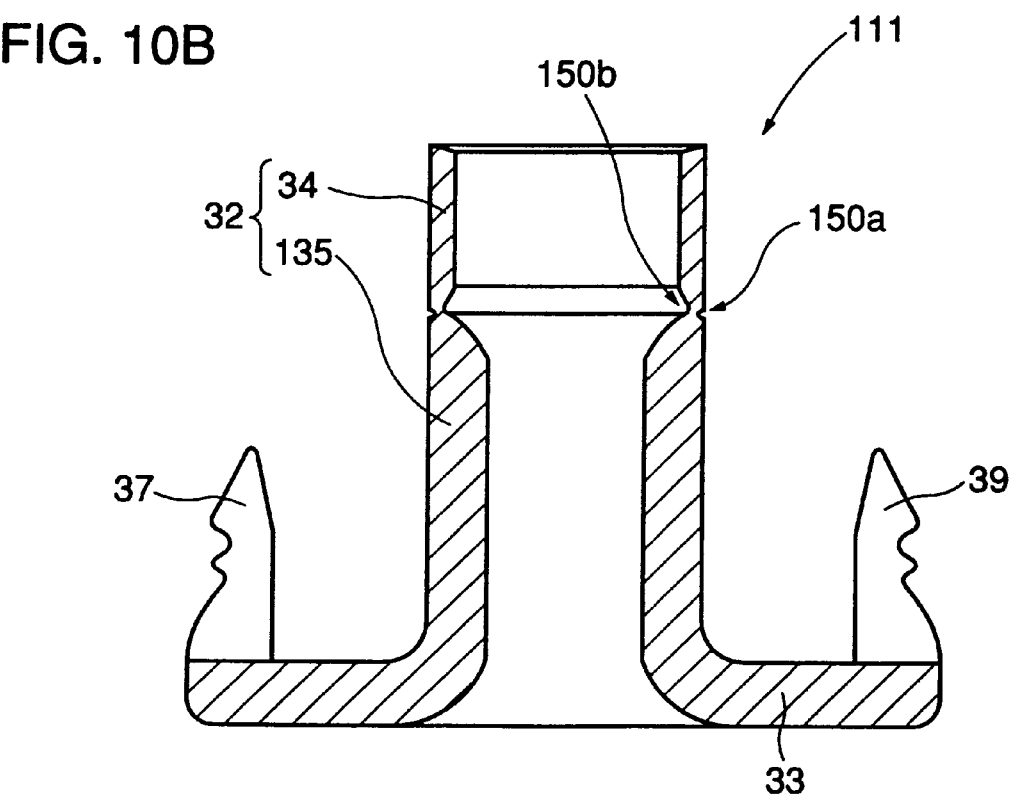
FIG. 10B is a central sectional view of a rivet 111 having a structure similar to that of tee nut 101 except for the absence of a female thread at the inner peripheral face of the shaft main portion.

FIG. 10B shows a vertical sectional view of a rivet 111 having a structure similar to that of tee nut 101, provided that a female thread is not formed at the inner peripheral face of the main body 135 of the shaft portion corresponding to the female thread formation portion 35 of tee nut 101. This rivet 111 can be used as a reinforced bore through which a bolt is passed in fastening a plurality of metal layered sheets with a bolt. Rivet 111 of this structure is used in a manner fixed in a hole of the plate in a caulked manner, similar to tee nut 101. Detachment is effected by fracture similar to the method shown in FIGS. 5A and 5B to facilitate recovery.

The method of forming portion 34 to be caulked and annular grooves 150a and 150b in a metallic fastening member having a structure such as tee nut 101 or rivet 111 will be described hereinafter with reference to FIGS. 11–14C.

Fabrication of tee nut 101 or rivet 11 is set forth in the following. Referring to FIG. 11, a longitudinal strip of metal plate 201 formed of, for example, iron material, is prepared. Metal plate 201 is sequentially moved forward in an intermittent manner at a predetermined pitch in the longitudinal direction indicated by arrow 202 to be subjected to a predetermined work step at respective stations.

First, a cut 204 is formed around a portion 203 to determine the position of the region corresponding to flange portion 33 on metal plate 201. In order to maintain the state in which portion 203 is held by the other portion of metal plate 201 during the subsequent various processes applied on portion 203, cut 204 is not formed around the entire circumference of portion 203. Cut 204 is provided so that a deformable joining portion is formed between a plurality of positions at the circumference of portion 203 and the remaining portion of metal panel 201.

A deep drawing process is applied on metal plate 201 to expand the central area of portion 203 that will become a flange portion 33 towards the lower main surface of metal plate 201. This deep drawing work is carried out over a plurality of stages. At working station [a] shown in FIG. 11 which is the final stage, an expansion 205 which becomes shaft portion 32 is formed. Since this expansion 205 is formed of a partial portion 203 surrounded by cut 204, the width of cut 204 is expanded.

Following the provision of a through hole 206 at the leading end of expansion 205 at working station [b], a relatively thin-wall leading end portion 221 is formed corresponding to portion 34 to be caulked at working stations [c]–[g] of FIG. 11. The details of the process applied at working stations [a]–[c] and working stations [d]–[g] are shown in FIGS. 12 and 13, respectively, in an enlarged manner.

Figure 12:
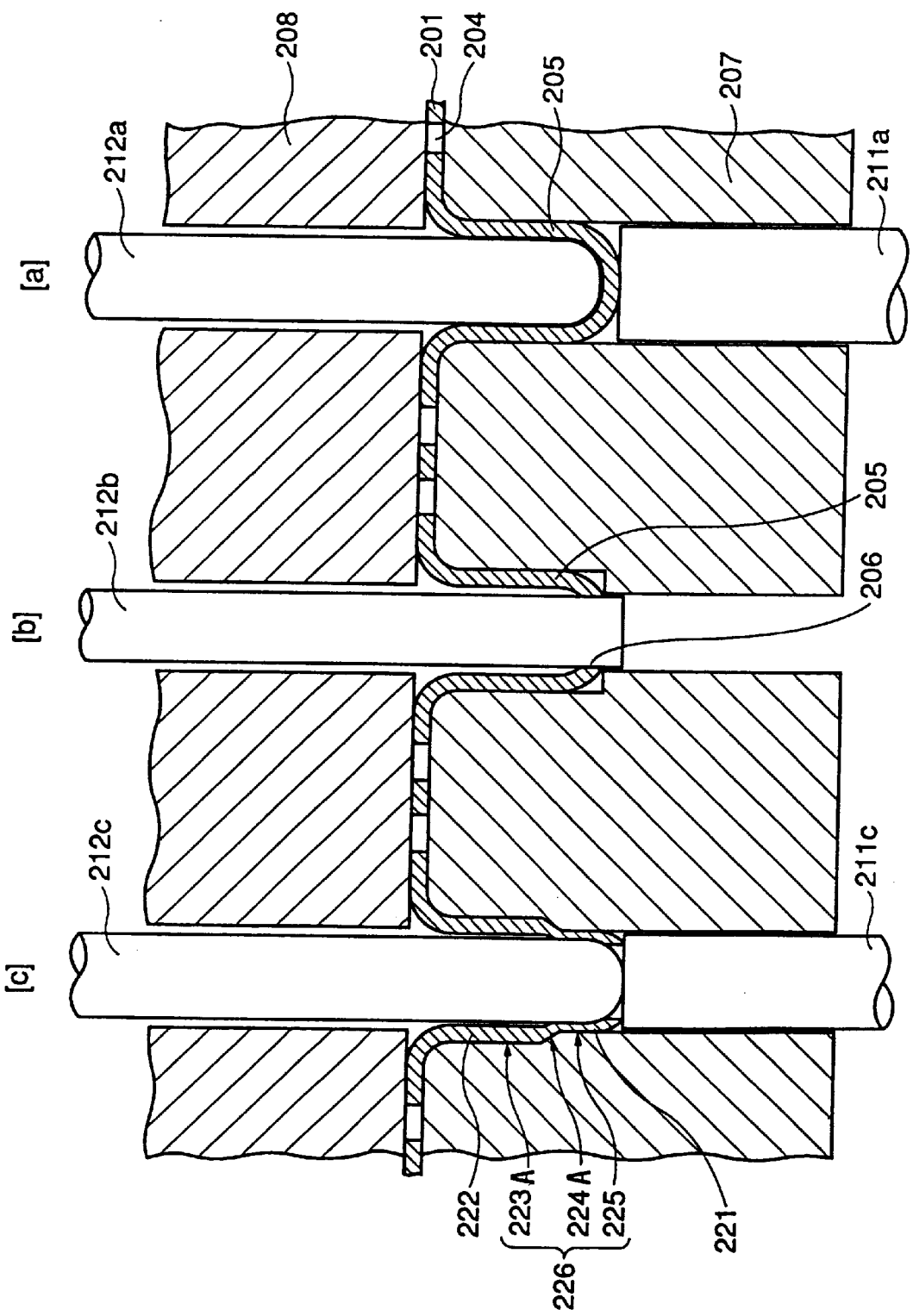
FIG. 12 is an enlarged sectional view showing the details of the process applied at working stations [a]–[c] out of the working states of FIG. 11.
Figure 13:
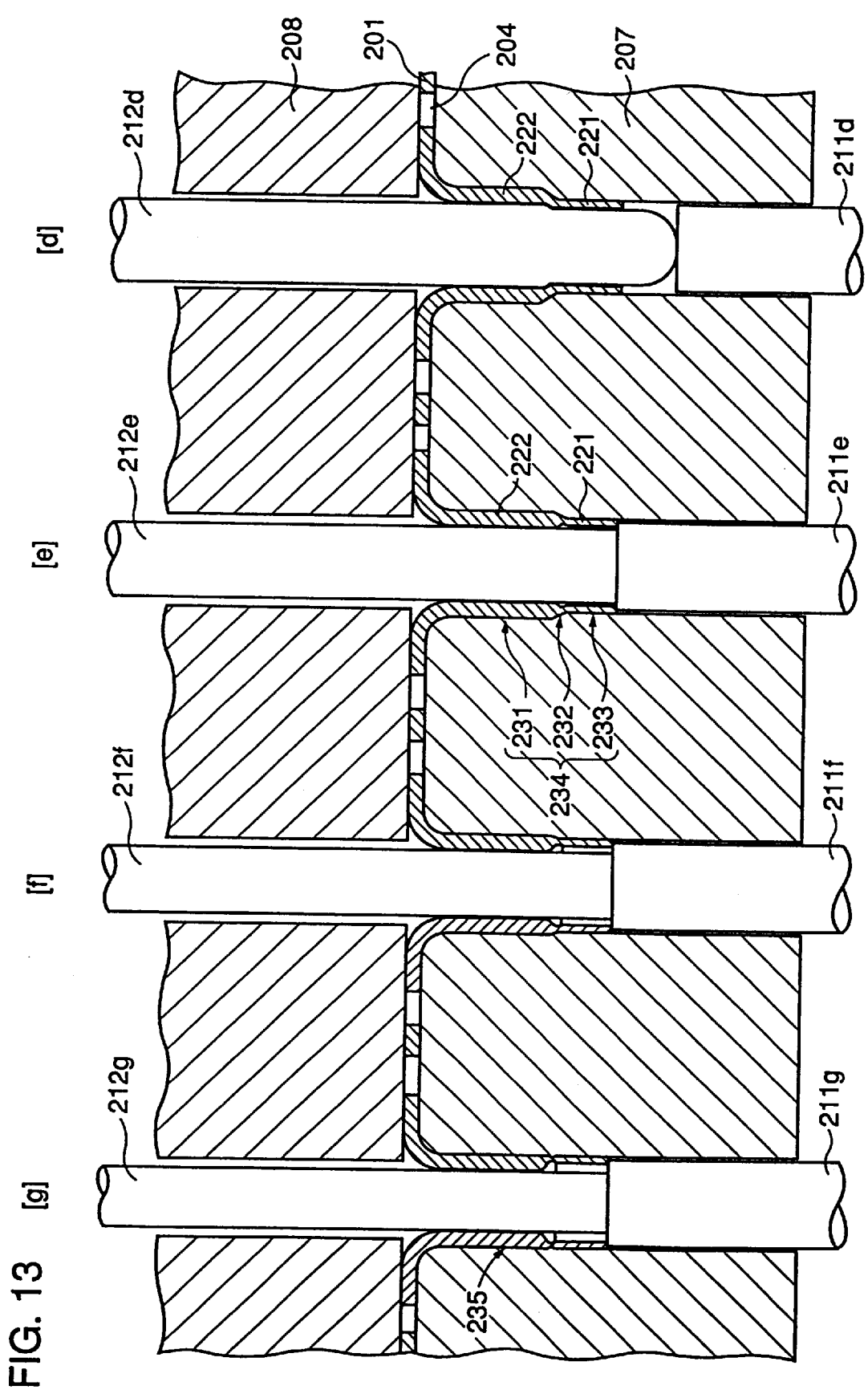
FIG. 13 is an enlarged sectional view showing the details of the process applied at working stations [d]–[g] out of the working states of FIG. 11.
Figure 14A:
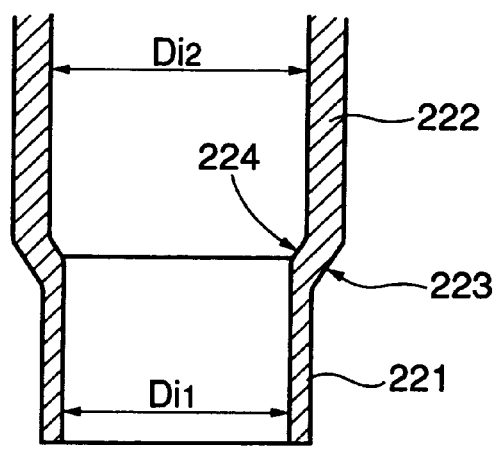
FIGS. 14A, 14B and 14C are enlarged sectional views of the member to be processed at working stations [d], [f] and [g], respectively, of FIG. 13 in the proximity of the portion to be caulked.
Figure 14B:
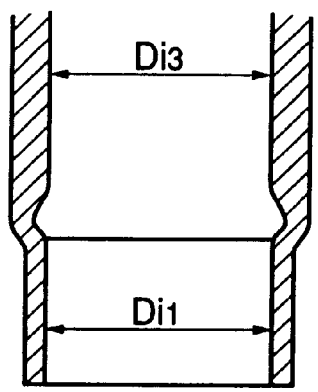
Figure 14C:
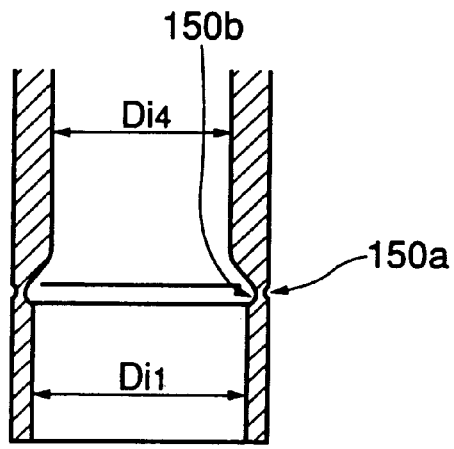

As shown in FIGS. 12 and 13, a mold die 207 is arranged below metal plate 201. A clamp die 208 is arranged above metal plate 201. Mold die 207 and clamp die 208 are set to come mutually closer to and further away from metal plate 201 in synchronization.

Knock outs 211a–221g are maintained at the mold die 207 side in association with each working station. Punches 212a–212g are maintained at the clamp die 208 side.

In the operation of each working station, each of punches 212a–212g is urged towards the inner peripheral side of expansion 201 with each of knock outs 211a–211g abutting against the lower end of expansion 205 while metal plate 201 is clamped between mold die 207 and clamp die 208.

Metal plate 201 is advanced intermittently as indicated by arrow 202 (FIG. 11) at every completion of the operation of mold die 207, clamp die 208, knock outs 211a–221g and punches 212a–212g. A predetermined work step is applied on each expansion 205 in a sequential manner.

At working station [c] that is leftmost of FIG. 12, the wall of leading end portion 221 can be made thinner than the wall of base portion 222 by setting the outer diameter of leading end portion 221 corresponding to portion 34 to be caulked of expansion 205 smaller than the outer diameter of base portion 222 corresponding to female thread formation portion 32 or shaft main portion 132. More specifically, a force plane 226 including a large diameter portion 223A, a slanting portion 224A and a small diameter portion 225 is provided at mold die 207. Expansion of base portion 222 is regulated by large diameter portion 223 of forge plane 226, whereas reduction in the inner diameter of leading end portion 221 is regulated by punch 212c. The wall of leading end portion 221 is drawn thinner by the outer diameter of leading end portion 221 being reduced by slanting portion 224 and small diameter portion 225 of forge plane 226.

Here, the outer diameter of punch 212c is set slightly greater than the inner diameter of base portion 222. As a result, a stepped portion is formed at the inner peripheral face at the position substantially facing the stepped portion at the outer peripheral face of shaft portion 32 formed by slanting portion 224 of forge plane 226.

The leading end of punch 212c used at working station [c] has a hemispherical shape so that the punch is smoothly driven without damaging the surface of metal plate 201 in the deep drawing process of leading end portion 221. Therefore, a crimp is formed at the end face of leading end portion 221 at the deep drawing process of working station [c]. At the next working station [d], leading end portion 221 is formed to be substantially cylindrical by punch 212d having a leading end of a substantially cylindrical shape while maintaining the wall thickness and diameter of base portion 221.

At this working station [d], punch 212d has a step portion at the outer perimeter so that the inner diameter $D_{i1}$ of leading end portion 221 is slightly smaller than the inner diameter $D_{i2}$ of base portion 222, so that the inner diameter is limited over the entire length of shaft portion 32. As a result of the outer diameter and inner diameter settings of leading end portion 221 and base portion 222 as described above, a step portion 223 is provided at the outer perimeter at the interface between leading end portion 221 and base portion 222, and a step portion 224 is provided at the inner periphery of substantially a corresponding position.

At working stations [c] and [d] of the present embodiment, the process of rendering the wall of leading end portion 221 of expansion 205 thinner than the wall of base portion 222 is effected by setting the outer diameter of leading end portion 221 of expansion 205 slightly smaller than the outer diameter of base portion 222 while limiting the inner diameter of leading end 221 or the reduction of the inner diameter over the entire length of shaft portion 32. This process can be carried out in an opposite manner by increasing the inner diameter of expansion 205 while forming step portion 224 with the limitation of increase in the outer diameter of leading end portion 221 of expansion 205.

At working stations [e]–[g], the inner diameter and the outer diameter of base portion 222 are gradually reduced while maintaining the wall thickness without changing the inner diameter $D_{i1}$ and the wall thickness of leading end portion 221. More specifically, inner diameters $D_{i3}$ and $D_{i4}$ of base portion 222 in FIGS. 14B and 14C corresponding to working stations [f] and [g] show the transition of $D_{i2} > D_{i3} > D_{i4}$. At working stations [g] in FIG. 14C, the outer diameter of leading end 221 and base portion 222 is substantially identical. Inner diameter $D_{i4}$ of base portion 222 becomes smaller than inner diameter $D_{i1}$ of leading end portion 221.

More specifically, at working station [e], a forge plane 234 including larger diameter portion 231 having an inner diameter smaller than large diameter portion 223, a slanting portion 232, and a small diameter portion 233 is provided at mold die 207. The outer peripheral face of base portion 222 is pressed inwards by forge plane 234. Punch 212e serves to prevent base portion 222 from being deformed into an undesired shape.

Similarly at working stations [f] and [g], the outer peripheral face of base portion 222 is urged inwards by the forging plane of mold die 207 while maintaining the diameter of leading end portion 221. The outer diameter of base portion 222 becomes substantially equal to the outer diameter of leading end portion 221 at the passage of working station [g]. At working station [g], the straight force plane 235 provided at mold die 207 causes the outer peripheral plane of base portion 222 to be urged further inwards. As a result, expansion 205 has substantially a uniform outer diameter. Punches 212f and 212g at working stations [f] and [g] function in a manner similar to that of punch 212e of working station [e].

According to the sequential forward press process of the present embodiment, a relatively small annular groove 150a is formed at the outer perimeter and an annular groove 150b having a transverse cross section greater than that of annular groove 150a is formed at the inner perimeter of shaft portion 32 in the proximity of the interface between leading end 221 and base portion 222 of shaft portion 32 as a result of the transition of the deformation to form a relatively thin-walled leading end portion 221.

Then, although not shown, portion 203 that becomes flange portion 33 is cut apart from metal plate 201. Each intermediate product of the tee nut or rivet formed as described above is barrel polished to remove any burr generated during the process. In the event of forming tee nut 101, the process of forming female thread 35 at the inner peripheral face of base portion 222 corresponding to shaft portion 32 is then carried out.

According to the above-described fabrication method, portion 34 to be caulked of tee nut 101 or rivet 111 of the present embodiment can be formed, not by a cutting process, but by a plastic forming process. By the series of processes including the plastic forming process to produce expansion 205 that becomes shaft portion 32 in the fabrication of tee nut 101 or rivet 111, the molding process can be carried out together with the formation of annular grooves 150a and 150b to facilitate separation for recycling purposes. Since each process can be carried out by advancing a long strip of metal plate 201 using the forward die, the complication in processing an intermediate product of different states can be eliminated. Fabrication of tee nut 101 or rivet 111 of the present embodiment can be carried out efficiently.

A structure of a tee nut 121 and a rivet 131 which is a modification of the present invention will be described with reference to FIGS. 15A and 15B. The structure of tee nut 121 and rivet 131 differs from the structure of tee nut 101 and rivet 111 shown in FIGS. 10A and 10B in that an annular groove 150c provided at an inner perimeter of shaft portion 32 in the proximity of the interface between portion 34 to be caulked and female thread formation portion 35 or shaft portion 135 has substantially a planar (i.e. cylindrical) bottom face with a predetermined width. Annular groove 150a provided at the outer perimeter of shaft portion 32 is located opposite to the flat or cylindrical bottom of annular groove 150c at the flange 33 side.

When the transverse cross section is formed to have substantially a V shape as annular groove 150b at the inner perimeter of shaft portion 32 of tee nut 101 and rivet 111, the bottom portion will extend linearly. This means that variation in the depth of annular groove 150b easily occurs due to any slight variation in the working operation during the press mold process. In contrast, by the advantage of the configuration of annular groove 150c having a flat (i.e. cylindrical) bottom face of a predetermined width as in tee nut 121 and rivet 131, there is essentially no variation in the depth even if the working operation during the press mold process is slightly varied. There is only a slight variation in the width of the substantially flat bottom of annular groove 150c. Thus, a shaft portion 32 of the desired thinnest wall can be obtained stably. Furthermore, in the state where portion 34 is caulked, it will become easier for the end portion bent by caulking at the flange side to overlap the position where the bottom of annular groove 150c is located. By overlapping the end of the portion bent by caulking at the flange side with the position where the bottom face of annular groove 150c is located, there is an advantage that the detachment in the separation process for recycling purposes can be carried out relatively easier.

Figure 16:
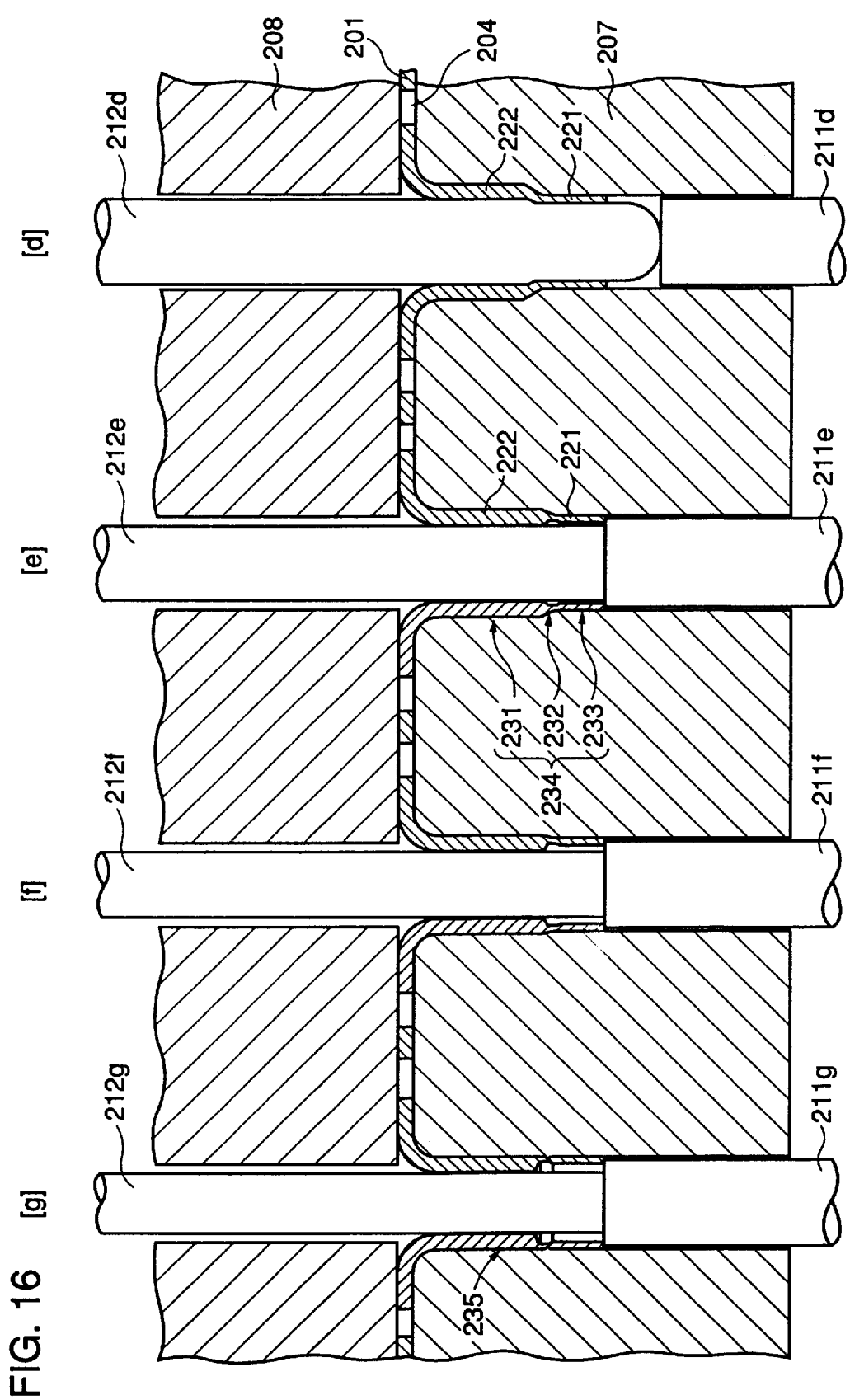
FIG. 16 shows in detail the process carried out at working stations [d]–[g] of the process of FIG. 11 for the formation of a tee nut 121 or rivet 131 of the seventh embodiment of FIGS. 15A and 15B, and is an enlarged sectional view corresponding to FIG. 13.
Figure 17A:
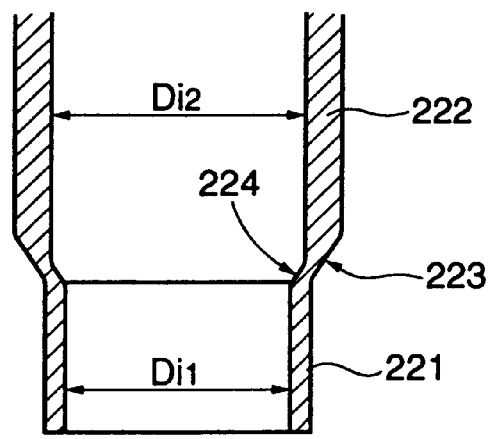
FIGS. 17A, 17B and 17C are enlarged sectional views of the member to be processed at working stations [d], [f] and [g], respectively, of FIG. 16 in the proximity of the portion to be caulked.
Figure 17B:
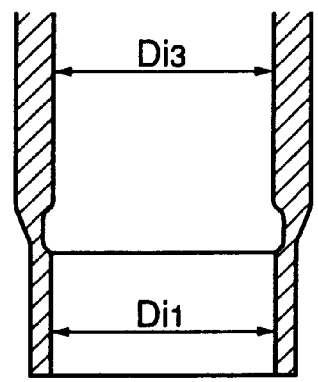
Figure 17C:
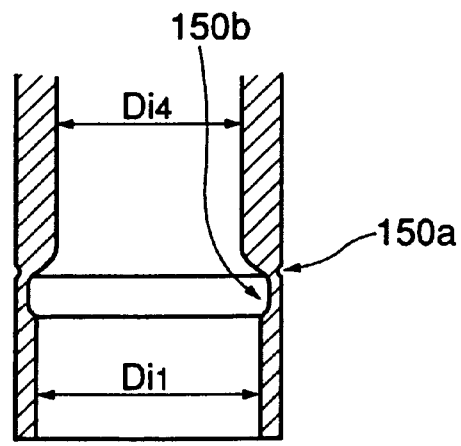

Tee nut 121 or rivet 131 having such an annular groove 150c can be formed by the sequential forwarding press process shown in FIG. 16 corresponding to FIG. 13. More specifically, the tee nut 121 or rivet 131 having such an annular groove 150c can be formed by setting the position of step portion 224 at the inner perimeter of shaft portion 32 to be located substantially opposite to the end portion of step portion 223 at the leading end 221 side at the outer perimeter of shaft portion 32, as shown in an enlarged manner in FIG. 17A in working station [d] described with reference to FIG. 16. This is because the portion at the inner peripheral face of base portion 222 adjacent to step portion 224 remains substantially planar at working stations [e]–[g] reducing the inner diameter and the outer diameter of base portion 222. This portion corresponds to the bottom plane of annular groove 150c. The vicinity of leading end portion 221 of shaft portion 32 at working stations [e] and [g] is shown in FIGS. 17B and 17C, respectively.

Figure 18A:
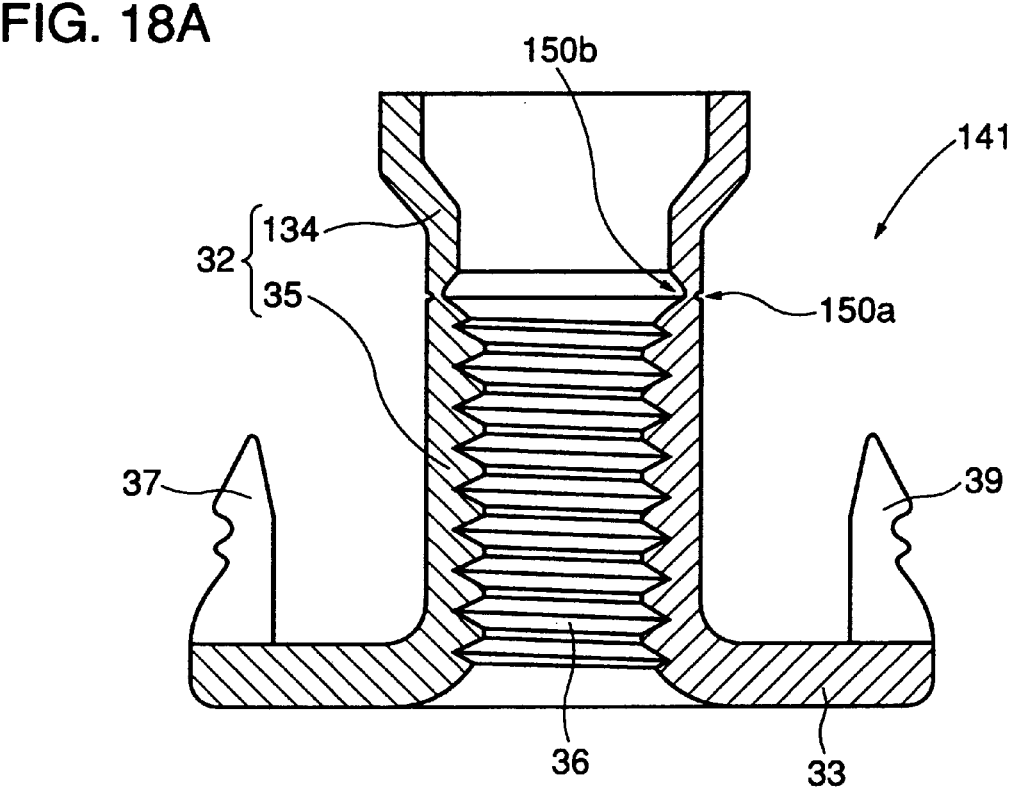
FIG. 18A is a central sectional view of a tee nut 141 which is another modification of the seventh embodiment of the present invention.
Figure 18B:
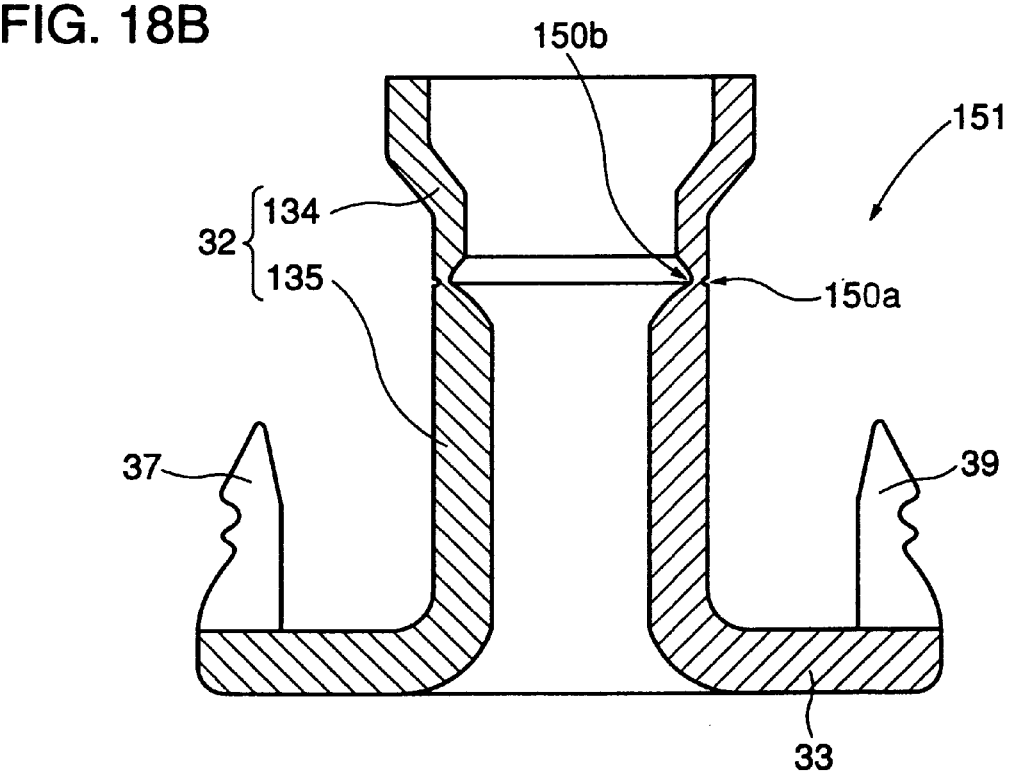
FIG. 18B is a central sectional view of a rivet 151 having a structure similar to that of tee nut 141 except for the absence of a female thread at the inner peripheral face of the shaft main portion.

Annular grooves 105a, 105b and 105c of the present embodiment are also applicable to the tee nut disclosed in U.S. Pat. No. 5,618,144. More specifically, FIG. 18A shows a tee nut 141 which is the tee nut of U.S. Pat. No. 5,618,144 incorporating annular grooves 105a and 105b similar to tee nut 101 shown in, for example, FIG. 10A. Also a rivet 151 as shown in FIG. 18B can be provided by not forming a female thread at the inner perimeter of female thread formation portion 35 of tee nut 141. Also, FIG. 19A shows a tee nut 161 which is the tee nut of U.S. Pat. No. 5,618,144 incorporating annular grooves 150a and 150c similar to tee nut 121 shown in FIG. 15A. Also, a rivet 171 as shown in FIG. 19B can be provided by not forming a female thread at the inner perimeter of female thread formation portion 35 of tee nut 161.

Although each of the above-described embodiments has a structure in which pawls 16 and 17–40 are provided at the outer perimeter of flange portions 13 and 33, the flange portion may have a planar configuration without a pawl. Also the flange portion does not necessarily have to be sized as in the above-described embodiments. A metallic tee nut or rivet having a configuration protruding slightly outwards than the outer perimeter of the shaft main portion so as to function as an engagement member in being driven into an object of fixation is within the scope of the invention of the present application.

Eighth Embodiment

Figure 20A:
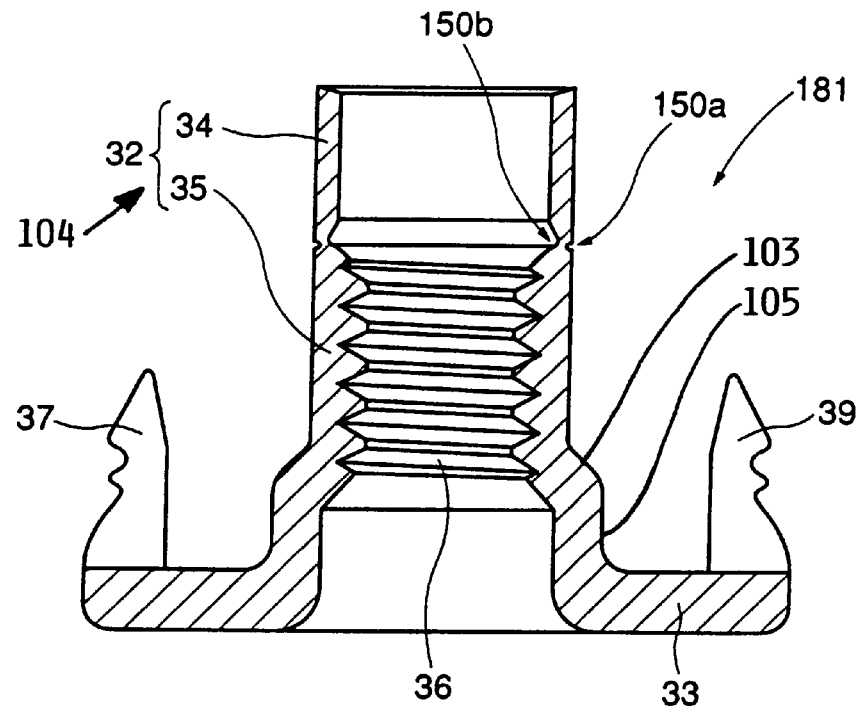
FIG. 20A is a central vertical sectional view of a tee nut 181 according to an eighth embodiment of the present invention.
Figure 21A:
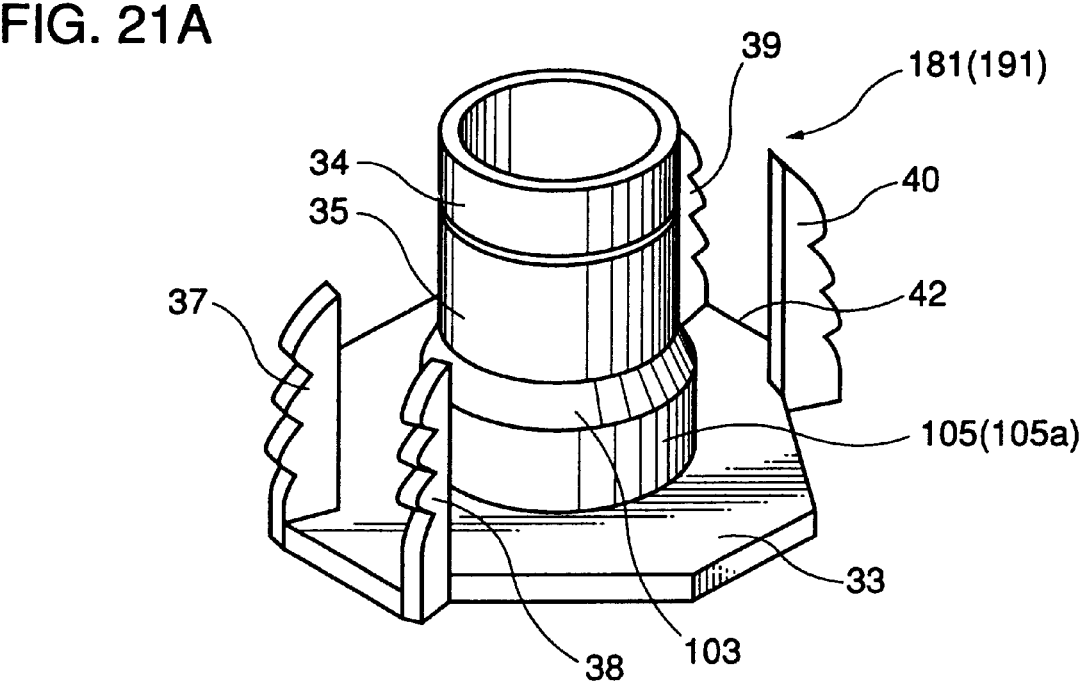
FIG. 21A is a perspective view of tee nut 181 (or 191) of the eighth embodiment of the present invention shown in FIG. 20A.

The structure of a tee nut 181 according to an eighth embodiment of the present invention will be described with reference to FIG. 20A. Tee nut 181 of the present embodiment has a configuration, as shown in FIGS. 20A and 21A, generally similar to that of tee nut 101 of the seventh embodiment described with reference to FIG. 10A. Therefore, common components have the same reference characters allotted, and detailed description thereof will not be repeated.

Tee nut 181 of the present embodiment differs from tee nut 101 of the seventh embodiment in the following points. Shaft portion 32 has a stepped portion 103 around the entire perimeter of female thread formation portion 34 in the proximity of the flange 33 side. A distal end hollow cylindrical portion 104 at the portion to be caulked 34 side relative to stepped portion 103, and a lo hollow proximal end enlarged cylindrical portion 105 at the flange portion 33 side than stepped portion 103 are provided with stepped portion 103 as the boundary.

According to the tee nut of the above structure, an advantage set forth in the following is provided in addition to the advantage similar to that of tee nut 101 by providing annular grooves 150a and 150b at distal end hollow cylindrical portion 104 in shaft portion 32. By the provision of stepped portion 103 in shaft portion 32 with proximal end enlarged cylindrical portion 105 at the flange portion 33 side, distal end hollow cylindrical portion 104 including portion 34 to be caulked and female thread formation portion 35 can be made relatively shorter. A longer female thread formation portion 35 than needed does not have to be provided even when shaft portion 32 has a great length. The shortest length of the thread formation portion matching the standard such as the JIS is only required. Therefore, the number of extra working steps in the threading process by a tap can be reduced to improve the productivity of the tee nut.

Figure 20B:
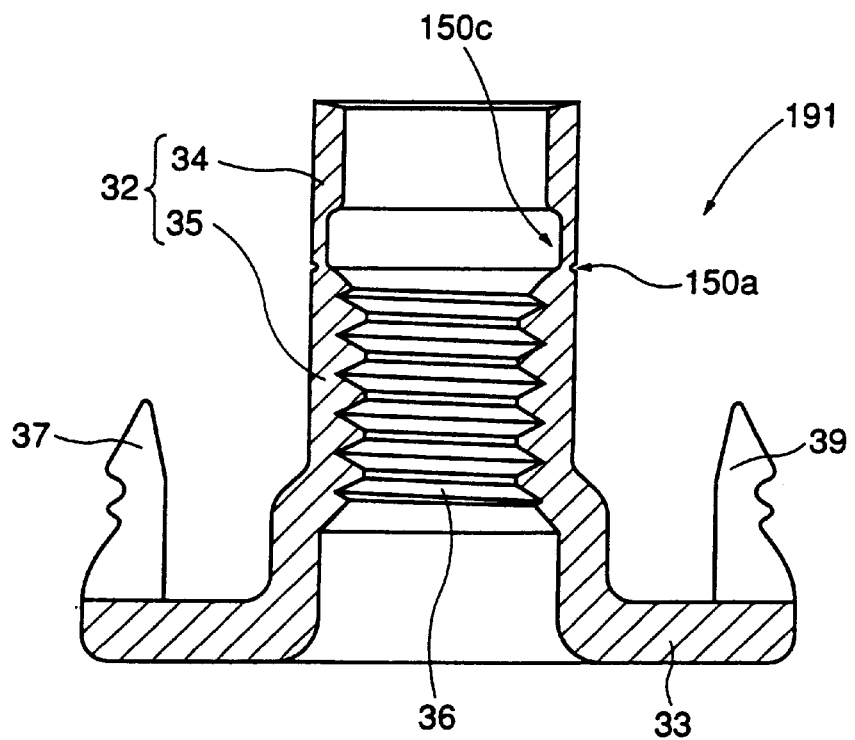
FIG. 20B is a central vertical sectional view of a tee nut 191 which is a modification of the eighth embodiment of the present invention.

As a modification of the present invention, the configuration of distal end hollow cylindrical portion 104 of shaft portion 32 can be applied to the structure similar to that of tee nut 121 of the seventh embodiment shown in FIG. 15A, resulting in tee nut 191 shown in FIG. 20B. By such a structure, both the advantage of annular grooves 150a and 150c of tee nut 121, and the advantage by virtue of provision of stepped portion 103 can be enjoyed.

Figure 21B:
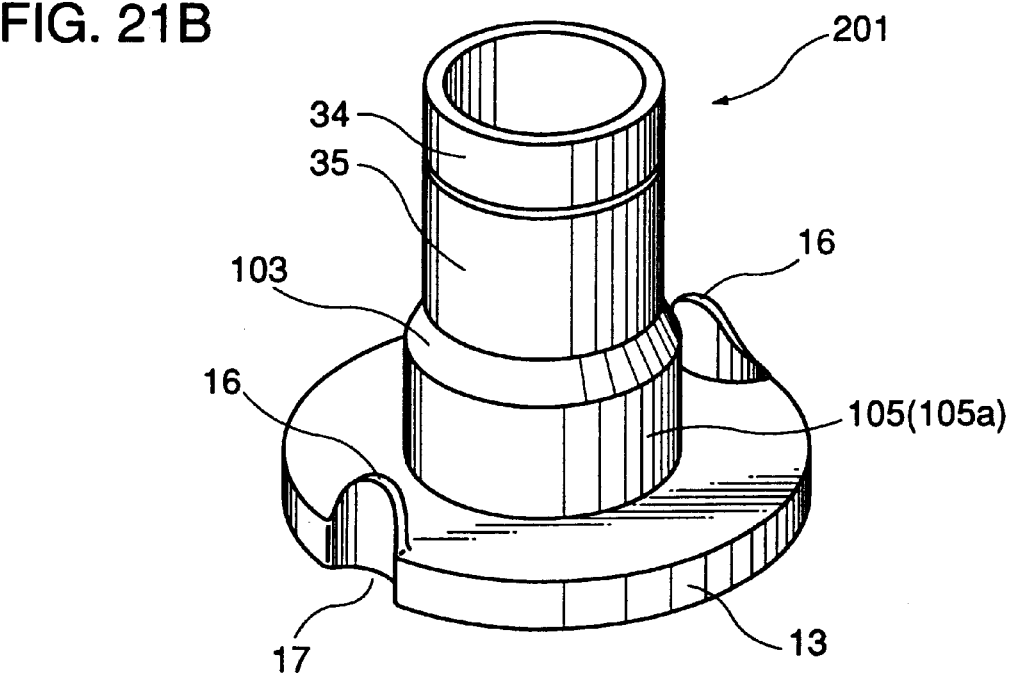
FIG. 21B is a perspective view of a tee nut 201 which is another modification of the eighth embodiment of the present invention.

The flange of the tee nut of the present embodiment is not limited to that of tee nuts 181 and 191. A flange of a configuration similar to that of tee nut 51 shown in FIG. 1B can be provided, as shown in FIG. 21B of a tee nut 201.

Ninth Embodiment

Figure 22A:
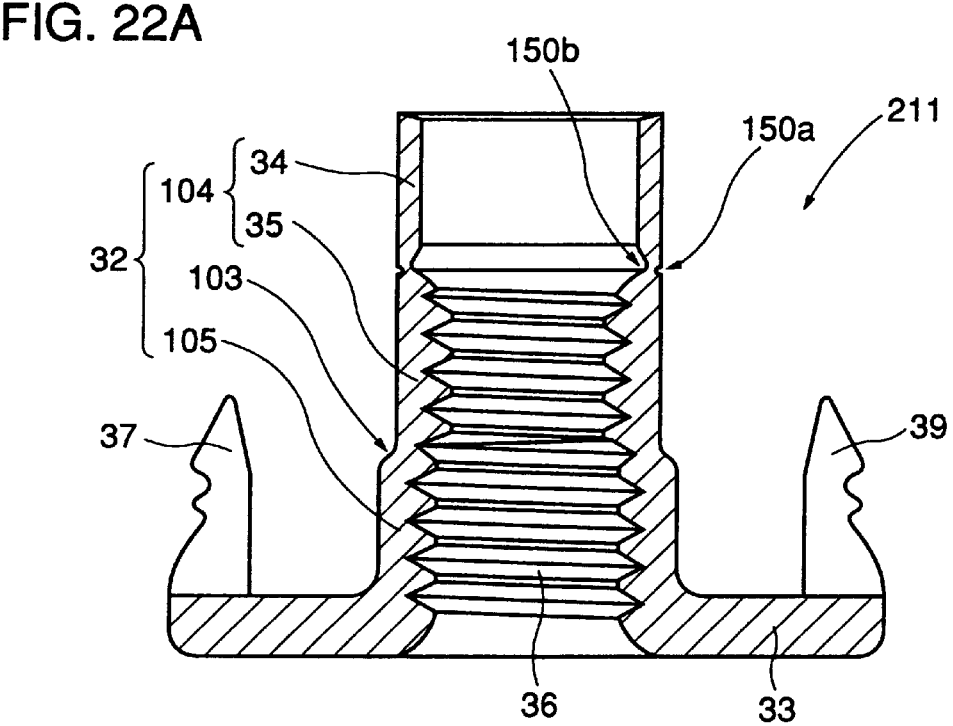
FIG. 22A is a central vertical sectional view of a tee nut 211 according to a ninth embodiment of the present invention.

A tee nut 211 according to a ninth embodiment of the present invention will be described hereinafter with reference to FIG. 22A. Tee nut 211 of the present embodiment differs from tee nut 181 of the above eighth embodiment only in that a female thread is also formed at the inner circumference of proximal end hollow cylindrical portion 105a at the flange portion 33 side of stepped portion 103 of shaft portion 32. By virtue of the structure of tee nut 211, female thread formation portion 35 at the portion to be caulked 34 side of stepped portion 103 can have the smallest required length in the range defined by the standard such as the JIS. By finishing the female thread of female thread formation portion 35 critically according to the specification corresponding to the requirement of the standard, a female thread of a relatively rough dimension having a diameter greater than that of the standard can be formed at the inner circumference of proximal end hollow cylindrical portion 105a. Accordingly, formation of the female thread in a tee nut having a relatively long shaft portion is easier than that of a conventional tee nut that had the female thread finished critically over the entire length of the region where the female thread is to be formed. Thus, the productivity is improved. There is also the advantage that the strength of the screw is increased by forming a female thread also at the inner circumference of proximal end hollow cylindrical portion 105a.

Figure 22B:
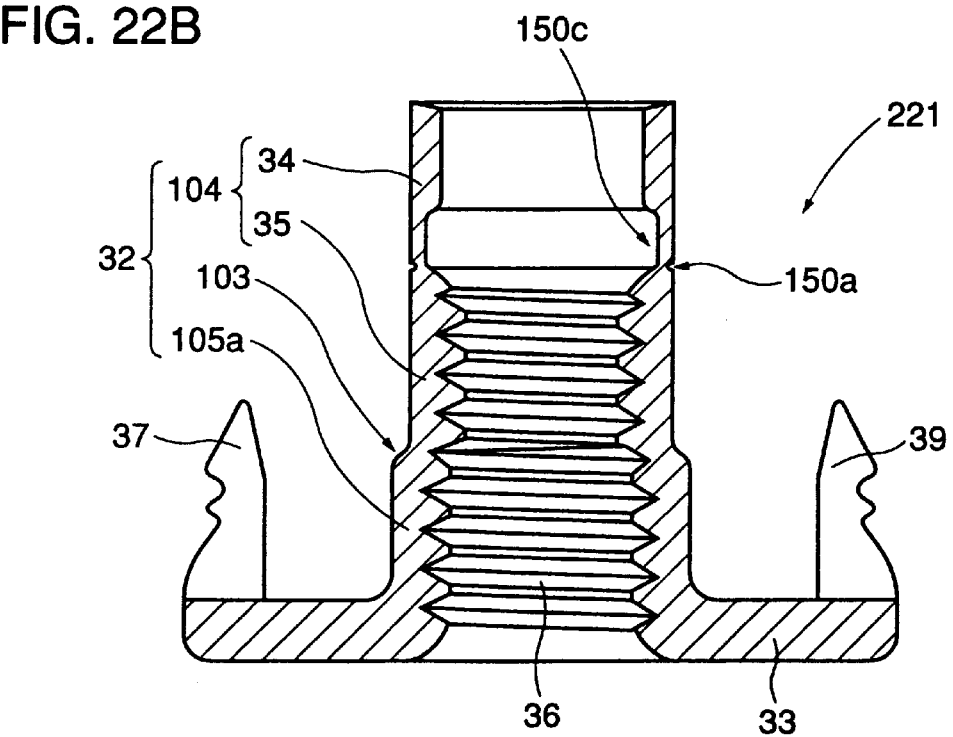
FIG. 22B is a central vertical sectional view of a tee nut 221 which is a modification of the ninth embodiment of the present invention.

FIG. 22B shows a tee nut 221 which is a modification of the present embodiment. The configuration of distal end hollow cylindrical portion 104 of shaft portion 32 is applied to a structure similar to that of tee nut 121 which is a modification of the seventh embodiment shown in FIG. 15A. By such a structure, both the advantage of annular grooves 150a and 150c of tee nut 121 and also the advantage by virtue of provision of stepped portion 103 can be enjoyed.

Tenth Embodiment

Figure 23A:
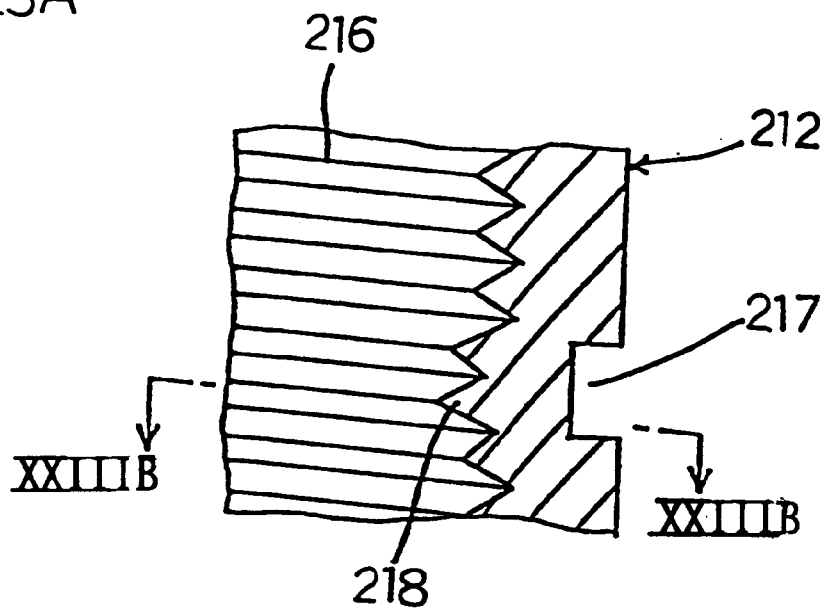
FIG. 23A is a partial sectional view showing an enlargement of the structure having a partial irregular portion at the female thread formation portion of a tee nut.
Figure 23B:
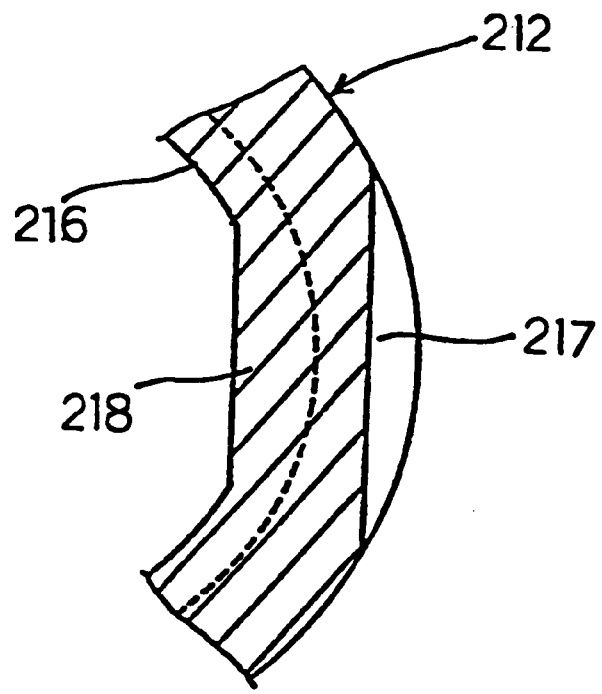
FIG. 23B is a sectional view taken along line XXIIIB—XXIIIB of FIG. 23A.

In the region where the female thread is formed in the tee nuts of the above-described embodiments, a screw that is partially irregular is preferably formed as locking means to prevent loosening of the screwed bolt. In order to form an irregular screw thread partially, the process of forming a concave portion 217 can be employed by indenting inwards a portion of the outer peripheral face of female thread formation portion 216 at shaft portion 212 of the tee nut, as shown, for example, in FIGS. 23A and 23B. Two concave portions 217 are formed with an angular interval of, for example, 180°. These concave portions 217 can be formed by sandwiching or grasping predetermined locations of female thread formation portion 216 with a pair of suitable tools and strongly urging these tools inwardly toward female thread formation portion 216. By such a provision of an irregular portion 218 of the female thread, the bolt cannot be moved unless the screwed bolt is rotated relatively forcefully. As a result, the screwed state is locked to prevent the bolt from being loosened.

Eleventh Embodiment

Figure 24A:
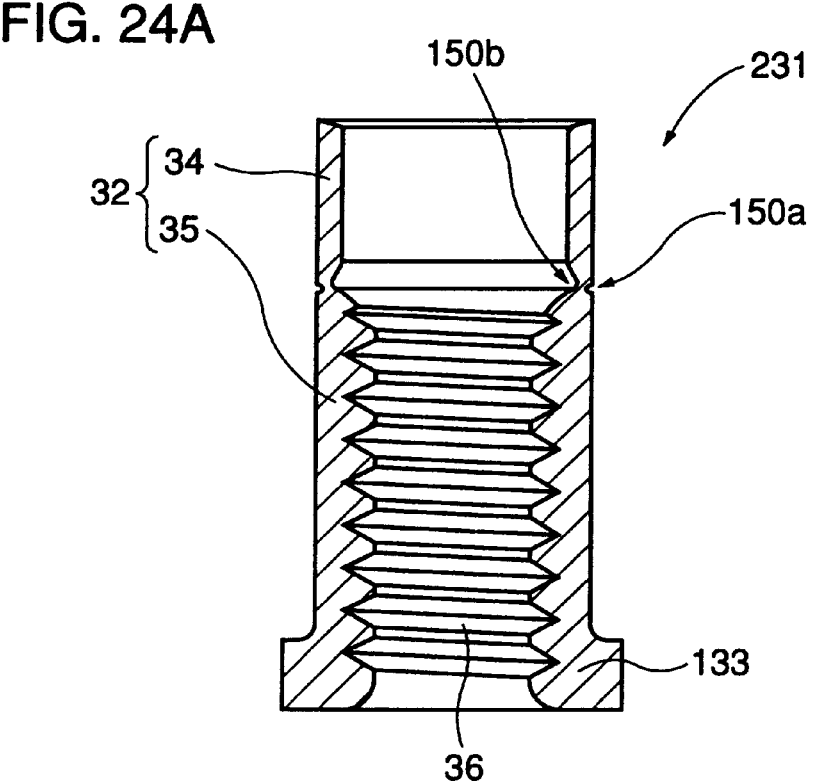
FIGS. 24A and 24B are central vertical sectional views of a tee nut 231 and a rivet 241, respectively, according to an eleventh embodiment of the present invention.
Figure 24B:
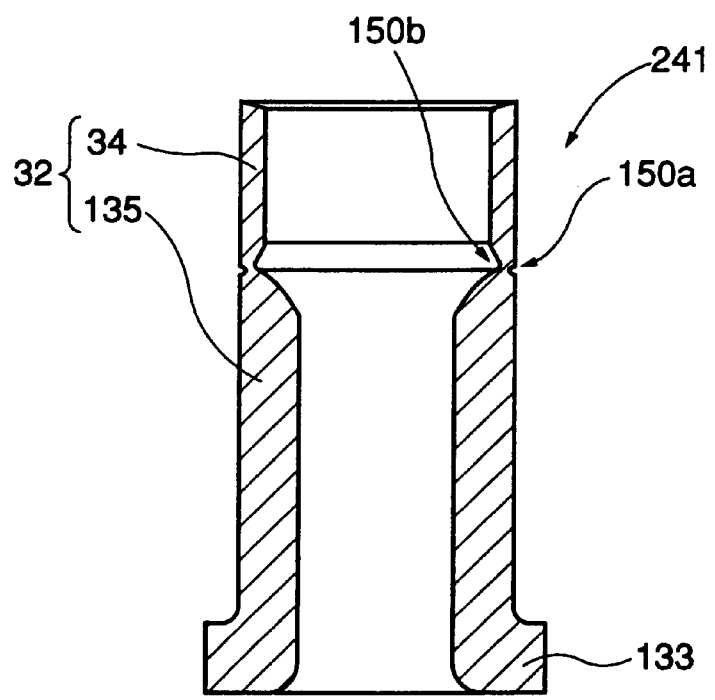
Figure 25A:
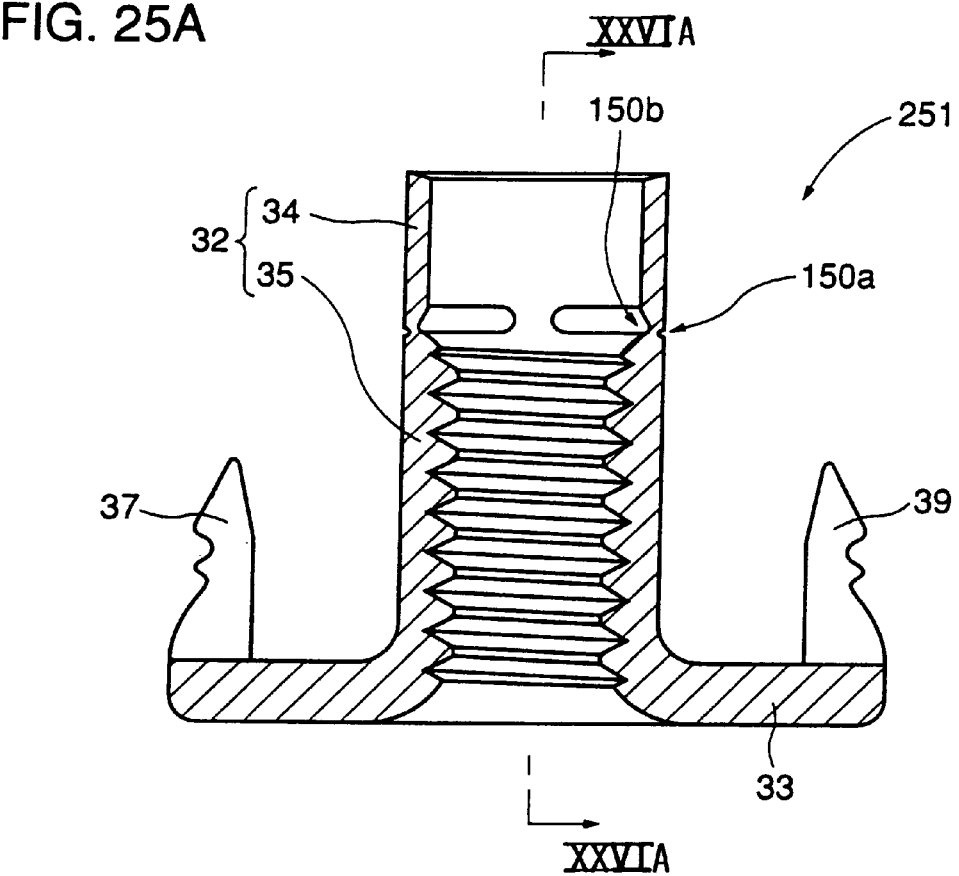
FIGS. 25A and 25B are a front sectional view and a partial sectional vertical back view, respectively, of a tee nut 251 according to a twelfth embodiment of the present invention.
Figure 25B:
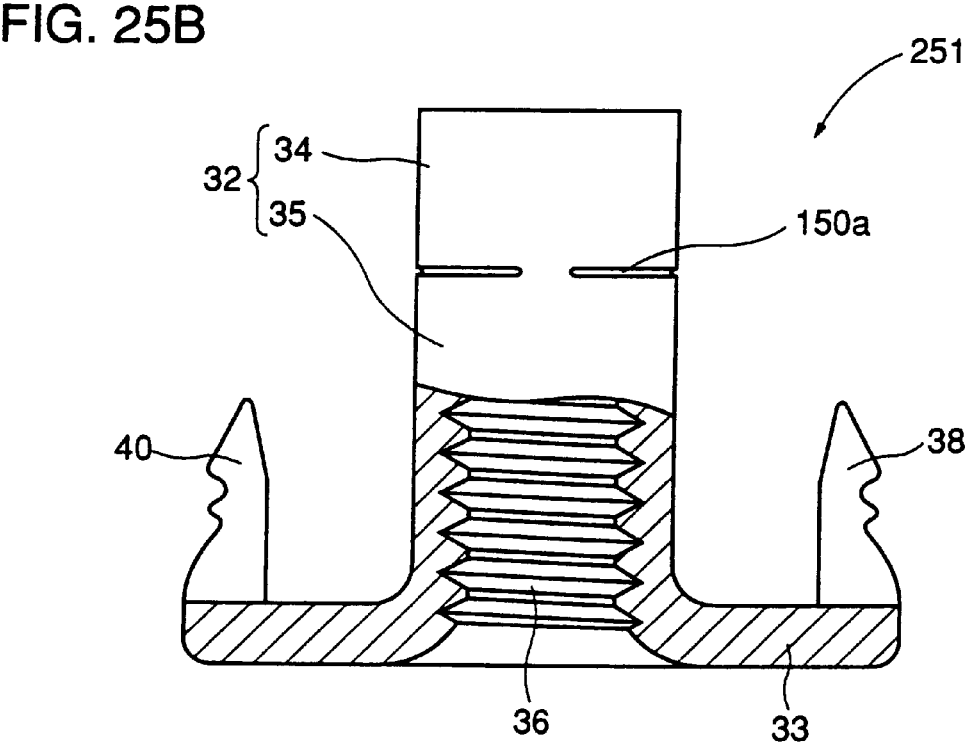
Figure 26A:
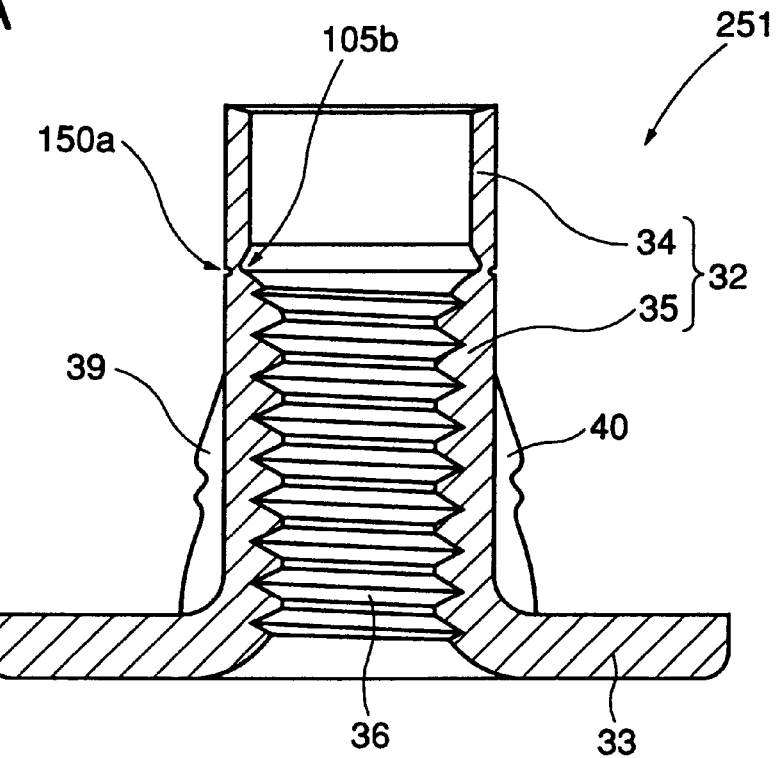
FIG. 26A is a sectional view taken along line XXVIA—XXVIA of FIG. 25A.
Figure 26B:
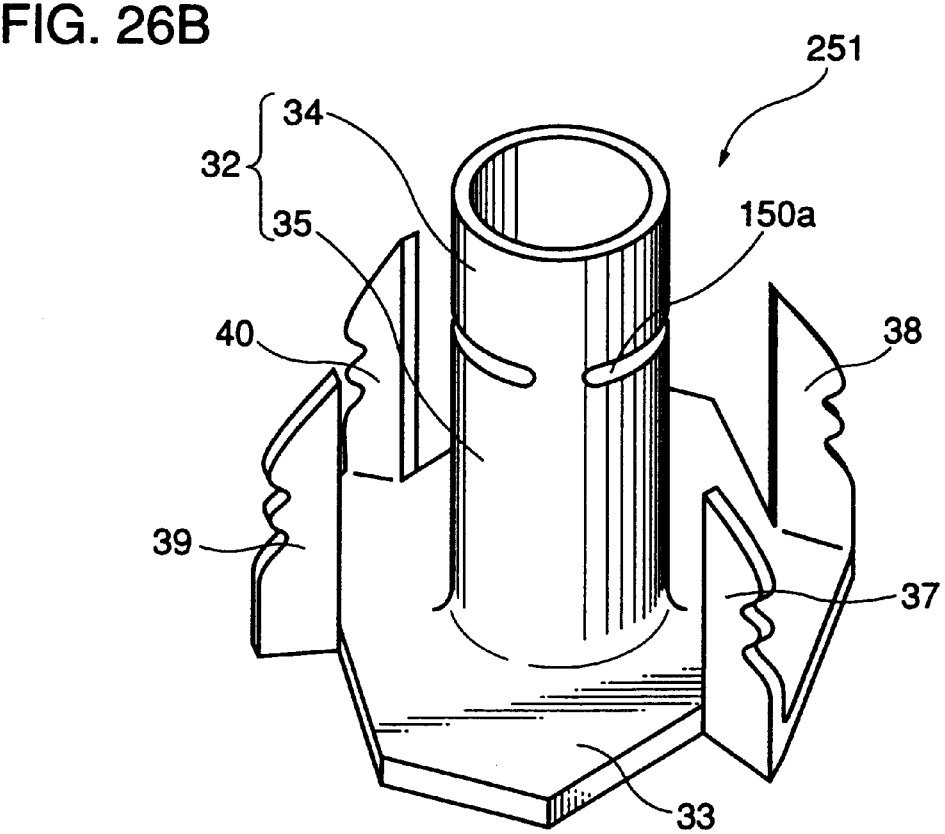
FIG. 26B is a perspective view, respectively, of tee nut 251 of the twelfth embodiment of the present invention.

The above embodiments correspond to a structure of a tee nut or a rivet including a relatively large flange with substantially an octagonal or circular shape with a pawl provided at the outer circumference of the flange. However, the flange is not necessarily of a relatively large size. Also, the pawl may be absent. More specifically, the concept of the above embodiments is also applicable to the structure having a relatively small flange 133 with an outer diameter slightly greater than that of shaft portion 32, as in a tee nut 231 shown in FIG. 24A or a rivet 241 as shown in FIG. 24B. FIGS. 24A and 24B have the same reference characters allotted for the components common to those of tee nut 101 or rivet 111 shown in FIGS. 10A and 10B. Detailed description thereof will not be repeated.

Twelfth Embodiment

The structure of a tee nut 251 according to a twelfth embodiment of the present invention will be described hereinafter with reference to FIGS. 25A and 25B and FIGS. 26A and 26B. Tee nut 251 of the present embodiment differs from tee nut 101 of the seventh embodiment shown in FIG. 10A in that annular grooves 150a and 150b are not formed continuously over the entire perimeter, and that there is a discontinuous area. By providing such a discontinuous portion of annular grooves 150a and 150b, the separation for detachment can be effected by a relatively small tensile force since stress acts intensively at annular grooves 150a and 150b at the area corresponding to the discontinuous portion to commence fracture from that area.

The discontinuous area of annular grooves 150a and 150b is not limited to one area. The intermittent portion can be provided at a plurality of areas. By appropriately altering the number of intermittent areas or the ratio of the length of the discontinuous to the entire perimeter when the intermittent portion of annular grooves 150a and 150b are provided at a plurality of areas, the mechanical strength of that area can be adjusted, as necessary.

Figure 27A:
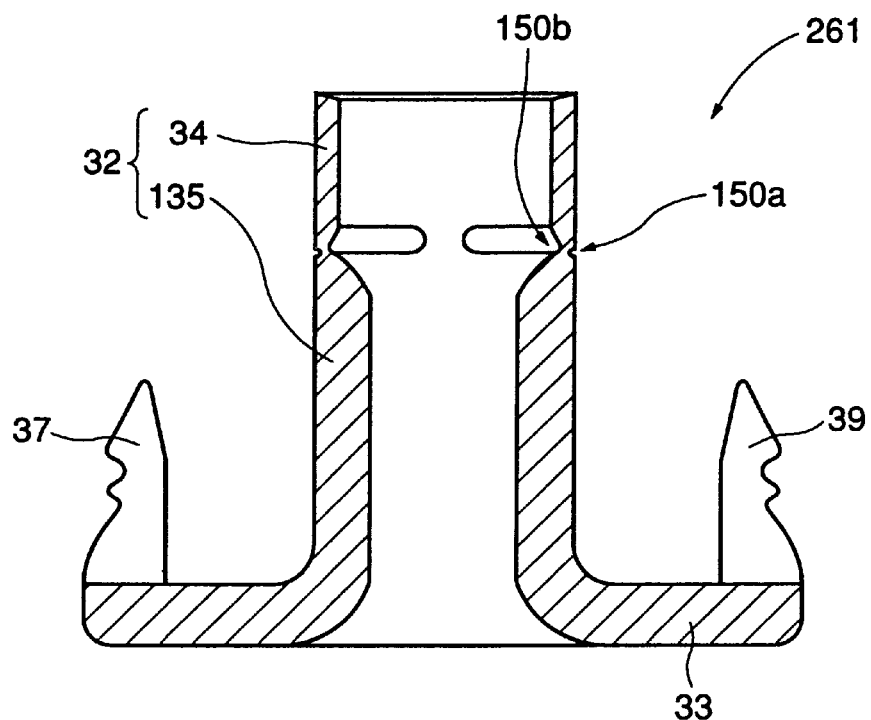
FIG. 27A is a front sectional view.
Figure 27B:
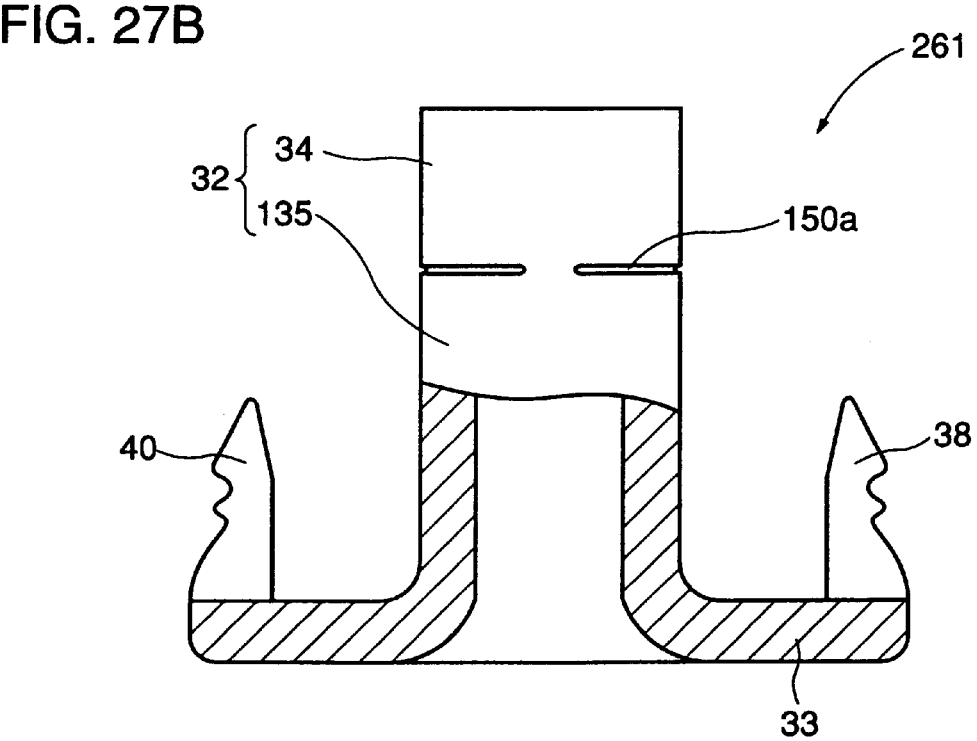
FIG. 27B is a partial sectional back view, respectively, of a rivet 261 which is a modification of the twelfth embodiment of the present invention.
Figure 28A:
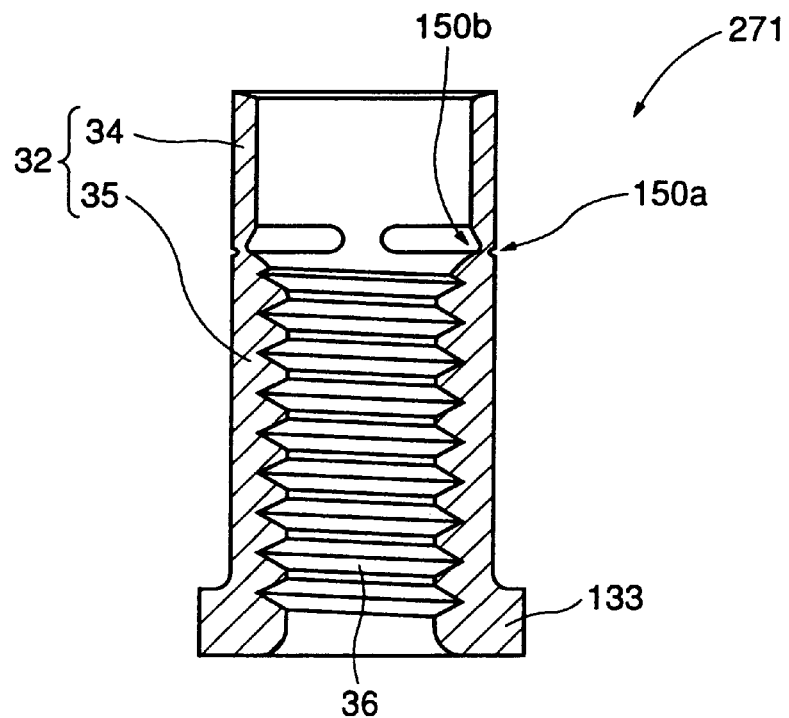
FIG. 28A is a front sectional view.
Figure 28B:
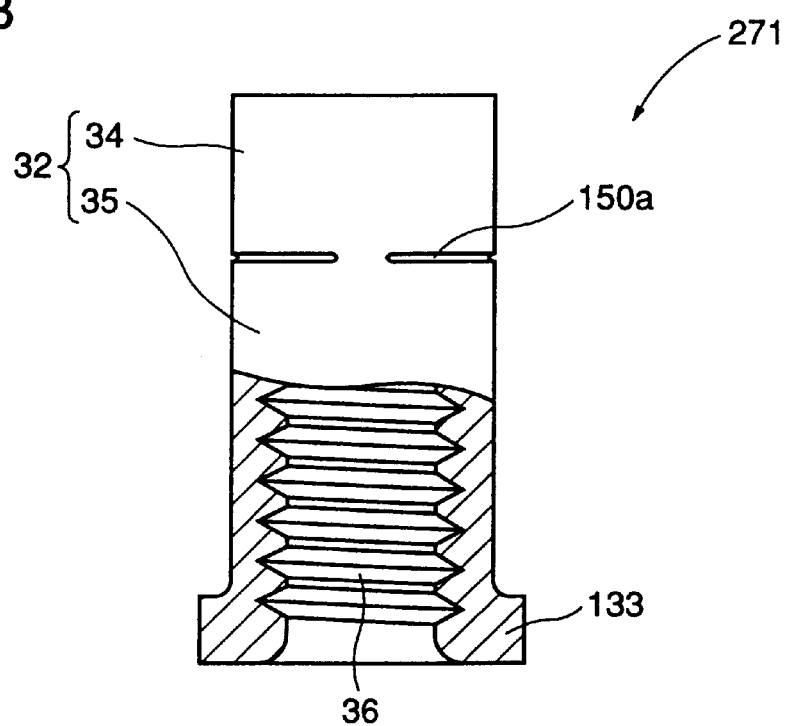
FIG. 28B is a partial sectional back view, respectively, of a tee nut 271 which is another modification of the twelfth embodiment of the present invention.
Figure 29A:
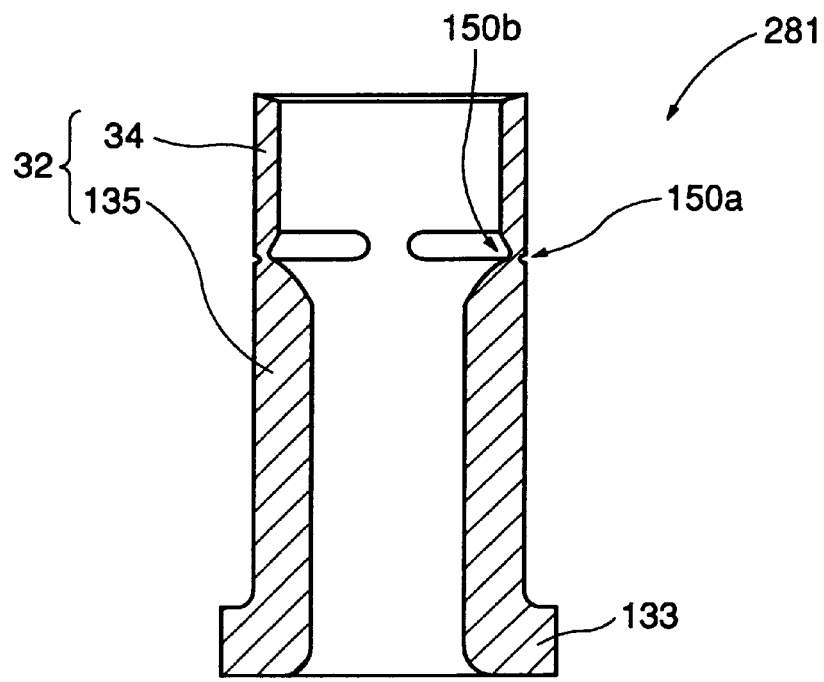
FIG. 29A is a front sectional view.
Figure 29B:
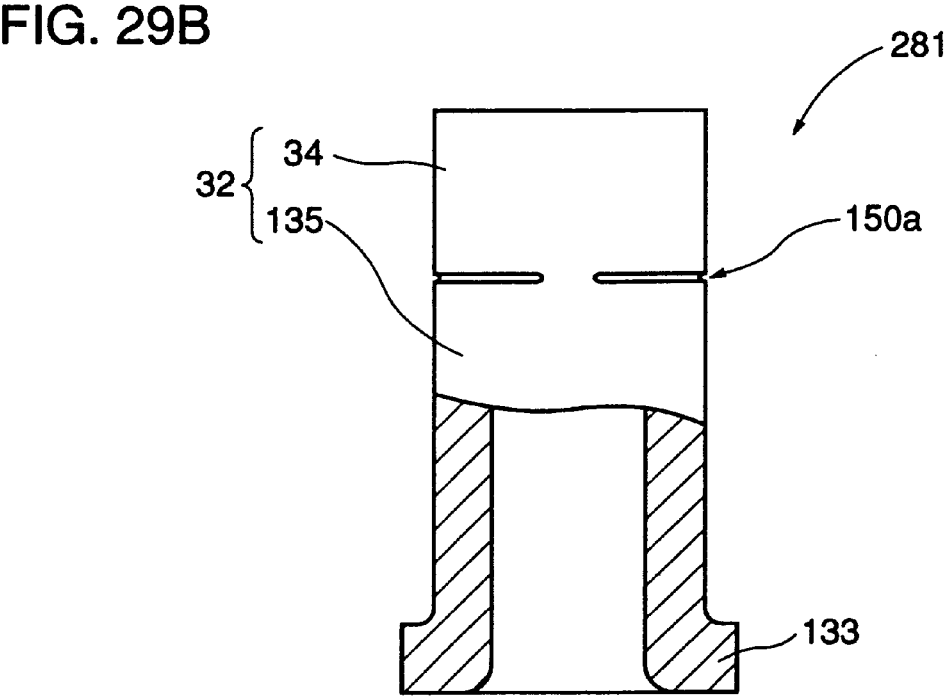
FIG. 29B is a partial sectional back view, respectively, of a rivet 281 which is a further modification of the twelfth embodiment of the present invention.
Figure 30A:
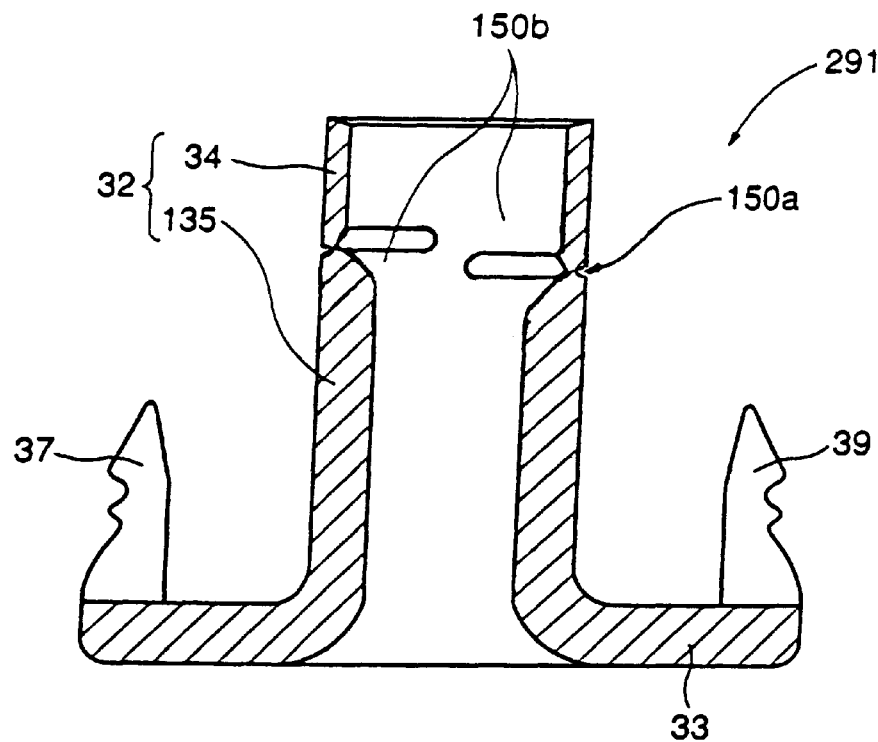
FIG. 30A is a front sectional view.
Figure 30B:
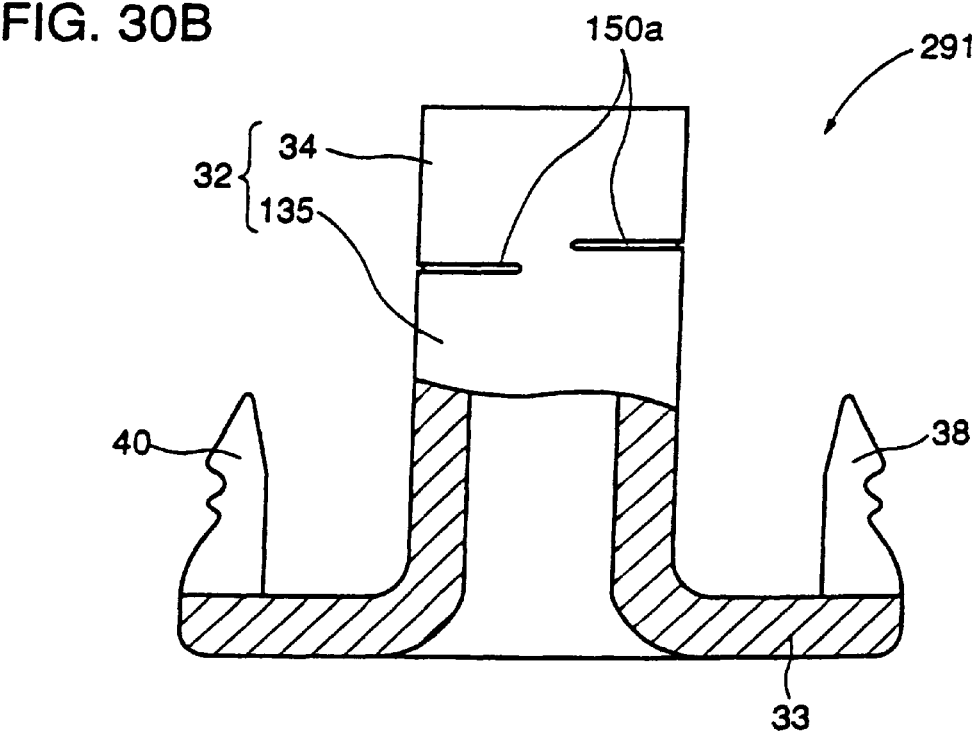
FIG. 30B is a partial sectional back view, respectively, of a rivet 291 which is still another modification of the twelfth embodiment of the present invention.
Figure 31:
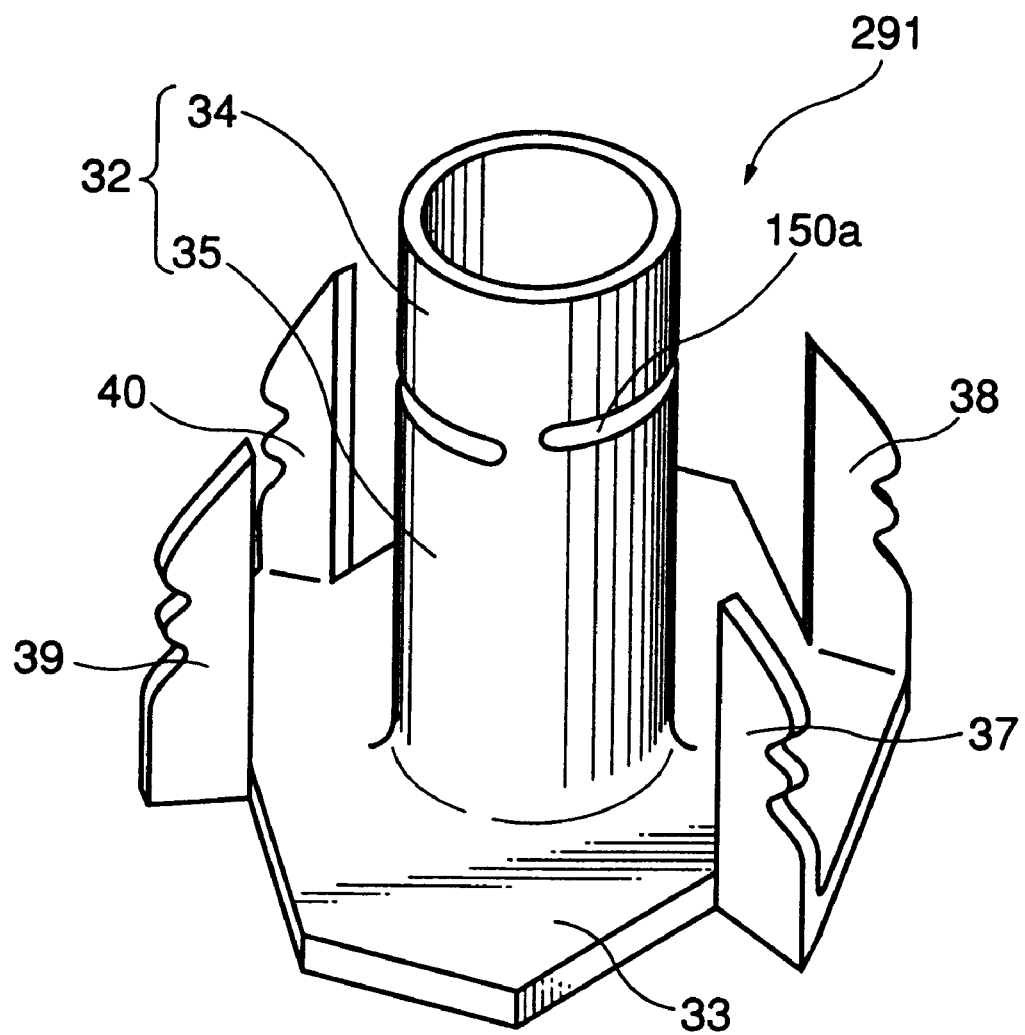
FIG. 31 is a perspective view of rivet 291 shown in FIGS. 30A and 30B.
Figure 32A:
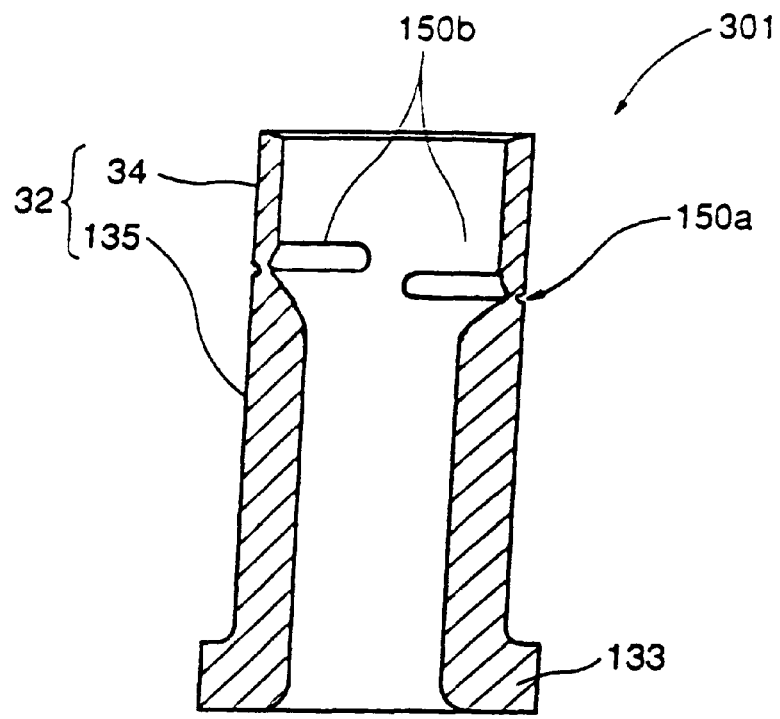
FIG. 32A is a front sectional view.
Figure 32B:
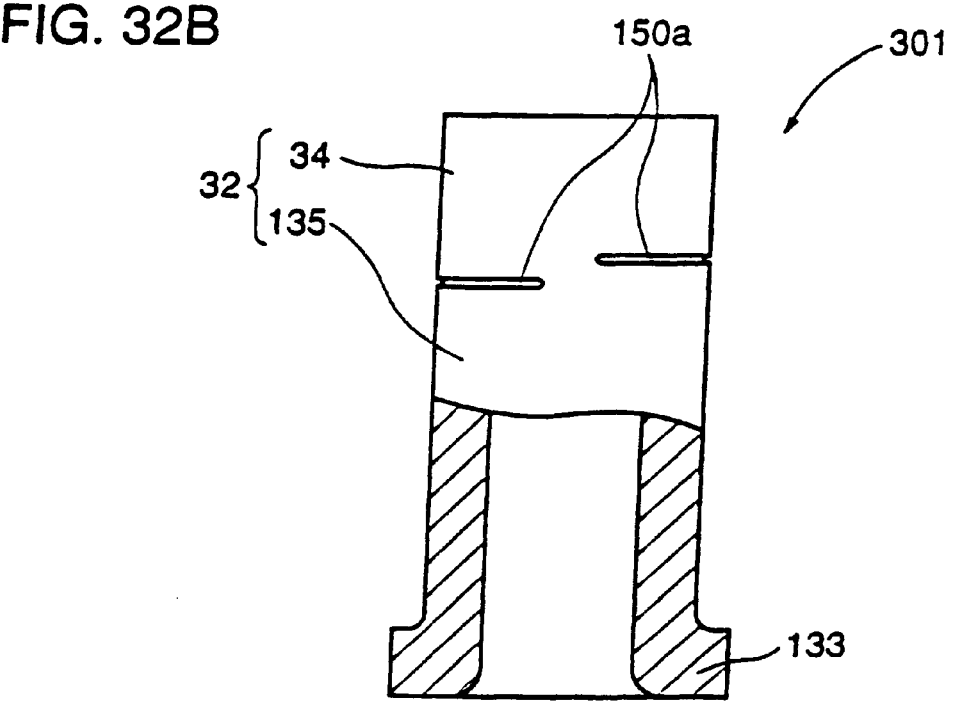
FIG. 32B is a partial vertical back view, respectively, of a rivet 301 which is yet a further modification of the twelfth embodiment of the present invention.

FIGS. 27A and 27B show the structure of the present embodiment applied to a rivet 261 lacking the female thread at the inner circumference or shaft main portion 135 of shaft portion 32. FIGS. 28A and 28B show the structure in which the present embodiment is applied to a tee nut 271 having a configuration similar to that of tee nut 231 shown in FIG. 24A. FIGS. 29A and 29B show a structure of the present embodiment applied to a rivet 281 having a configuration similar to that of rivet 241 of FIG. 24B.

Annular grooves 150a and 150b provided at the outer perimeter of shaft portion 32 can be formed to have a stepped portion at the discontinuous area, as rivets 291 and 301 shown in FIGS. 30A, 30B, 31, 32A and 32B.

Thirteenth Embodiment

A tee nut 311 according to a thirteenth embodiment of the present invention will be described hereinafter with reference to FIGS. 33A and 33B. Formation of a thin-walled portion of shaft portion 32 to facilitate detachment for recycling purposes of tee nut 311 of the present embodiment is realized by forming a plurality of dents 150d in an intermittent manner in the substantially annular region in the proximity of the interface between portion 34 to be caulked and female thread formation portion 35, as shown in FIG.

33A and 33B, absent of the annular grooves. Such a dent 150d can be formed at the inner peripheral side of shaft portions 32. Alternatively, the dent can be formed at both the inner perimeter and the outer perimeter of shaft portion 32. According to tee nut 311 of the present embodiment, the size, depth, distance from an adjacent dent 150d, and the like can be modified appropriately to allow adjustment of the mechanical strength of this area, as necessary.

Figure 33A:
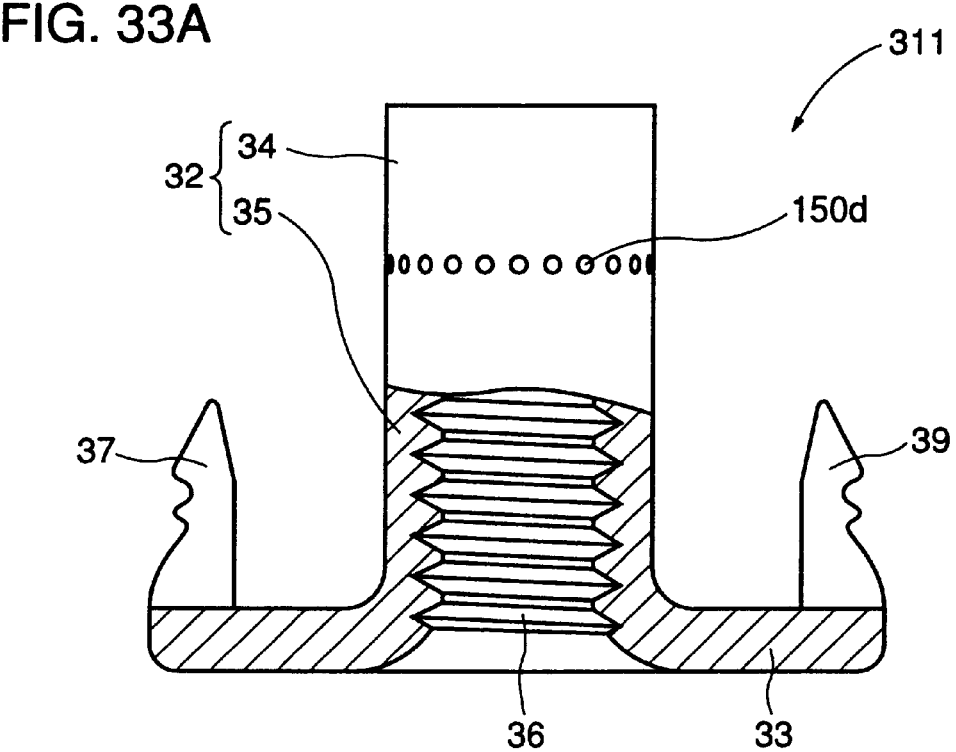
FIG. 33A is a central vertical partial sectional view.
Figure 33B:
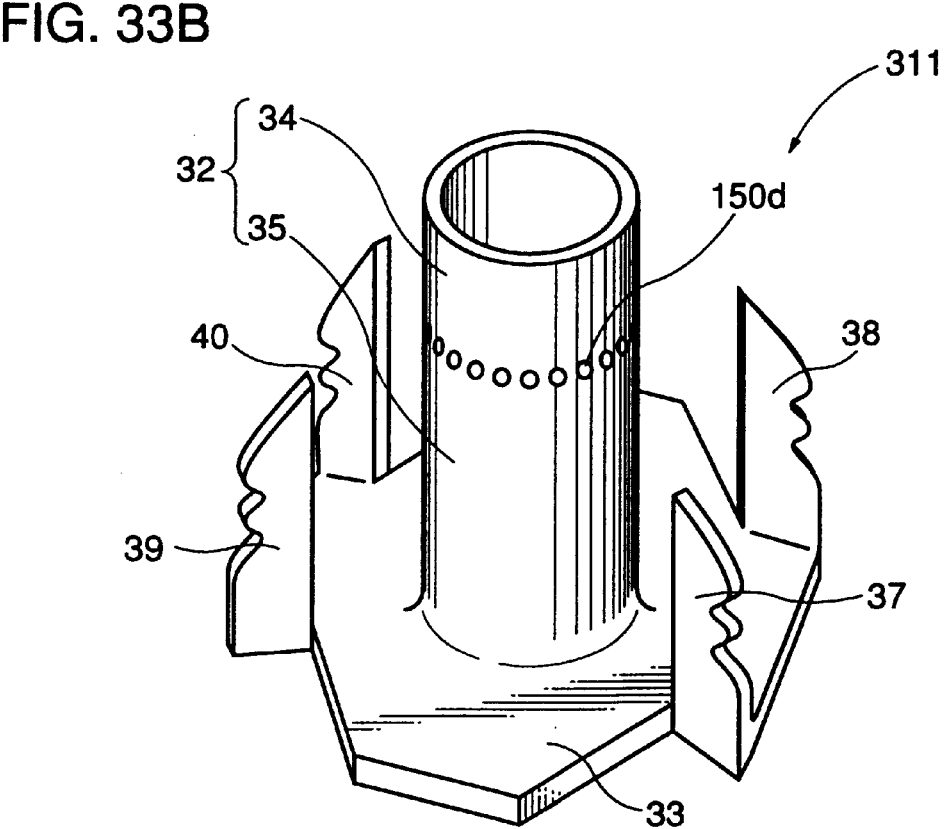
FIG. 33B is a perspective view, respectively, of a tee nut 311 according to a thirteenth embodiment of the present invention.

FIGS. 33A and 33B show a structure in which the present embodiment is applied to a tee nut. The present embodiment is equally applicable to a rivet that does not have a female thread formation portion. Although an example of the structure having a relatively large flange portion with a pawl is shown in FIGS. 33A and 33B, similar application can be made to a tee nut or a rivet having a flange of a relatively small diameter shown in FIG. 24.

Fourteenth Embodiment

Figure 34A:
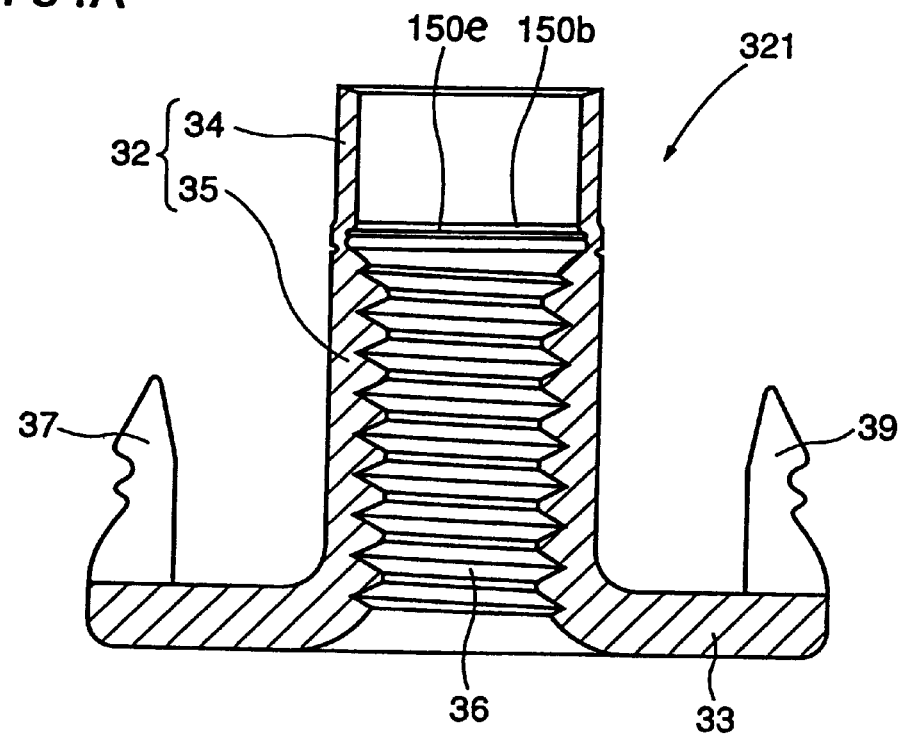
FIG. 34A is a central vertical sectional view of a tee nut 321 according to a fourteenth embodiment of the present invention.
Figure 34B:
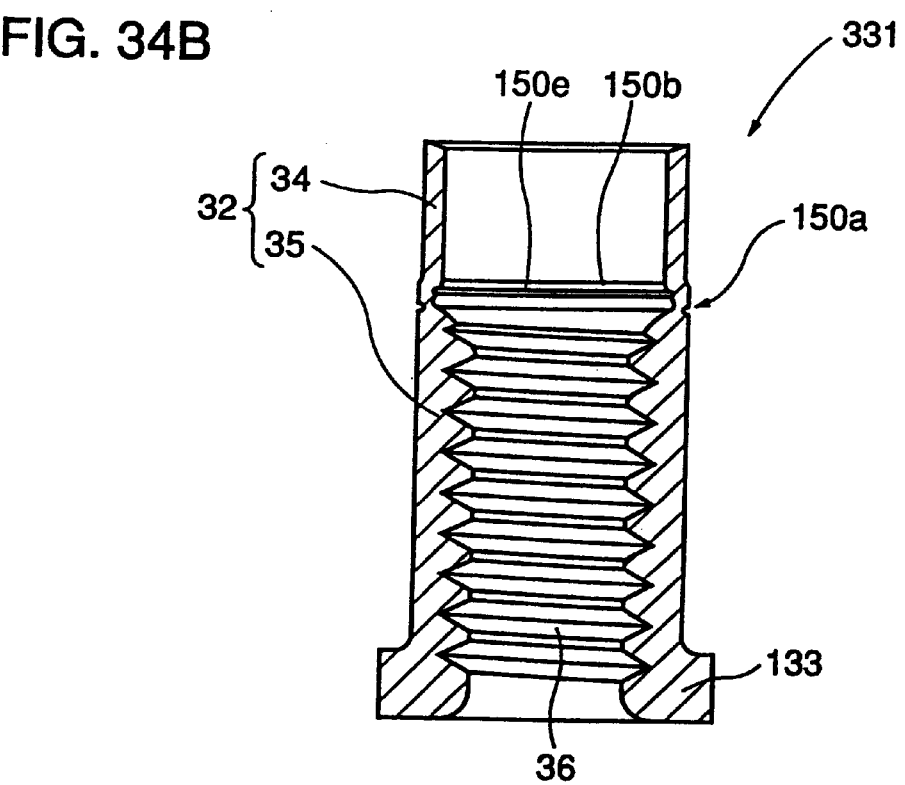
FIG. 34B is a central vertical sectional view of a tee nut 331 which is a modification of the fourteenth embodiment of the present invention.
Figure 35A:
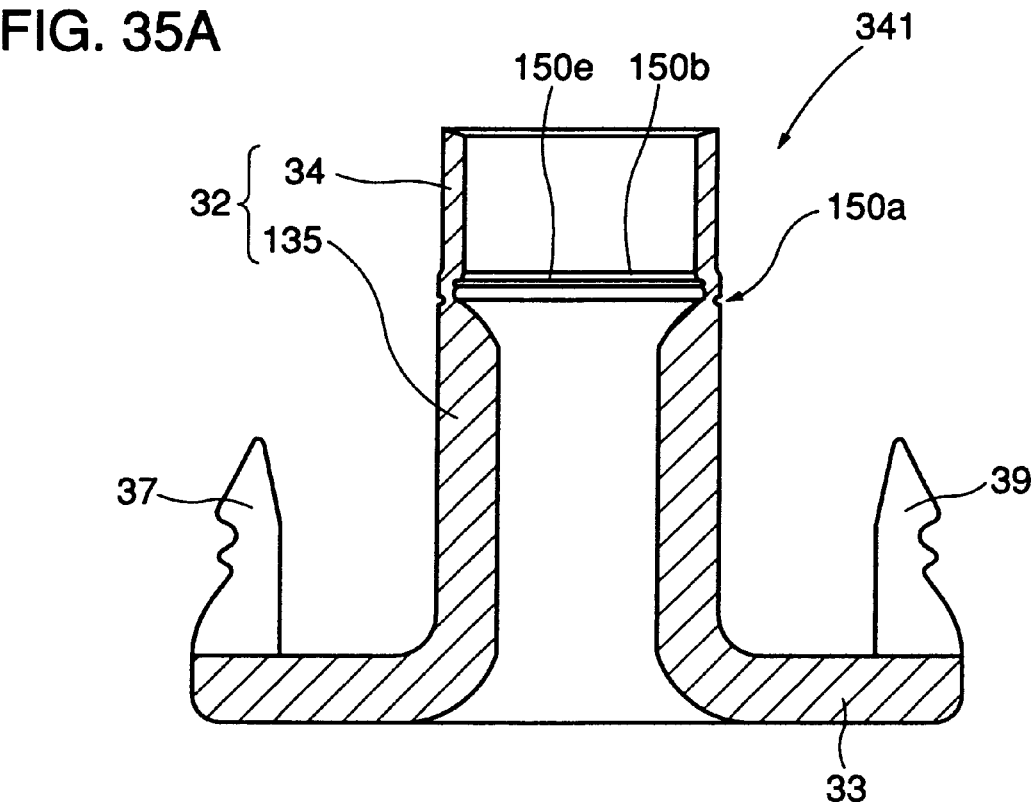
FIG. 35A is a central vertical sectional view of a rivet 341 according to the fourteenth embodiment of the present invention.
Figure 35B:
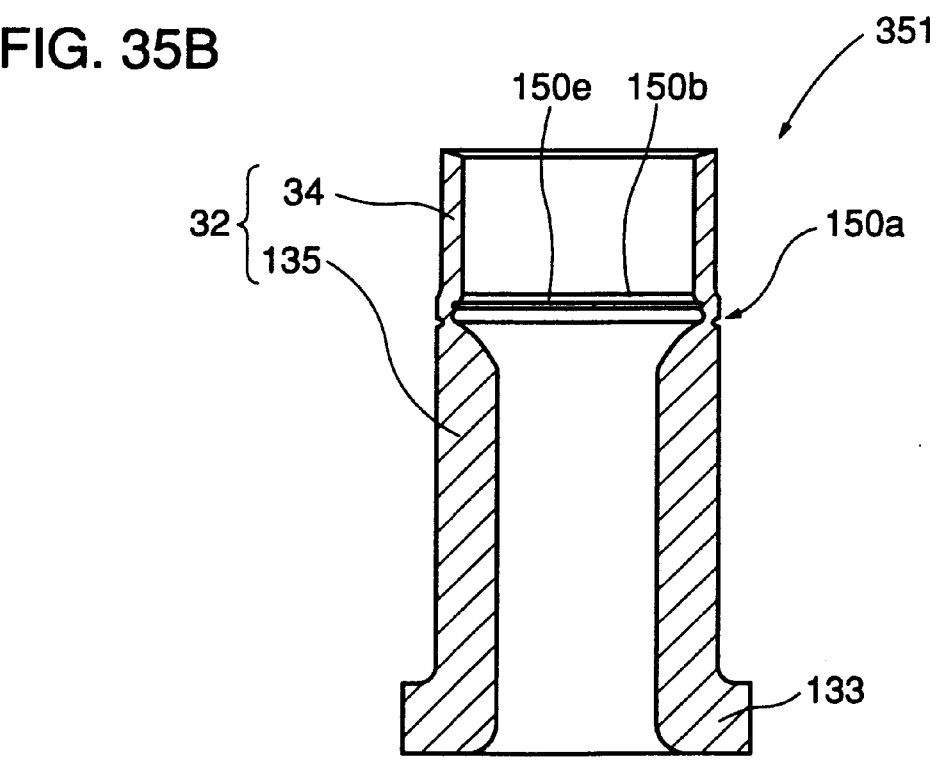
FIG. 35B is a central vertical sectional view of a rivet 351 which is a modification of the fourteenth embodiment of the present invention.

A tee nut 321 according to a fourteenth embodiment of the present invention will be described hereinafter with reference to FIG. 34A. The structure of tee nut 321 of the present embodiment is mainly common to the structure of tee nut 101 shown in FIG. 10A. The structure of tee nut 321 of the present embodiment differs from the structure of tee nut 101 in that a small crimped annular groove 150e extending in the direction of the perimeter is formed at the inner plane of annular groove 150b provided at the inner peripheral face of shaft portion 32 in the proximity of the interface between portion 34 to be caulked and female thread formation portion 35. Also, portion 34 to be caulked is formed to have an outer diameter slightly smaller than the outer diameter of female thread formation portion 35. The structure of the present embodiment is applicable to rivet 111 of FIG. 10. Also, the present embodiment is applicable to a metallic fastening member such as tee nut 231 or rivet 241 of FIG. 24, as a tee nut 331 of FIG. 34B. Furthermore, the present embodiment is applicable to the rivet shown in FIGS. 10B and 24B, as rivets 341 and 351 shown in FIGS. 35A and 35B, respectively. A crimped small annular groove can further be provided at the inner side of the annular groove having substantially a planar or rather cylindrical bottom such as annular groove 150c of tee nut 121 or rivet 131 of FIG. 15.

By providing a small crimped annular groove 150e at the inner face of annular groove 150b (or 150c), the separation by fracture can further be improved in the detachment work for recycling purposes. Since the outer diameter of portion 34 to be caulked is made slightly smaller than the outer diameter of female thread formation portion 35, the portion to be caulked that has a relatively small diameter can function as a guide even in the case where there is a slight error in the positioning between tee nut 321 and the companion hole in the insertion of tee nut 321 to the object of fixation. Therefore, the tee nut can be inserted reliably into the companion hole.

Figure 36:
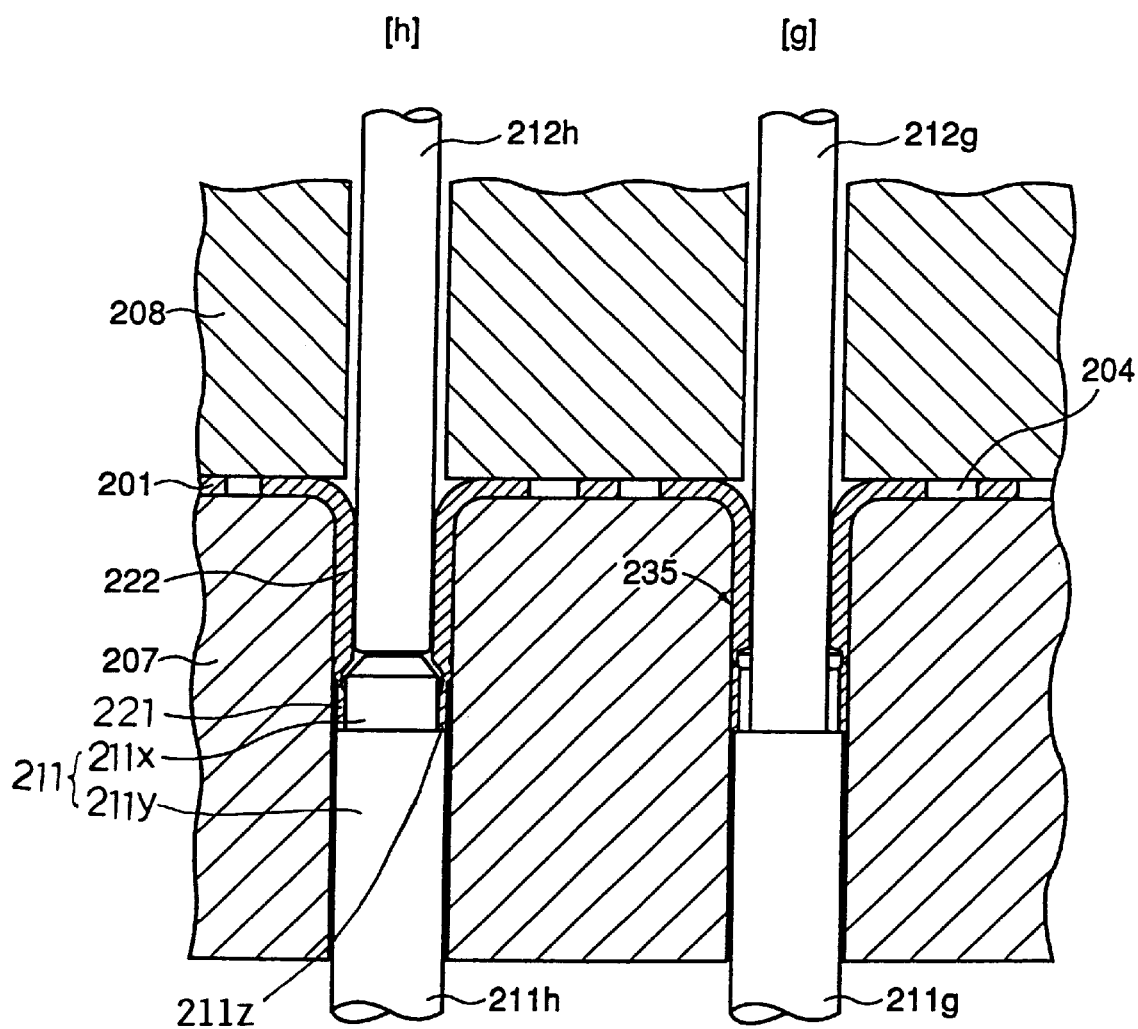
FIG. 36 is an enlarged sectional view of the state in which a working station [h] is provided adjacent working station [g] in the case of forming the tee nut or the rivet according to the fourteenth embodiment shown in FIGS. 34A, 34B or FIGS. 35A and 35B.
Figure 37:
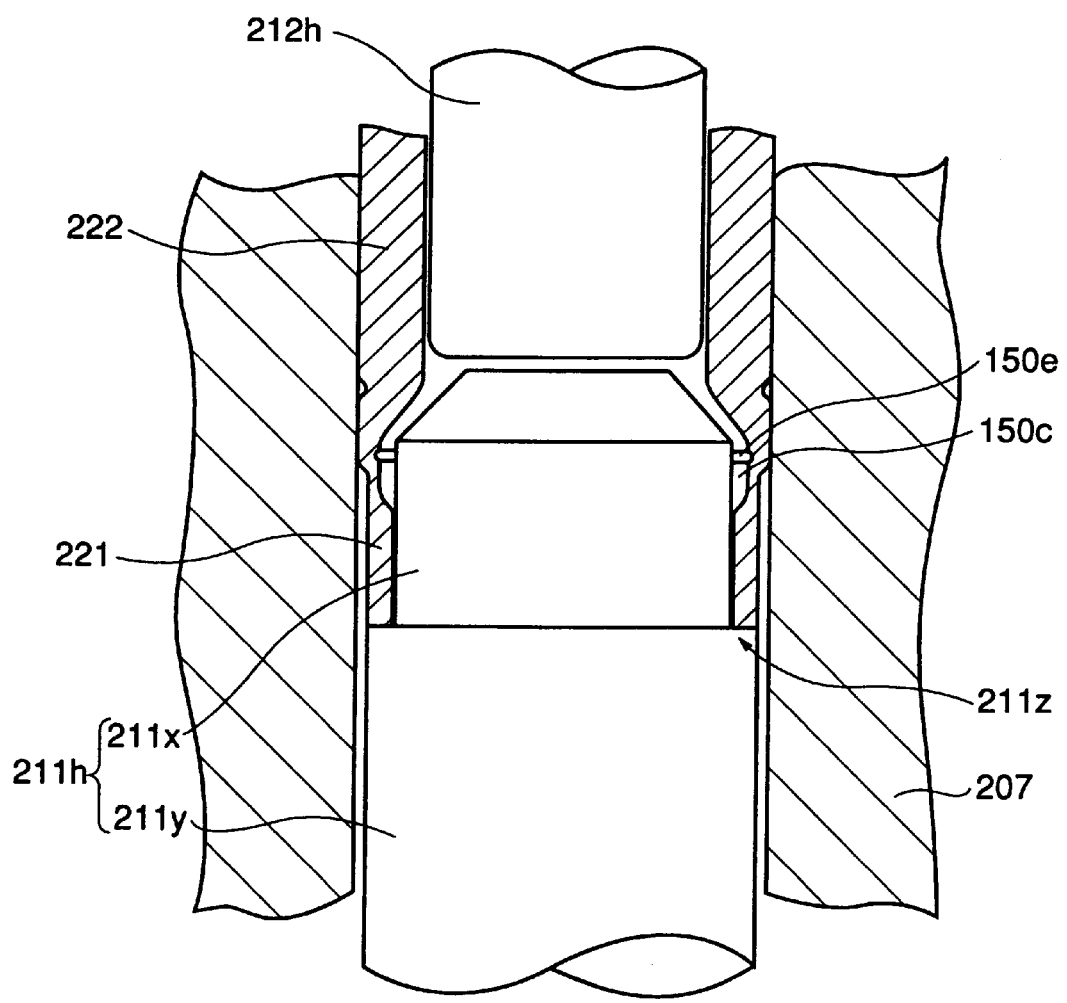
FIG. 37 is a partial enlarged sectional view showing the neighborhood of a leading end portion corresponding to the portion to be caulked 34 in working station [h] shown in FIG. 36.

The small crimped annular groove 150e of the present embodiment can be formed by including the step of shaping portion 34 so as to be pushed upwards with a knock out, as a step subsequent to working station [g] shown in FIG. 13 or 16. More specifically, at working station [h] adjacent to working station [g] as shown in FIG. 36, the inner diameter of leading end portion 221 is restricted by a reduction diameter portion 211x in the proximity of the upper end of knock out 211h while restricting the inner diameter of base portion 222 with punch 212h. Also, a stepped portion 211z of knock out 211h at the upper end of the base portion side 211y pushes upwards the leading end face of leading end portion 211 with knock out 211h for shaping. By this step, a crimped small annular groove 150e is formed at the inner surface of annular grooves 150b and 150c, as shown in an enlarged manner in FIG. 37. The outer diameter of leading end portion 211 is made slightly smaller than the outer diameter of base portion 222. Thus, the shape of the tee nut or the rivet shown in FIGS. 34 and 35 with respect to the vicinity of the portion to be caulked is completed.

Figure 38A:
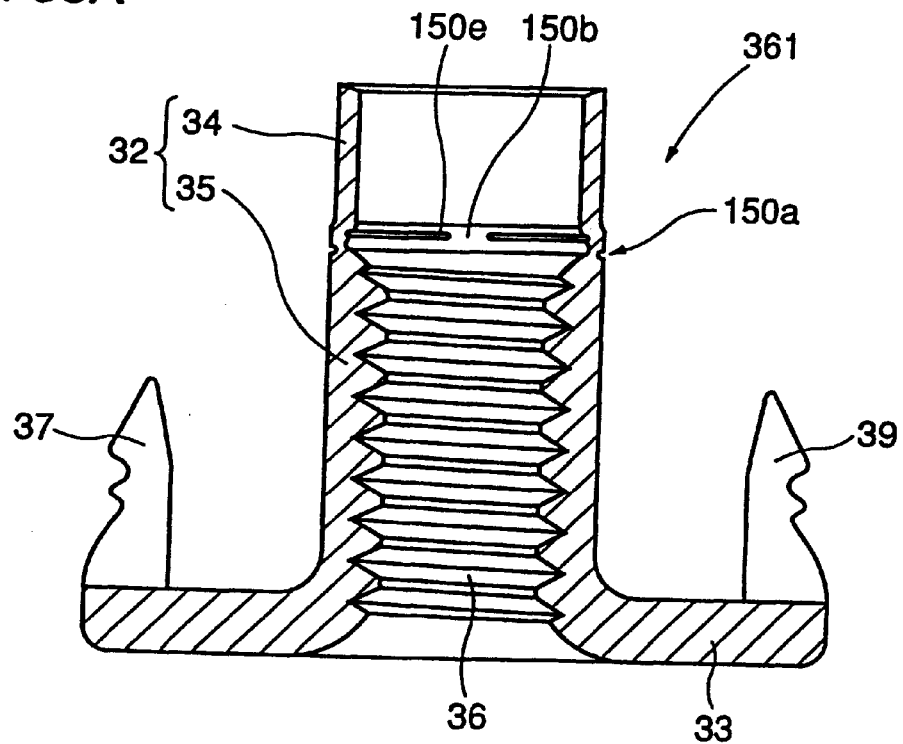
FIG. 38A is a central vertical sectional view of a rivet 361 according to the fourteenth embodiment of the present invention.
Figure 38B:
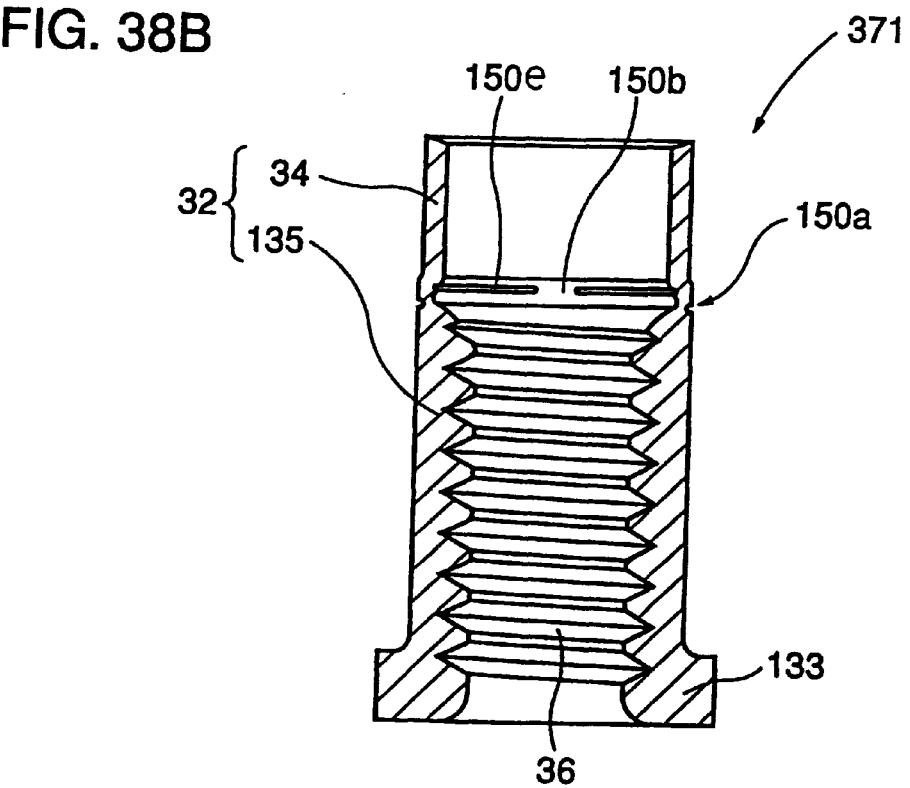
FIG. 38B is a central vertical sectional view of a rivet 371 which is a modification of the fourteenth embodiment of the present invention.
Figure 39A:
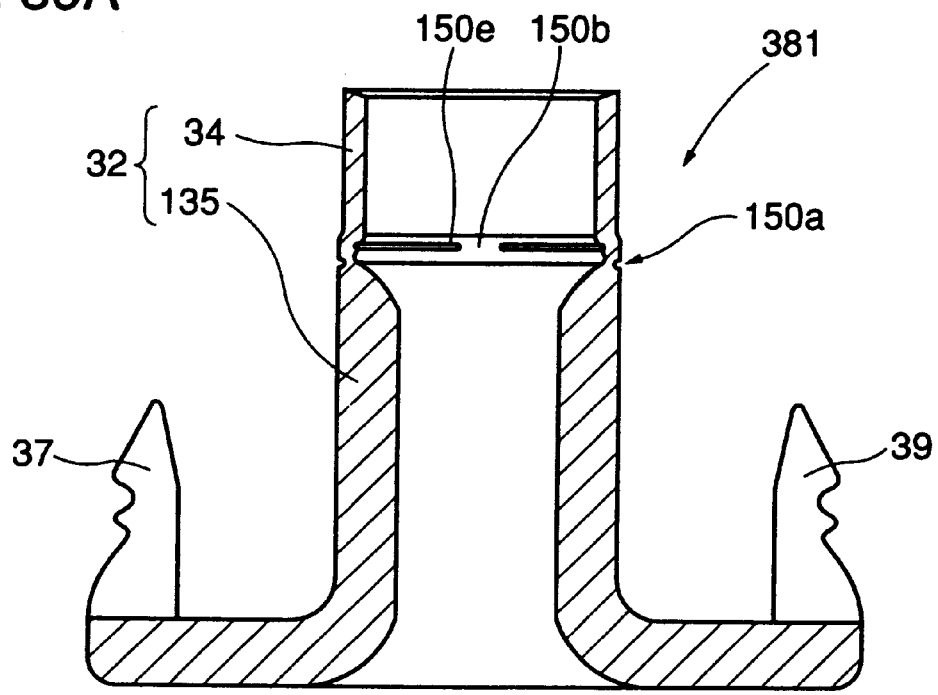
FIGS. 39A and 39B are central vertical sectional views of rivets 381 and 391, respectively, which are other embodiments of the fourteenth embodiment of the present invention.
Figure 39B:
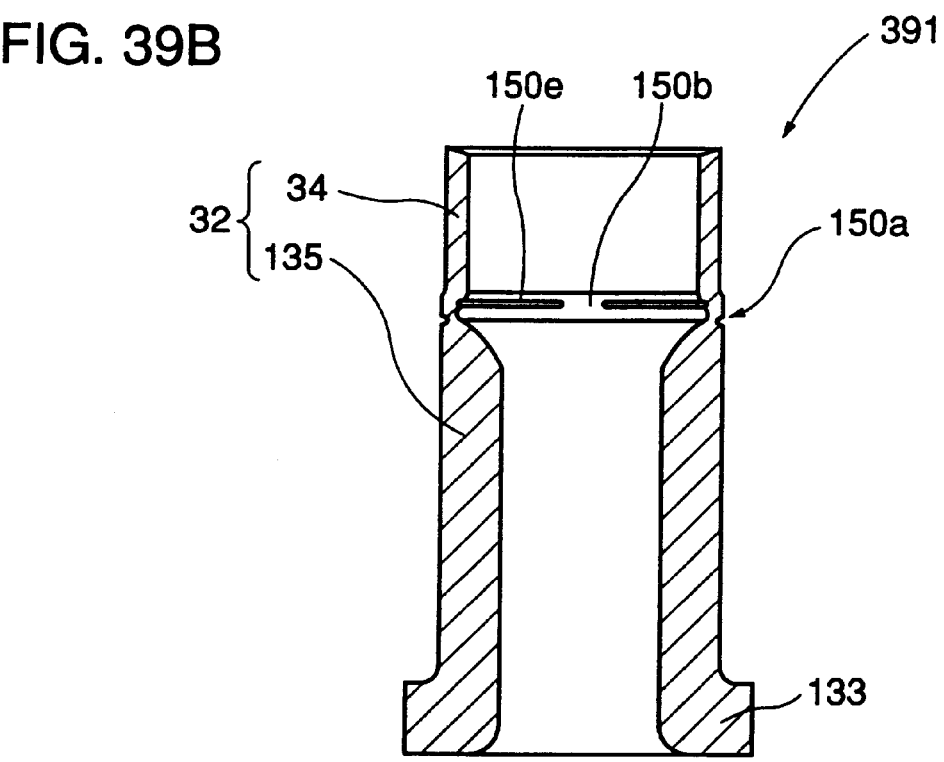

Although a small annular groove 150e at the inner face of annular grooves 150b and 150c in the embodiment shown in FIGS. 34 and 35 is formed continuously along the entire perimeter, a small crimped annular groove 150e can be formed having a partial discontinuous area at the inner face of annular grooves 150a and 150b, as tee nuts 361 and 371 shown in FIGS. 38A and 38B, and rivets 381 and 391 shown in FIGS. 39A and 39B.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A metallic fastening member formed of one piece of a metal material, comprising a cylindrical shaft and a flange extending outward from a first end of said shaft, said shaft including a portion to be caulked at a second end opposite to said first end, and a shaft main portion that is continuous to said portion to be caulked and that extends toward said first end, said shaft having a wall including a thin-walled portion having a partially reduced wall thickness, which comprises a first groove extending in a direction around at least any of an outer peripheral face and an inner peripheral face in a substantially annular region constituting a perimeter of said shaft in the vicinity of an interface between said shaft main portion and said portion to be caulked, and said thin-walled portion maintaining a strength so that said thin-walled portion does not fracture under application of an axially directed force that is exerted in the state when said fastening member is fastened to a workpiece in a caulked state, and so that said thin-walled portion is fractured by application of an axially directed tensile force greater than a predetermined level to allow said shaft to be separated into two parts along said thin-walled portion.

2. The metallic fastening member according to claim 1, wherein said first groove is continuous around the entirety of said perimeter.

3. The metallic fastening member according to claim 1, wherein said first groove is discontinuous in at least one area.

4. The metallic fastening member according to claim 1, wherein said first groove is provided on said perimeter which is at least one of an inner perimeter around said inner peripheral face and an outer perimeter around said outer peripheral face of said shaft in proximity to said interface.

5. The metallic fastening member according to claim 4, wherein said first groove is provided at said inner perimeter and further comprising a second groove provided at said outer perimeter of said shaft in proximity to said interfaces with said first and second grooves substantially opposite to each other.

6. The metallic fastening member according to claim 4, wherein said first groove has a substantially cylindrical bottom floor of a predetermined width.

7. The metallic fastening member according to claim 5, wherein said first groove provided at said inner perimeter has a substantially cylindrical bottom floor of a predetermined width, and said second groove provided at said outer perimeter is located substantially opposite to said substantially cylindrical bottom floor of said first groove provided at said inner perimeter.

8. The metallic fastening member according to claim 1, further comprising a small crimped groove of a width smaller than said first groove and extending in the direction of said perimeter at an inner surface of said first groove.

9. The metallic fastening member according to claim 1, wherein said portion to be caulked of said shaft has an inner diameter greater than an inner diameter of said shaft main portion, and an outer diameter substantially equal to an outer diameter of said shaft main portion.

10. The metallic fastening member according to claim 1, wherein said portion to be caulked of said shaft has an inner diameter greater than an inner diameter of said shaft main portion, and an outer diameter greater than an outer diameter of said shaft main portion.

11. The metallic fastening member according to claim 1, further comprising a female threading formed in at least a portion of a region at an inner perimeter of said shaft main portion.

12. A metallic fastening member formed of one piece of a metal material, comprising a shaft having first and second opposite ends, and a flange extending outwardly from said first end of said shaft, wherein said shaft includes a first portion constituting a shaft main portion and a second portion that is adapted to be caulked, said second portion of said shaft extends from said second end of said shaft toward said first end, said first portion of said shaft is contiguous to said second portion along an interface boundary therebetween and extends from said second portion toward said first end, and said shaft comprises a shaft wall including a thicker wall portion away from said interface boundary and an annular thin-walled portion at said interface boundary having been formed by radially drawing said shaft so as to decrease or increase a diameter of said second portion of said shaft relative to a diameter of said first portion of said shaft so as to cause thinning of said shaft wall at said interface boundary.

13. The metallic fastening member according to claim 12, wherein an outer peripheral surface of said shaft includes a radially stepped shoulder extending along a radial plane circumferentially between said first and second portions where said first and second portions meet each other at said interface boundary.

14. The metallic fastening member according to claim 12, wherein said thicker wall portion is at least a part of said second portion of said shaft.

15. A metallic fastening member formed of one piece of a metal material, comprising a cylindrical shaft and a flange extending outward from a first end of said shaft, said shaft including a portion to be caulked that is to be bent by caulking at a second end opposite to said first end, and a shaft main portion having an inner peripheral surface with a female threading on at least a first part of said inner peripheral surface, being continuous to said portion to be caulked and extending toward said first end, wherein a thin-walled portion having a wall thickness of a wall of said shaft partially reduced is formed in a substantially annular region constituting the perimeter of said shaft at a location toward said first end from said portion to be caulked, said thin-walled portion maintaining a strength so that said thin-walled portion does not fracture under application of an axially directed force that is exerted in the state when said fastening member is fastened to a workpiece in a caulked state, and so that said thin-walled portion is fractured by application of an axially directed tensile force greater than a predetermined level to allow said shaft to be separated into two parts along said thin-walled portion.

16. The metallic fastening member according to claim 15, wherein said thin-walled portion includes a relatively thin-walled region recessed into a second part of said inner peripheral surface of said main shaft portion not having said female threading, and said thin-walled region has a predetermined width in an axial extending direction of said shaft, and said thin-walled portion further includes a groove provided at an outer perimeter or an inner perimeter of said shaft at an axial location corresponding to said relatively thin-walled region.

17. The metallic fastening member according to claim 15, wherein said shaft includes a stepped portion provided halfway in the direction of the axis of said shaft and extending in the direction of the perimeter of said shaft, a distal end cylindrical portion extending to said stepped portion from said second end, and a proximal end enlarged cylindrical portion extending to said flange from said stepped portion, having an inner diameter greater than an inner diameter of said distal end cylindrical portion, and an outer diameter greater than an outer diameter of said distal end cylindrical portion, said distal end cylindrical portion including said portion to be caulked along a predetermined length thereof from said second end, and said first part of said shaft main portion having said female threading in a region toward said stepped portion from said portion to be caulked, wherein said first part has an inner diameter smaller than an inner diameter of said portion to be caulked.

18. The metallic fastening member according to claim 17, wherein said flange has a plane configuration of a polygon, and further comprising two pairs of pawls that are arranged opposite to each other at an outer perimeter of said flange so as to extend toward said second end, wherein each said pair includes two pawls.

19. The metallic fastening member according to claim 15, wherein said flange has a plane configuration of a circle, and further comprising one pair of pawls extending toward said second end at an outer perimeter of said flange, with each pawl of said pair being opposite to each other.

20. The metallic fastening member according to claim 15, wherein said female threading is partially irregular.

21. A metallic fastening member formed of one piece of a metal material, comprising a cylindrical shaft and a flange extending outward from a first end of said shaft, said shaft including a portion to be caulked that is to be bent by caulking at a second end opposite to said first end, and a shaft main portion continuous to said portion to be caulked and extending toward said first end, wherein a thin-walled portion having a wall thickness of a wall of said shaft partially reduced is formed in a substantially annular region constituting the perimeter of said shaft at a location toward said first end from said portion to be caulked, said thin-walled portion being formed by providing a groove in an inner peripheral surface of said substantially annular region of said shaft so as to maintain a strength so that said thin-walled portion does not fracture under application of an axially directed force that is exerted in the state when said fastening member is fastened to a workpiece in a caulked state, and so that said thin-walled portion is fractured by application of an axially directed tensile force greater than a predetermined level to allow said shaft to be separated into two parts along said thin-walled portion.

22. A metallic fastening member formed of one piece of a metal material, comprising a cylindrical shaft and a flange extending outward from a first end of said shaft, said shaft including a portion to be caulked at a second end opposite to said first end, and a shaft main portion that is continuous to said portion to be caulked and that extends toward said first end, said shaft having a wall including a thin-walled portion having a partially reduced wall thickness, which comprises at least one dent provided in an intermittent manner in a direction around at least any of an outer peripheral face and an inner peripheral face in a substantially annular region constituting a perimeter of said shaft in the vicinity of an interface between said shaft main portion and said portion to be caulked, and said thin-walled portion maintaining a strength so that said thin-walled portion does not fracture under application of an axially directed force that is exerted in the state when said fastener member is fastened to a workpiece in a caulked state, and so that said thin-walled portion is fractured by application of an axially directed tensile force greater than a predetermined level to allow said shaft to be separated into two parts along said thin-walled portion.

23. A method of fabricating a metallic fastening member from one piece of a metal material, including a cylindrical shaft and a flange extending outward from a first end of said shaft, said shaft including a portion to be caulked at a second end opposite to said first end, and a shaft main portion continuous to said portion to be caulked and extending toward said first end, said method comprising the steps of:

a) forming an expansion that becomes said shaft portion by expanding a center area of a portion that becomes said flange portion in a metal plate toward one main surface of said metal plate, b) forming a through hole at a leading end face of said expansion, c) causing the wall of a leading end portion corresponding to a portion where said portion to be caulked is to be formed in said expansion to be thinner than the wall of a base portion corresponding to a portion where said shaft main portion is to be formed, and causing an inner diameter of said leading end portion to be smaller than the inner diameter of said base portion, and d) deforming in the radial direction at least one of said leading end portion and said base portion so that the outer diameter of said leading end portion approximates the outer diameter of said base portion while maintaining the wall thickness of said base portion.

24. The method of fabricating a metallic fastening member according to claim 22, wherein said step d) is carried out to form a groove extending in the direction of the perimeter in at least the inner perimeter of a substantially annular region in proximity to an interface between said leading end portion and said base portion.

25. The method of fabricating a metallic fastening member according to claim 22, wherein said step d) is carried out to form a groove extending in the direction of the perimeter at both the inner perimeter and the outer perimeter of said substantially annular region in proximity to the interface between said leading end portion and said base portion.

26. The method of fabricating a metallic fastening member according to claim 22, wherein said metal plate is a longitudinal strip of metal, and said step of forming an expansion in said step c), and said step d) are carried out while advancing said longitudinal strip of metal along a follow die.

27. The method of fabricating a metallic fastening member according to claim 22, wherein said step c) includes the step of reducing the outer diameter and the inner diameter of said leading end portion while restricting deformation of said base portion.

28. The method of fabricating a metallic fastening member according to claim 22, wherein said step d) includes the step of reducing the outer diameter and the inner diameter of said base portion while restricting deformation of said leading end portion.

29. The method of fabricating a metallic fastening member according to claim 22, further comprising the step of exerting a pressing force in the direction of the center axis of said shaft portion with respect to said leading end portion, after said step d).

* * * * *

UNITED STATES PATENT AND TRADEMARK OFFICE
CERTIFICATE OF CORRECTION

PATENT NO. : 6,139,237
DATED : October 31, 2000
INVENTOR(S) : Nagayama

It is certified that error appears in the above-indentified patent and that said Letters Patent is hereby corrected as shown below:

Col. 5, line 25, after "predetermined", insert --width--;

Signed and Sealed this

First Day of May, 2001

Attest:

NICHOLAS P. GODICI

*Attesting Officer*   *Acting Director of the United States Patent and Trademark Office*